US012481232B2

(12) United States Patent
Nitta et al.

(10) Patent No.: US 12,481,232 B2
(45) Date of Patent: Nov. 25, 2025

(54) IMAGE FORMING APPARATUS HAVING FIRST AND SECOND RETRACTABLE TONER CARTRIDGES

(71) Applicant: CANON KABUSHIKI KAISHA, Tokyo (JP)

(72) Inventors: Jumpei Nitta, Kanagawa (JP); Tomoya Tateishi, Kanagawa (JP); Osamu Sasaoka, Kanagawa (JP); Kohei Koguchi, Kanagawa (JP); Shuma Hiasa, Kanagawa (JP); Tachio Kawai, Tokyo (JP); Kenji Watanabe, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/503,541

(22) Filed: Nov. 7, 2023

(65) Prior Publication Data

US 2024/0152074 A1 May 9, 2024

(30) Foreign Application Priority Data

Nov. 8, 2022 (JP) ................................ 2022-178514
Sep. 27, 2023 (JP) ................................ 2023-165972

(51) Int. Cl.
*G03G 15/08* (2006.01)
*G03G 15/00* (2006.01)
*G03G 15/16* (2006.01)

(52) U.S. Cl.
CPC ..... *G03G 15/0868* (2013.01); *G03G 15/1615* (2013.01); *G03G 15/751* (2013.01); *G03G 2215/025* (2013.01); *G03G 2215/066* (2013.01)

(58) Field of Classification Search
USPC .......................................................... 399/262
See application file for complete search history.

(56) References Cited

U.S. PATENT DOCUMENTS 6,879,790 B2 4/2005 Phillips et al.
7,801,460 B2 * 9/2010 Masubuchi ........ G03G 15/0894 399/83
(Continued)

FOREIGN PATENT DOCUMENTS

EP 3796095 A1 3/2021
JP H06-250485 A 9/1994
(Continued)

OTHER PUBLICATIONS

Jumpei Nitta et al., U.S. Appl. No. 18/387,178, filed Nov. 6, 2023.
(Continued)

*Primary Examiner* — Quana Grainger
(74) *Attorney, Agent, or Firm* — VENABLE LLP

(57) ABSTRACT

An image forming apparatus includes a first toner cartridge to store first toner and is movable to a first attached position and a first retracted position with respect to a storage frame, and a second toner cartridge to store second toner and is movable to a second attached position and a second retracted position with respect to a second storage frame. A movable first support member supports the first toner cartridge, and a movable second support member supports the second toner cartridge. In a case where a length by which the first toner cartridge at the first retracted position projects from an opening in a body frame is a first length and a length by which the second toner cartridge at the second retracted position projects from the opening is a second length, the first length is larger than the second length.

25 Claims, 19 Drawing Sheets

(56) References Cited

U.S. PATENT DOCUMENTS

| | | | | |
|---|---|---|---|---|
| 2008/0080902 | A1 | 4/2008 | Saito et al. | |
| 2010/0226663 | A1* | 9/2010 | Takashima ......... | G03G 15/0896 399/119 |
| 2011/0305480 | A1* | 12/2011 | Tanaami ............ | G03G 15/0194 399/112 |
| 2016/0054680 | A1 | 2/2016 | Okuda | |

FOREIGN PATENT DOCUMENTS

| | | | |
|---|---|---|---|
| JP | 2003-114599 | A | 4/2003 |
| JP | 2003-287944 | A | 10/2003 |
| JP | 2003-307926 | A | 10/2003 |
| JP | 2004-020847 | A | 1/2004 |
| JP | 2007-183305 | A | 7/2007 |
| JP | 2007-292925 | A | 11/2007 |
| JP | 2008-083639 | A | 4/2008 |
| JP | 2008-096852 | A | 4/2008 |
| JP | 2011-186194 | A | 9/2011 |
| JP | 6280949 | B2 | 2/2018 |
| JP | 2020-140194 | A | 9/2020 |

OTHER PUBLICATIONS

Jumpei Nitta et al., U.S. Appl. No. 18/503,421, filed Nov. 7, 2023.
Jumpei Nitta et al., U.S. Appl. No. 18/503,411, filed Nov. 7, 2023.
European Search Report mailed Mar. 28, 2024, in related European Patent Application No. 23208196.8.

* cited by examiner

IMAGE FORMING APPARATUS HAVING FIRST AND SECOND RETRACTABLE TONER CARTRIDGES

BACKGROUND OF THE INVENTION

Field of the Invention

The present invention relates to an image forming apparatus that forms an image on a recording material.

Description of the Related Art

In an image forming apparatus of an electrophotographic system, a rotary developing system that forms a color image by rotating a rotary including a plurality of developing rollers is known. Japanese Patent Application Laid-Open Nos. 2007-183305 and 2008-096852 each disclose an image forming apparatus including a rotary including a plurality of developing rollers, and a plurality of toner cartridges (toner storage containers) each attachable to and detachable from the rotary.

SUMMARY OF THE INVENTION

According to one aspect of the invention, an image forming apparatus includes a rotary configured to rotate and including a first developing roller, a second developing roller, a first storage frame, and a second storage frame, the first storage frame including a first storage portion configured to store first toner to be supplied to the first developing roller, the second storage frame including a second storage portion configured to store second toner to be supplied to the second developing roller, a body frame with an opening, the body frame being configured to accommodate the rotary, a first toner cartridge which is configured to store the first toner, which is attachable to and detachable from the rotary through the opening, which is movable to a first attached position and a first retracted position where the first toner cartridge is retracted from the first attached position, with respect to the first storage frame, and which is configured to supply the first toner to the first storage portion in a state in which the first toner cartridge is at the first attached position, a second toner cartridge which is configured to store the second toner, which is attachable to and detachable from the rotary through the opening, which is movable to a second attached position and a second retracted position where the second toner cartridge is retracted from the second attached position, with respect to the second storage frame, and which is configured to supply the second toner to the second storage portion in a state in which the second toner cartridge is at the second attached position, a first support member which is configured to support the first toner cartridge, to which the first toner cartridge is detachably attached, and which is attached to the rotary, and a second support member which is configured to support the second toner cartridge, to which the second toner cartridge is detachably attached, and which is attached to the rotary, wherein the first support member is movable with respect to the first storage frame such that the first toner cartridge moves from the first attached position to the first retracted position, and wherein the second support member is movable with respect to the second storage frame such that the second toner cartridge moves from the second attached position to the second retracted position.

According to another aspect of the invention, an image forming apparatus includes a developing device including a developing roller and a storage frame including a storage portion configured to store toner to be supplied to the developing roller, a body frame with an opening, the body frame being configured to accommodate the rotary, a toner cartridge which is configured to store the toner, which is attachable to and detachable from the developing device through the opening, which is movable to an attached position and a retracted position where the toner cartridge is retracted from the attached position, with respect to the storage frame, and which is configured to supply the toner to the storage portion in a state in which the toner cartridge is at the attached position, and a support member which is configured to support the toner cartridge, to which the toner cartridge is detachably attached, and which is attached to the developing device, wherein the support member is configured to move with respect to the storage frame such that the toner cartridge moves from the attached position to the retracted position.

Further features of the present invention will become apparent from the following description of exemplary embodiments with reference to the attached drawings.

DESCRIPTION OF THE EMBODIMENTS

Embodiments of the present disclosure will be described below with reference to drawings.

First Embodiment

An image forming apparatus 1 according to a first embodiment will be described with reference to FIGS. 1 to 12B. In the description below and each drawing, the vertical direction in the case where the image forming apparatus 1 is disposed on a horizontal surface will be referred to as a Z direction. A direction that intersects with the Z direction and that is the direction of a rotational axis 90C of a rotary body 90 (rotational axis direction of a rotary) that will be described later will be referred to as a Y direction. A direction intersecting with both the Z direction and the Y direction will be referred to as an X direction. The X direction and the Y direction are preferably horizontal directions. In addition, the X direction, the Y direction, and the Z direction are preferably orthogonal to each other. In addition, the sides pointed by arrows X, Y, and Z illustrated in each diagram will be respectively referred to as +X, +Y, and +Z sides, and sides opposite thereto will be respectively referred to as −X, −Y, and −Z sides.

Overall Configuration of Image Forming Apparatus

First, an overall configuration of the image forming apparatus 1 will be described. The image forming apparatus 1 is a laser beam printer that forms an image on a sheet S by using an electrophotographic method. Specifically, the image forming apparatus 1 is a color laser beam printer including four developing units 50*y*, 50*m*, 50*c*, and 50*k*. As the sheet S serving as a recording material (recording medium), various sheet materials of different sizes and different materials can be used. Examples of the various sheet materials include paper sheets such as plain paper sheets and cardboards, plastic films, cloths, surface-treated sheet materials such as coated paper sheets, and sheet materials of irregular shapes such as envelopes and index paper sheets.

Figure 1:
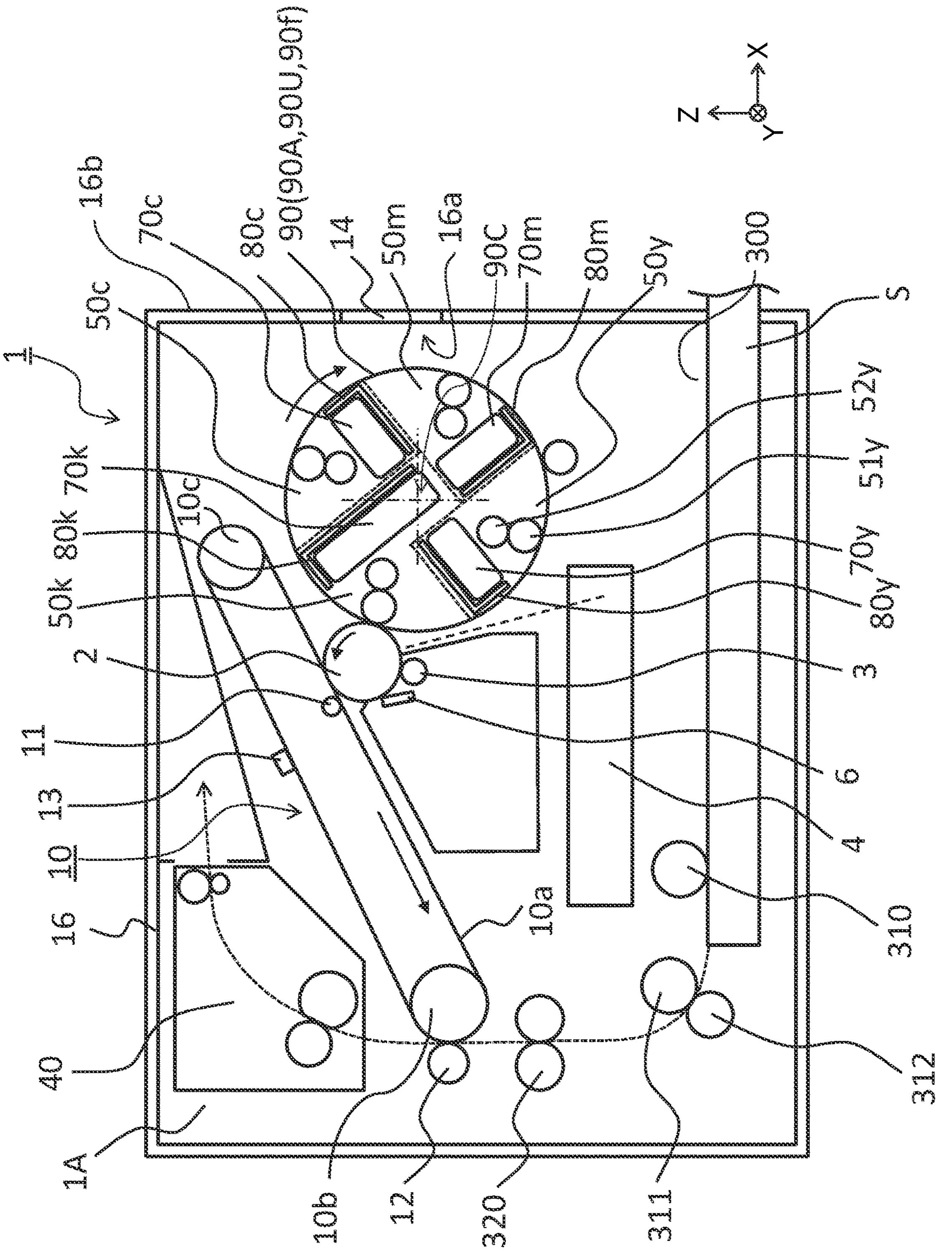
FIG. 1 is a schematic view of an image forming apparatus according to a first embodiment.
Figure 2:
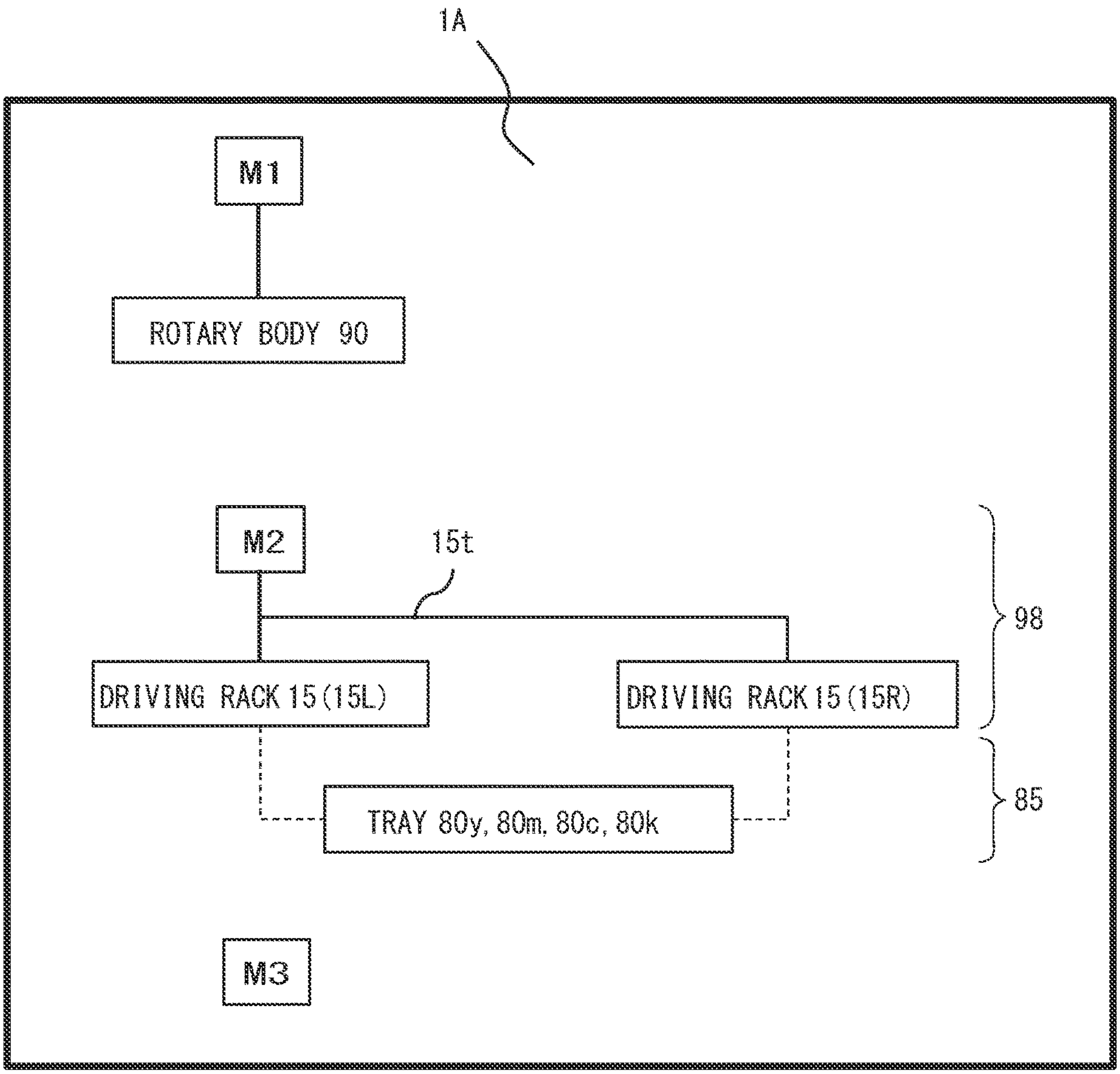
FIG. 2 is a configuration diagram of the image forming apparatus according to the first embodiment.
Figure 3:
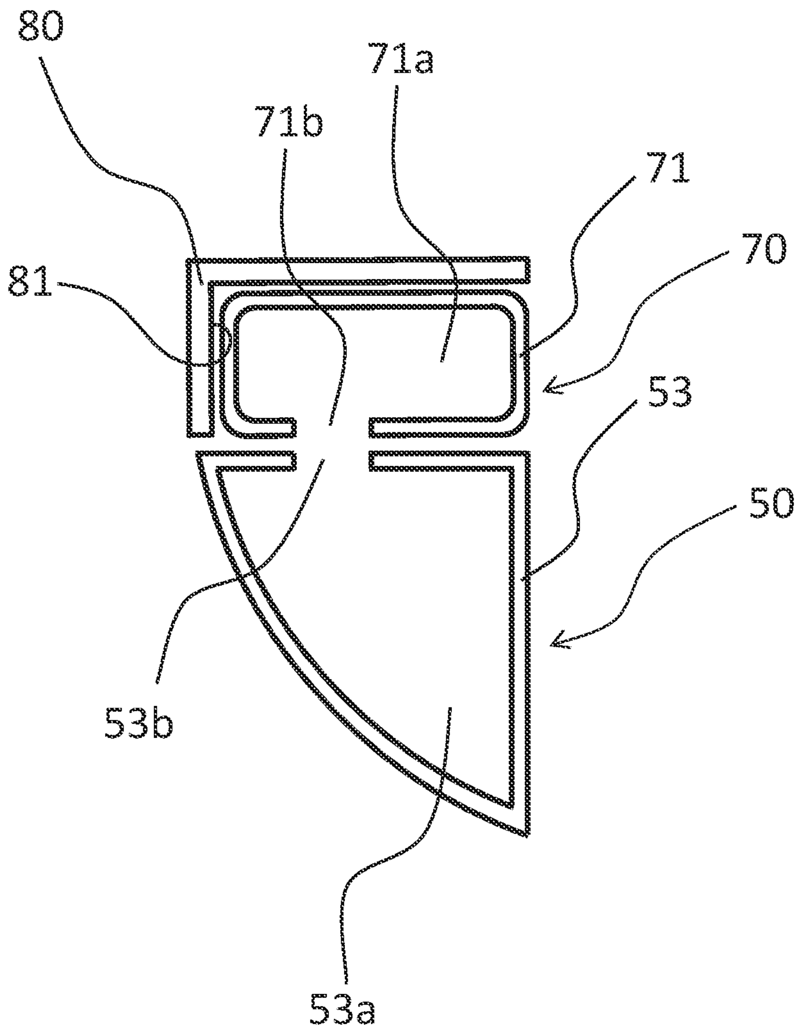
FIG. 3 is a schematic view of a developing unit, a toner cartridge, and a tray according to the first embodiment.

A schematic configuration of the image forming apparatus 1 and an image forming operation will be described with reference to FIGS. 1, 2, and 3. FIG. 1 is a schematic diagram illustrating a sectional configuration of the image forming apparatus 1. FIG. 2 is a diagram for describing drive sources of the image forming apparatus 1. FIG. 3 is a concept diagram illustrating elements for supplying toner from a toner cartridge 70 to a developing unit 50.

As illustrated in FIG. 1, the image forming apparatus 1 includes an image forming apparatus main body (hereinafter referred to as an apparatus body 1A), and toner cartridges 70*y*, 70*m*, 70*c*, and 70*k* that are attachable to and detachable from the apparatus body 1A. The apparatus body 1A of the present embodiment is a part of the image forming apparatus 1 excluding the toner cartridges 70*y*, 70*m*, 70*c*, and 70*k*.

The apparatus body 1A of the image forming apparatus 1 includes a photosensitive member 2 for use in an electrophotographic system. The photosensitive member has a drum shape (cylindrical shape) and is hereinafter referred to as a photosensitive drum 2. The photosensitive member 2 serves as an image bearing member that bears an electrostatic latent image. A charging roller 3, a scanner 4 serving as an exposing device, and a cleaning unit 6 are disposed around the photosensitive drum 2.

The charging roller 3 is an example of a charging means or a charging unit for uniformly charging the photosensitive drum 2. The scanner 4 is an example of an exposing means or an exposing unit that exposes the photosensitive drum 2 by irradiating the photosensitive drum 2 with laser light in accordance with image information. By irradiating the photosensitive drum 2 with the laser light after charging, an electrostatic latent image is formed on each surface of the photosensitive drum 2. The cleaning unit 6 is an example of a cleaning means or a cleaning portion that removes toner remaining on the surface of the photosensitive drum 2.

Further, the apparatus body 1A includes a sheet storage portion 300, a pickup roller 310, a feed roller 311, a separation roller 312, a conveyance roller pair 320, a secondary transfer roller 12, a fixing device 40, and an intermediate transfer unit 10. The pickup roller 310 is an example of a feeding means or a feeding unit that feeds the sheet S. The feed roller 311 and the separation roller 312 are an example of a separation conveyance unit that conveys sheets S while separating the sheets S from each other by frictional force. The secondary transfer roller 12 is an example of a transfer means or a transfer unit that transfers an image from an intermediate transfer belt 10*a* onto the sheet S.

The intermediate transfer unit 10 includes an intermediate transfer belt 10*a*, a belt driving roller 10*b*, a tension roller 10*c*, a cleaning device 13, and a primary transfer roller 11. The intermediate transfer belt 10*a* is an example of an intermediate transfer member that bears an image transferred from the photosensitive drum 2 through primary transfer and conveys the image so as to transfer the image onto the sheet S through secondary transfer. The intermediate transfer belt 10*a* is stretched over the belt driving roller 10*b* and the tension roller 10*c*. The belt driving roller 10*b* is a driving member that is rotationally driven by a drive source to convey the intermediate transfer belt 10*a*.

In addition, the apparatus body 1A includes a rotary body 90, which serves as a rotary, rotator, or developing device, including the developing units 50*y*, 50*m*, 50*c*, and 50*k*. As will be described later, trays 80*y*, 80*m*, 80*c*, and 80*k*, which serve as support members, are attached to the rotary body 90 in the present embodiment. Toner cartridges 70*y*, 70*m*, 70*c*, and 70*k* are detachably attached to the trays 80*y*, 80*m*, 80*c*, and 80*k*.

In the description below, a plurality of members having similar functions can be distinguished by numbers given thereto. For example, one of the toner cartridges 70*y*, 70*m*, 70*c*, and 70*k* may be referred to as a first toner cartridge, one of the remaining three may be referred to as a second toner cartridge, one of the remaining two may be referred to as a third toner cartridge, and the last one may be referred to as a fourth toner cartridge. Similarly, one of the trays 80*y*, 80*m*, 80*c*, and 80*k* may be referred to as a first tray, one of the remaining three may be referred to as a second tray, one of the remaining two may be referred to as a third tray, and the last one may be referred to as a fourth tray. That is, one of the trays 80*y* to 80*k* is an example of a first support member, another one of the trays 80*y* to 80*k* is an example of a second support member, yet another one of the trays 80*y* to 80*k* is an example of a third support member, and the last one of the trays 80*y* to 80*k* is an example of a fourth support member. This numbering is merely used for the sake of convenience of description, and can be interchanged appropriately in principle.

The developing units 50*y*, 50*m*, 50*c*, and 50*k* serving as first to fourth developing units are examples of developing means or developing portions that each develop (visualize) an electrostatic latent image formed on the photosensitive drum 2 into a toner image by using toner of a corresponding color. The developing units 50*y*, 50*m*, 50*c*, and 50*k* each develop the electrostatic latent image formed on the photosensitive drum 2 by using corresponding one of yellow toner, magenta toner, cyan toner, and black toner. The developing units 50*y*, 50*m*, 50*c*, and 50*k* may be arranged in an order different from the order illustrated in FIG. 1.

The developing unit 50*y* includes a developing roller 51*y*, a supply roller 52*y*, and a developing blade. The developing roller 51*y* is a developer bearing member that rotates while bearing toner serving as developer or developing agent, and supplies the toner to the photosensitive drum 2. The supply roller 52*y* is a supply member that is disposed in contact with the developing roller 51*y* and supplies toner to the developing roller 51*y*. The developing blade is a regulation member that regulates the thickness of a toner layer borne on the developing roller 51*y*. The other developing units 50*m*, 50*c*, and 50*k* respectively include developing rollers 51*m*, 51*c*, and 51*k*, supply rollers 52*m*, 52*c*, and 52*k*, and developing blades that are configured in a similar manner.

The toner cartridges 70*y*, 70*m*, 70*c*, and 70*k* corresponding to the developing units 50*y*, 50*m*, 50*c*, and 50*k* are attached to the rotary body 90. The toner cartridges 70*y*, 70*m*, 70*c*, and 70*k* respectively store therein yellow toner, magenta toner, cyan toner, and black toner to be supplied to the developing units 50*y*, 50*m*, 50*c*, and 50*k*. One of the toners of four colors may be referred to as first toner, one of the toners of remaining three colors may be referred to as second toner, one of the toners of remaining two colors may be referred to as third toner, and the toner of the last remaining color may be referred to as fourth toner. For example, the black toner may be referred to as an example of first toner, and the magenta toner may be referred to as an example of second toner. This numbering is merely used for the sake of convenience of description, and can be interchanged appropriately in principle.

Here, the rotary body 90 includes a rotary frame 90*f* supporting the developing units 50*y*, 50*m*, 50*c*, and 50*k*. The developing units 50*y*, 50*m*, 50*c*, and 50*k* are supported by the rotary frame 90*f* that is a rotary support member that is rotatable.

In addition, the trays 80*y*, 80*m*, 80*c*, and 80*k* are attached to the rotary body 90. The rotary body 90 and the trays 80*y*, 80*m*, 80*c*, and 80*k* as a combination can be referred to as a rotary unit 90U. In other words, the rotary unit 90U includes the rotary body 90 and the trays 80*y*, 80*m*, 80*c*, and 80*k*.

The toner cartridges 70*y* to 70*k* are detachably held by the trays 80*y* to 80*k*. As will be described later, the trays 80*y* to 80*k* are supported so as to be slidable to the outside of the rotary body 90. The rotary unit 90U and the toner cartridges 70*y*, 70*m*, 70*c*, and 70*k* as combined can be referred to as a rotary assembly 90A. In other words, the rotary assembly 90A includes the rotary unit 90U and toner cartridges 70*y*, 70*m*, 70*c*, and 70*k*.

As will be described later, the rotary body 90 is rotatable about a rotational axis (rotational center) 90C. The rotational axis 90C coincides with a rotational axis of the rotary frame 90*f*, that of the rotary unit 90U, and that of the rotary assembly 90A. In addition, the rotational axis 90C is substantially parallel to the rotational axis (rotational center) of the photosensitive drum 2.

The rotary body 90 rotates about the rotational axis 90C, and thus can take developing postures in each of which any one of the developing rollers 51*y*, 51*m*, 51*c*, and 51*k* faces the photosensitive drum 2. A posture in which the developing roller 51*y* faces the photosensitive drum 2 will be referred to as a yellow developing posture. A posture in which the developing roller 51*m* faces the photosensitive drum 2 will be referred to as a magenta developing posture. A posture in which the developing roller 51*c* faces the photosensitive drum 2 will be referred to as a cyan developing posture. A posture in which the developing roller 51*k* faces the photosensitive drum 2 will be referred to as a black developing posture. That is, the rotary body 90 can rotate about the rotational axis 90C such that the positions of the developing rollers 51*y*, 51*m*, 51*c*, and 51*k* change with respect to the photosensitive drum 2. The black developing posture is an example of a first developing posture in which the first developing roller (e.g., developing roller 51*k*) faces the photosensitive drum 2. The other developing postures are examples of a second developing posture in which a second developing roller (e.g., one of the developing rollers 51*y* to 51*c*) faces the photosensitive drum 2. The yellow/magenta/cyan/black developing postures can be referred to as first to fourth developing postures. This numbering is merely used for the sake of convenience of description, and can be interchanged appropriately in principle.

As illustrated in FIG. 2, the apparatus body 1A includes motors M1, M2, and M3 serving as drive sources. As will be described later, the motor M1 supplies a driving force for rotating the rotary body 90 about the rotational axis 90C. In other words, the motor M1 rotates the rotary assembly 90A and the rotary unit 90U about the rotational axis 90C.

In addition, the apparatus body 1A includes a driving device 98 including the motor M2 and a transmission device. The transmission device includes driving racks 15L and 15R serving as driving gears and a transmission portion 15*t* that will be described later. The driving force of the motor M2 is transmitted to the driving racks 15L and 15R by the transmission portion 15*t*. In other words, the motor M2 is configured to drive the driving racks 15L and 15R, and moves the trays 80*y*, 80*m*, 80*c*, and 80*k* with respect to the rotary body 90 via the driving racks 15L and 15R.

The motor M3 drives members that are not driven by the motors M1 and M2. For example, the motor M3 drives the photosensitive drum 2, the developing units 50*y*, 50*m*, 50*c*, and 50*k*, the pickup roller 310, the feed roller 311, the conveyance roller pair 320, the secondary transfer roller 12, the belt driving roller 10*b*, and the fixing device 40.

To be noted, the members driven by the motors M1, M2, and M3 can be appropriately changed. In addition, the roles of two or three of the motors M1, M2, and M3 can be concentrated in one motor. In addition, a drive source other than the motors M1, M2, and M3 may be added.

Here, the suffices y, m, c, and k given to the developing units 50*y*, 50*m*, 50*c*, and 50*k*, the toner cartridges 70*y*, 70*m*, 70*c*, and 70*k*, the trays 80*y*, 80*m*, 80*c*, and 80*k*, and the like indicate the colors of toner. The developing units 50*y*, 50*m*, 50*c*, and 50*k* basically have the same configuration and function. The toner cartridges 70*y*, 70*m*, 70*c*, and 70*k* basically have the same configuration and function. In addition, the trays 80*y*, 80*m*, 80*c*, and 80*k* basically have the same configuration and function. Therefore, in the case where these do not need to be distinguished, the suffices y, m, c, and k will be omitted, and arbitrarily selected one of the four units, four cartridges, and four trays will be described.

As illustrated in FIG. 3, the toner cartridge 70 includes a toner frame 71. The toner frame 71 includes a toner storage portion 71*a* that stores toner, and a discharge opening 71*b* communicating with the toner storage portion 71*a*.

The developing unit 50 includes a developing frame 53 serving as a storage frame. The developing frame 53 includes a developing-side storage portion 53*a* and an inlet opening 53*b* communicating with the developing-side storage portion (toner supply chamber) 53*a*. To be noted, as described above, although the developing unit 50 includes the developing roller 51, the supply roller 52, and the like, illustration of these members is omitted in FIG. 3.

Figure 4A:
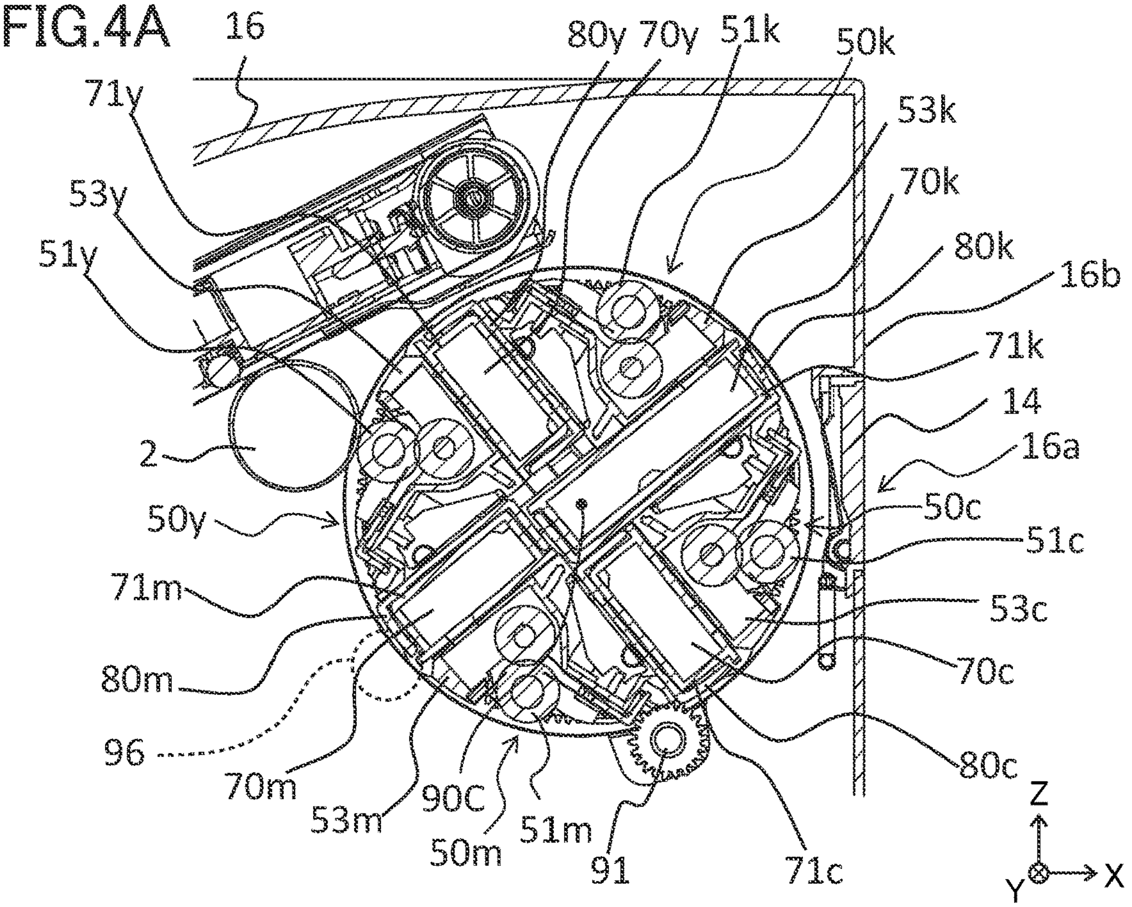
FIGS. 4A and 4B are each a section view of the image forming apparatus according to the first embodiment.

The developing roller 51*k* included in the developing unit 50*k* is an example of a first developing roller. The developing roller 51*m* included in the developing unit 50*m* is an example of a second developing roller. A developing frame 53*k* of the developing unit 50*k* including the developing-side storage portion 53*a* illustrated in FIG. 4A is an example of a first storage frame including a first storage portion. A developing frame 53*m* of the developing unit 50*m* including the developing-side storage portion 53*a* illustrated in FIG. 4A is an example of a second storage frame including a second storage portion. The rotary body 90 is an example of a rotary that is rotatable and includes a first developing roller, a second developing roller, a first storage frame including a first storage portion, and a second storage frame including a second storage portion. In the present embodiment, the rotary body 90 includes first to fourth developing rollers and first to fourth storage frames.

As will be described later, the toner cartridge 70 is movable to an attached position and a retracted position where the toner cartridge 70 is retracted from the attached position, with respect to the developing frame 53. In a state in which the toner cartridge 70 is at the attached position with respect to the developing frame 53, the discharge opening 71*b* faces the inlet opening 53*b*. That is, the toner storage portion 71*a* of the toner cartridge 70 and the developing-side storage portion 53*a* of the developing unit 50 communicate with each other via the discharge opening 71*b* and the inlet opening 53*b*. When toner is supplied from the toner cartridge 70 to the developing unit 50, at least part of the inlet opening 53*b* is positioned below at least part of the discharge opening 71*b*.

Then, toner stored in the toner storage portion 71*a* is discharged through the discharge opening 71*b*, and the toner discharged through the discharge opening 71*b* is stored in the developing-side storage portion 53*a* through the inlet opening 53*b*. The toner stored in the developing-side storage portion 53*a* is supplied to the developing roller 51 by the supply roller 52. The toner stored in the toner storage portion 71*a* is supplied to the developing roller 51 through such a path.

The toner cartridge 70 preferably includes an unillustrated sealing member (first sealing member) that covers the discharge opening 71*b*. In addition, the developing unit 50 preferably includes an unillustrated sealing member (second sealing member) that covers the inlet opening 53*b*.

In a state in which the toner cartridge 70 is not attached to the developing unit 50, the discharge opening 71*b* and the inlet opening 53*b* are preferably each covered by a sealing member such that leakage of toner through the discharge opening 71*b* and the inlet opening 53*b* is suppressed.

Image Forming Operation

An image forming operation in the present embodiment will be described. First, the photosensitive drum 2 is rotated in an arrow direction (counterclockwise direction) in FIG. 1 in synchronization with the rotation of the intermediate transfer belt 10*a*. Further, the surface of the photosensitive drum 2 is uniformly charged by the charging roller 3.

In the case of forming a color image on the sheet S, the rotary body 90 rotates in an arrow direction (clockwise direction) in FIG. 1 while supporting the developing units 50*y*, 50*m*, 50*c*, and 50*k*. Then, an electrophotographic process is repeatedly performed while moving the developing rollers 51*y*, 51*m*, 51*c*, and 51*k* to a developing position one by one.

First, the scanner 4 emits laser light based on image data corresponding to a yellow image, and thus forms an electrostatic latent image corresponding to the yellow image on the surface of the photosensitive drum 2. In parallel with the formation of this electrostatic latent image, the motor M1 rotates the rotary body 90, and the rotary body 90 takes the yellow developing posture. When the rotary body 90 is in the yellow developing posture, the developing roller 51*y* is in the developing position, and the electrostatic latent image formed on the photosensitive drum 2 is developed with yellow toner.

Here, in the present embodiment, the developing rollers 51*y*, 51*m*, 51*c*, and 51*k* are each an elastic roller formed by covering a metal shaft with rubber. At the developing position, the developing rollers 51*y*, 51*m*, 51*c*, and 51*k* each develop the electrostatic latent image in a state of being in contact with the photosensitive drum 2. That is, a contact development system is employed for the image forming apparatus 1 of the present embodiment. However, at the developing position, each of the developing rollers 51*y*, 51*m*, 51*c*, and 51*k* may develop the electrostatic latent image with a gap between the developing roller and the photosensitive drum 2. That is, a non-contact development system may be employed for the image forming apparatus 1.

After the yellow toner image is developed, the yellow toner image on the photosensitive drum 2 is transferred onto the intermediate transfer belt 10*a* through primary transfer by the primary transfer roller 11 disposed on the inner peripheral side of the intermediate transfer belt 10*a*.

After this, toner images of respective colors are formed by rotating the rotary body 90 and thus sequentially moving the developing rollers 51*m*, 51*c*, and 51*k* to the developing position. That is, after the yellow toner image is formed on the intermediate transfer belt 10*a*, the rotary body 90 takes a magenta developing posture, and a magenta toner image is formed on the intermediate transfer belt 10*a*. After the magenta toner image is formed on the intermediate transfer belt 10*a*, the rotary body 90 takes a cyan developing posture, and a cyan toner image is formed on the intermediate transfer belt 10*a*. After the cyan toner image is formed on the intermediate transfer belt 10*a*, the rotary body 90 takes a black developing posture, and a black toner image is formed on the intermediate transfer belt 10*a*. After the black toner image is formed on the intermediate transfer belt 10*a*, the rotary body 90 rotates about the rotational axis 90C in an arrow direction (clockwise direction) illustrated in FIG. 1, and returns to the yellow developing posture. To be noted, the color of the image to be formed first on the intermediate transfer belt 10*a* can be arbitrarily selected, and for example, the black toner image may be formed first.

Then, primary transfer is repeated so as to superimpose the toner images of four colors on each other on the intermediate transfer belt 10*a*, and thus a color image is formed on the intermediate transfer belt 10*a*. To be noted, before the color image is formed on the intermediate transfer belt 10*a*, the secondary transfer roller 12 and the cleaning device 13 are not in contact with the intermediate transfer belt 10*a*.

Meanwhile, the sheet S is fed by the pickup roller 310 from the sheet storage portion 300 provided in a lower portion of the apparatus body 1A. The sheet S is conveyed to the conveyance roller pair 320 in a state in which one sheet S is separated from a stack of sheets S by the feed roller 311 and the separation roller 312. The conveyance roller pair 320 delivers out the fed sheet S to a transfer portion (secondary transfer portion) that is a nip portion between the intermediate transfer belt 10*a* and the secondary transfer roller 12. The color image on the intermediate transfer belt 10*a* is transferred onto the surface of the conveyed sheet S through secondary transfer.

The sheet S onto which a color image has been transferred is conveyed to the fixing device 40. In the fixing device 40, the sheet S is heated and pressurized, and thus the image is fixed to the sheet S. The sheet S having passed the fixing device 40 is discharged to the outside of the image forming apparatus 1 as a product.

In contrast, in the case of forming a black-and-white image (monochrome image) on the sheet S, the rotary body 90 takes the black developing posture. In this state, an electrostatic latent image is formed on the surface of the photosensitive drum 2 by charging and exposing the photosensitive drum 2, and then the electrostatic latent image is developed with black toner by the developing roller 51*k* positioned at the developing position. The black toner image is transferred onto the intermediate transfer belt 10*a* through primary transfer, and then the toner image is transferred onto the sheet S through secondary transfer. Steps after this are similar to the case of a color image.

Rotary Configuration

Figure 4B:
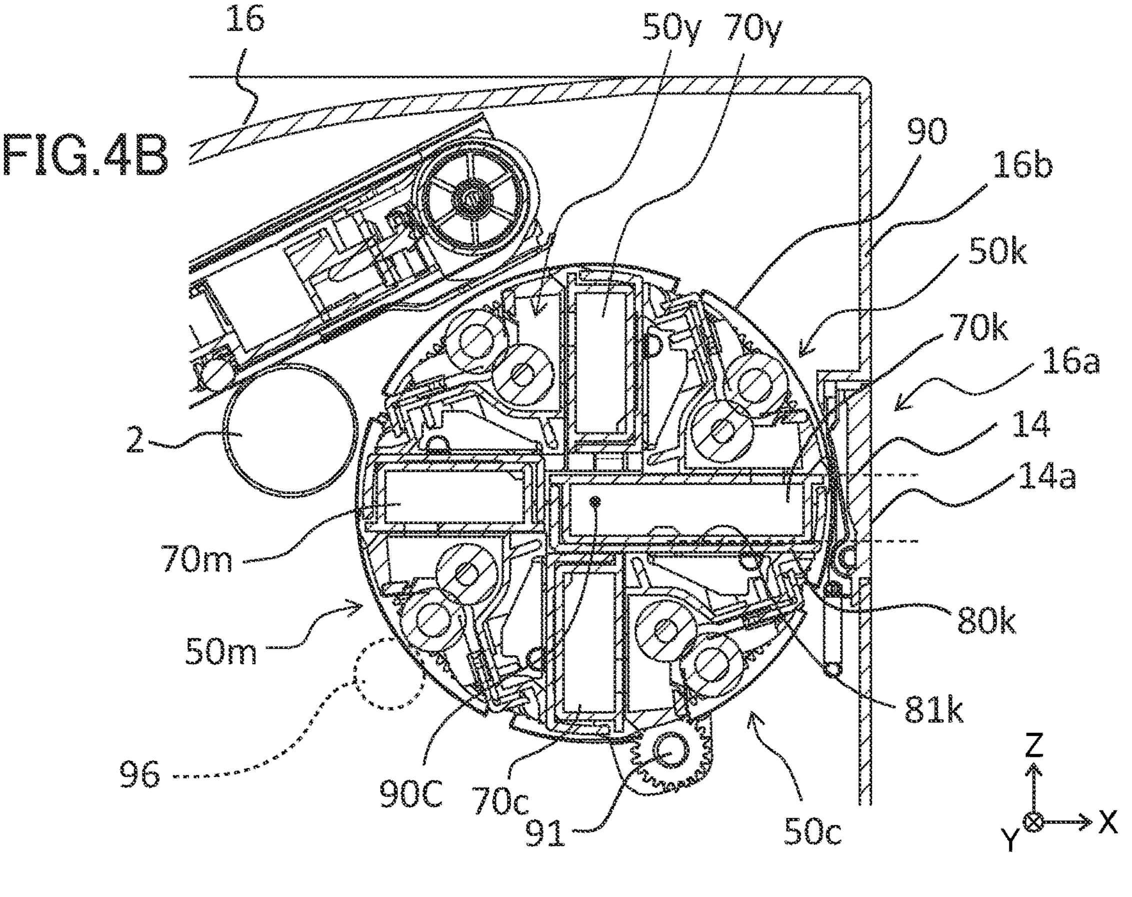
Figure 5:
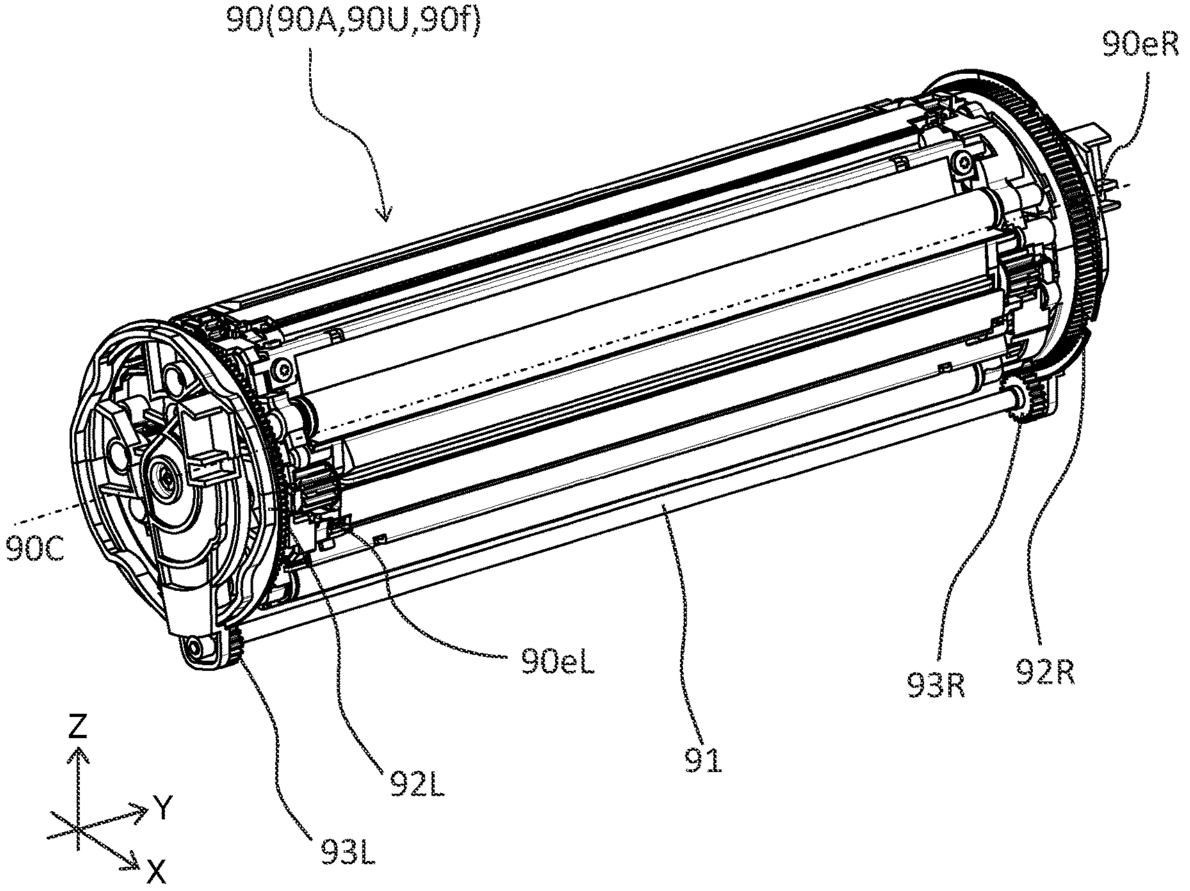
FIG. 5 is a perspective view of a rotary body according to the first embodiment.

The configuration of the rotary body 90 will be described with reference to FIGS. 1, 4A, 4B, and 5. FIGS. 4A and 4B are each a section view of the rotary body 90 of the image forming apparatus 1 and the surroundings thereof. To be noted, FIGS. 4A and 4B are each a section view taken along a virtual plane orthogonal to the rotational axis 90C of the rotary body 90. FIG. 5 is a perspective view of the rotary body 90.

As has been described, the toner cartridges 70*y* to 70*k* are attachable to and detachable from the rotary body 90. In the case where toner in the toner cartridges 70*y* to 70*k* has run out, the user can replenish the image forming apparatus 1 with toner by replacing the toner cartridges 70*y* to 70*k*.

As illustrated in FIG. 1, the apparatus body 1A includes a frame 16 accommodating the rotary body 90. The frame 16 is a body frame of the image forming apparatus 1 of the present embodiment. The frame 16 is a casing or skeleton of the apparatus body 1A constituted by a frame and exterior members, and has an approximately rectangular parallelepiped shape.

The frame 16 has an opening 16*a*. More specifically, the frame 16 has a side surface 16*b* extending in a direction intersecting with the horizontal direction. The side surface 16*b* constitutes at least part of the exterior surface of the apparatus body 1A on the +X side. The opening 16*a* is provided in the side surface 16*b*. The side surface 16*b* is a side surface disposed on the downstream side of the discharge port in a discharge direction in which the sheet S on which an image has been formed is discharged from the apparatus body 1A through the discharge port. From the side surface 16*b* side of the image forming apparatus 1, the user can access the sheet storage portion 300 to replenish the sheet storage portion 300 with sheets S, and can obtain the sheet S discharged through the discharge port. Therefore, the side surface 16*b* can be referred to as the front surface of the apparatus body 1A.

The toner cartridges 70*y*, 70*m*, 70*c*, and 70*k* are attachable to and detachable from the rotary body 90 through the opening 16*a*. That is, the toner cartridge 70*k* can be referred to as an example of a first toner cartridge that stores toner to be supplied to the first developing roller (developing roller 51*k*) and that is attachable to and detachable from the rotary (rotary body 90) through the opening 16*a* of the frame 16 of the apparatus body 1A. The toner cartridge 70*m* can be referred to as an example of a second toner cartridge that stores toner to be supplied to the second developing roller (developing roller 51*m*) and that is attachable to and detachable from the rotary (rotary body 90) through the opening 16*a* of the frame 16 of the apparatus body 1A.

In the present embodiment, the toner cartridges 70*y*, 70*m*, 70*c*, and 70*k* are attached to and detached from the rotary body 90 through the opening 16*a* in the state of being supported by the trays 80*y* to 80*k*. In other words, the user can attach and detach the toner cartridges 70*y* to 70*k* to and from the rotary body 90 via the trays 80*y* to 80*k*.

The opening 16*a* is disposed in the side surface 16*b* of the frame 16. In the present embodiment, the side surface 16*b* is a surface approximately parallel to the rotational axis 90C of the rotary body 90. Therefore, in the case of replacing the toner cartridge 70, the toner cartridge 70 passes through the opening 16*a* in a direction intersecting with the rotational axis 90C (preferably a direction orthogonal to the rotational axis 90C).

The image forming apparatus 1 includes a door 14 that covers the opening 16*a* of the frame 16. The door 14 is an opening/closing member movable to a closed position illustrated in FIG. 6A where the door 14 covers the opening 16*a* and an open position illustrated in FIGS. 6B and 6C where the opening 16*a* is exposed.

As described above, in the present embodiment, the toner cartridge 70 is configured to be attachable to and detachable from the rotary body 90 via the tray 80. Therefore, the toner cartridge 70 can be stably attached to and detached from the rotary body 90.

More specifically, the user can replace the toner cartridge 70 by an operation of attaching and detaching the toner cartridge 70 to and from the tray 80 configured to be movable with respect to the rotary body 90 (that is, with respect to the apparatus body 1A). In the case of a configuration in which the toner cartridge is replaced by the user directly inserting and removing the toner cartridge in and from the apparatus body, the user is required to insert the toner cartridge to a predetermined attached position in the apparatus body. In the present embodiment, the tray 80 is capable of moving such that the toner cartridge 70 moves to the attached position in a state in which the tray 80 is supporting the toner cartridge 70. Therefore, the user can replace the toner cartridge 70 by a simple operation of placing the toner cartridge 70 on the tray 80, and thus the operability is improved.

To be noted, the toner cartridge 70 has a thin elongated shape with the Y direction parallel to the rotational axis 90C of the rotary body 90 as a longitudinal direction. That is, the dimension of the toner cartridge 70 in the longitudinal direction is larger than its height and width in a cross-section orthogonal to the longitudinal direction. In the case of using the toner cartridge 70 having a thin elongated shape as described above, the toner cartridge 70 can be passed through the opening 16*a* in a short movement distance by providing the opening 16*a* in the side surface 16*b* of the frame 16 that is approximately parallel to the longitudinal direction (Y direction) of the toner cartridge 70. The replacement of the toner cartridge 70 becomes easier than, for example, a case where the toner cartridge 70 is inserted or removed through an opening provided in a side surface on one side (+Y side or −Y side) of the frame 16 in the longitudinal direction of the toner cartridge 70.

The rotary body 90 rotates about the rotational axis 90C, and thus can take a replacement posture in which detachment of one of the toner cartridges 70$y$ to 70$k$ from the rotary body 90 is allowed. A posture in which the detachment of the toner cartridge 70$y$ is allowed will be referred to as a yellow replacement posture. A posture in which the detachment of the toner cartridge 70$m$ is allowed will be referred to as a magenta replacement posture. A posture in which the detachment of the toner cartridge 70$c$ is allowed will be referred to as a cyan replacement posture. A posture in which the detachment of the toner cartridge 70$k$ is allowed will be referred to as a black replacement posture. The black replacement posture is an example of a first replacement posture in which detachment of a first toner cartridge from the rotary body 90 is allowed. The yellow/magenta/cyan replacement postures are examples of a second replacement posture in which detachment of a second toner cartridge from the rotary body 90 is allowed. The yellow/magenta/cyan/black replacement postures can be referred to as first to fourth replacement postures. This numbering is merely used for the sake of convenience of description, and can be interchanged appropriately in principle.

The rotary body 90 rotates about the rotational axis 90C in a counterclockwise direction of FIG. 1, and can sequentially take the yellow/magenta/cyan/black replacement postures. In the present embodiment, the rotary body 90 rotates about the rotational axis 90C in the counterclockwise direction of FIG. 1, and thus the developing posture and the replacement posture can be switched alternately. For example, in FIG. 1, the rotary body 90 is in the black developing posture. By rotating the rotary body 90 in the clockwise direction from this state, the posture of the rotary body 90 can be switched in the order of the cyan replacement posture, the yellow developing posture, the black replacement posture, the magenta developing posture, the yellow replacement posture, the cyan developing posture, and the magenta replacement posture. By rotating the rotary body 90 in the clockwise direction from the magenta replacement posture, the rotary body 90 returns to the black developing posture. That is, the rotary body 90 can rotate more than once (360°) in the clockwise direction.

FIG. 4A illustrates a cross-section of the rotary body 90 in a developing posture (specifically, the yellow developing posture). FIG. 4B illustrates a cross-section of the rotary body 90 in a replacement posture (specifically, the black replacement posture).

As illustrated in FIGS. 4A and 4B, the four trays 80$y$ to 80$k$ are attached to the rotary body 90. The trays 80$y$ to 80$k$ respectively hold the toner cartridges 70$y$ to 70$k$. In FIGS. 4A and 4B, the trays 80$y$ to 80$k$ are accommodated in the rotary body 90, and this state can be referred to as a state in which the toner cartridges 70$y$ to 70$k$ are attached to the developing units 50$y$, 50$m$, 50$c$, and 50$k$.

As described above, the toner cartridge 70 is movable to an attached position and a retracted position where the toner cartridge 70 is retracted from the attached position, with respect to the developing frame 53 of the developing unit 50. That is, the first toner cartridge (toner cartridge 70$k$) is movable to a first attached position and a first retracted position with respect to a first storage frame (developing frame 53$k$). The second toner cartridge (toner cartridge 70$m$) is movable to a second attached position and a second retracted position with respect to a second storage frame (developing frame 53$m$).

In a state in which the toner cartridge 70 is at the attached position with respect to the developing frame 53, the discharge opening 71$b$ and the inlet opening 53$b$ face each other as illustrated in FIG. 3. The toner cartridge 70 is configured to supply toner to the developing-side storage portion 53$a$ through the inlet opening 53$b$ (opening of the storage frame) in this state.

The apparatus body 1A includes a moving device 85 configured to move the toner cartridge 70 from the attached position to the retracted position with respect to the rotary body 90 (more specifically, with respect to the developing frame 53 of the developing unit 50). The moving device 85 will be described below with reference to FIG. 8 and the like. In the present embodiment, a plurality of moving devices 85$y$ to 85$k$ corresponding to the plurality of toner cartridges 70$y$ to 70$k$ are disposed in the rotary body 90. The trays 80$y$ to 80$k$ can be referred to as part of the moving devices 85$y$ to 85$k$.

In the present embodiment, the toner cartridge 70$k$ storing the black toner is larger in size than the toner cartridges 70$y$ to 70$c$ storing yellow toner, magenta toner, and cyan toner, and is capable of storing more toner. In other words, the first toner cartridge is capable of storing a first amount of toner, the second toner cartridge is capable of storing a second amount of toner, and the first amount is larger than the second amount.

Specifically, the length of the black toner cartridge 70$k$ in a first radial direction with respect to the rotational axis 90C of the rotary body 90 is larger than the length of the magenta toner cartridge 70$m$ in a second radial direction. Here, the first radial direction is a rotational radius direction (radial direction of a virtual circle centered on the rotational axis 90C) of the rotary body 90, and is a direction in which the toner cartridge 70$k$ extends with respect to the rotational axis 90C as viewed in the direction of the rotational axis 90C. The second radial direction is a rotational radius direction of the rotary body 90, and is a direction in which the toner cartridge 70$m$ extends with respect to the rotational axis 90C as viewed in the direction of the rotational axis 90C. Similarly, the length of the black toner cartridge 70$k$ in the first radial direction is larger than the lengths of the other toner cartridges 70$y$ and 70$c$ in the radial directions corresponding to the toner cartridges 70$y$ and 70$c$.

Accordingly, the tray 80$k$ holding the black toner cartridge 70$k$ is larger in size than the trays 80$y$ to 80$c$ holding the other toner cartridges 70$y$, 70$m$, and 70$c$. That is, the four toner cartridges 70$y$ to 70$k$ and the trays 80$y$ to 80$k$ having different sizes are disposed in the rotary body 90. In other words, the toner cartridge 70$k$ serving as an example of a first toner cartridge and the toner cartridge 70$y$ serving as an example of a second toner cartridge smaller than the first toner cartridge are attachable to and detachable from the rotary body 90. In accordance with this, the tray 80$k$ serving as an example of a first support member that supports the first toner cartridge and the tray 80$y$ serving as an example of a second support member smaller than the first support member are provided in the rotary body 90. In addition, the toner cartridges 70$m$ and 70$c$ serving as examples of a third toner cartridge and a fourth toner cartridge that are smaller in size than the first toner cartridge are attachable to and detachable from the rotary body 90. In accordance with this, the trays 80$m$ and 80$c$ serving as examples of a third support member and a fourth support member that are smaller in size than the first support member are provided in the rotary body 90.

Here, rotational driving of the rotary body 90 will be described with reference to FIG. 5. As illustrated in FIG. 5, disk gears 92L and 92R are formed on respective end portions of the rotary body 90. In addition, rotary driving gears 93L and 93R are formed on respective end portions of a swing shaft 91 in a manner capable of transmitting a driving force. Here, the driving force of the motor M1 is transmitted to the rotary driving gear 93R via a drive transmission mechanism. Next, the driving force is transmitted to the disk gears 92L and 92R via the rotary driving gears 93L and 93R, and thus the rotary body 90 is rotationally driven. The rotary body 90 rotates about the rotational axis 90C in the clockwise direction in FIG. 1.

In addition, the rotary body 90 is supported so as to be swingable about the swing shaft 91. The rotary body 90 is urged in a counterclockwise direction in FIGS. 4A and 4B about the swing shaft 91 by an unillustrated urging member. This direction can be referred to as a direction in which the developing rollers 51*y* to 51*k* each approach the photosensitive drum 2. As a result of this, one of the developing rollers 51*y* to 51*k* is in contact with the photosensitive drum 2 in a state in which the rotary body 90 is in a developing posture.

Meanwhile, as illustrated in FIG. 5, rotary cams 90*e*L and 90*e*R are provided on respective end portions of the rotary body 90. When the rotary body 90 rotates about the rotational axis 90C in a clockwise direction in FIGS. 4A and 4B, the rotary cams 90*e*L and 90*e*R come into contact with a roller 96 supported by the frame 16 illustrated in FIGS. 4A and 4B. Then, the rotary body 90 moves in the clockwise direction in FIGS. 4A and 4B about the swing shaft 91. This direction can be referred to as a direction in which the developing rollers 51*y* to 51*k* each move away from the photosensitive drum 2. In addition, this direction can be referred to as a direction in which the rotary body 90 approaches the opening 16*a* of the frame 16 and the door 14.

As a result of this, when the rotary body 90 rotates and switches from the developing posture to the replacement posture, the rotary body 90 swings about the swing shaft 91. In a state in which the rotary body 90 is in the replacement posture, the developing roller 51 is separated from the photosensitive drum 2.

As illustrated in FIG. 4B, in the black replacement posture, the toner cartridge 70*k* stops at a position where the toner cartridge 70*k* faces the opening 16*a* and the door 14 provided on the side surface 16*b* of the apparatus body 1A. When the tray 80*k* is slid from the attached position for the developing unit 50*k* to the outside of the rotary body 90 from this state, the user can replace the toner cartridge 70*k*.

Replacement Operation of Toner Cartridge

Figure 6A:
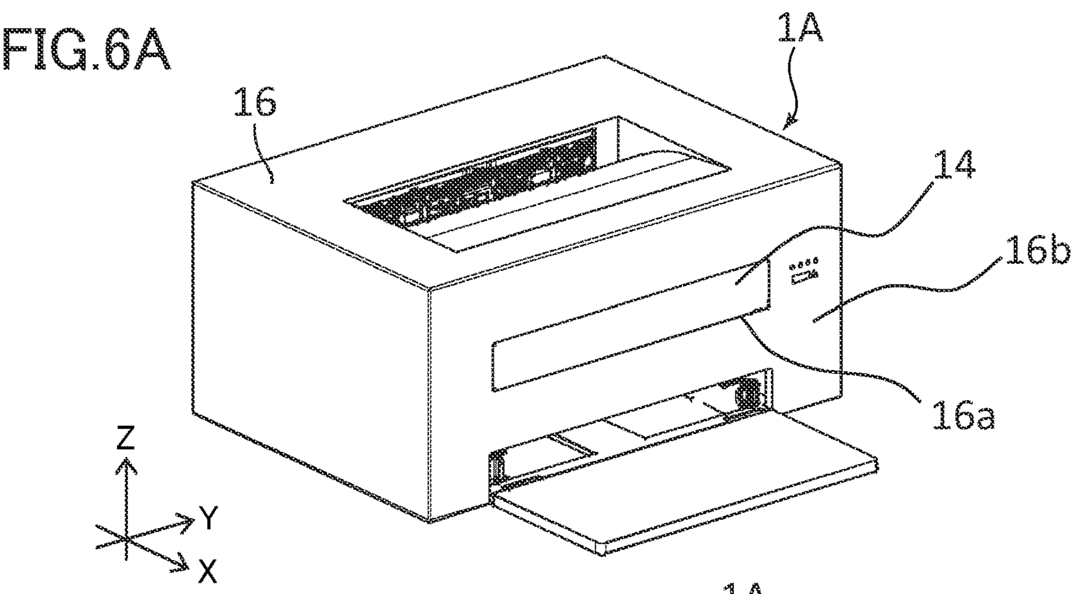
FIGS. 6A to 6C are each a perspective view of the image forming apparatus according to the first embodiment.
Figure 6B:
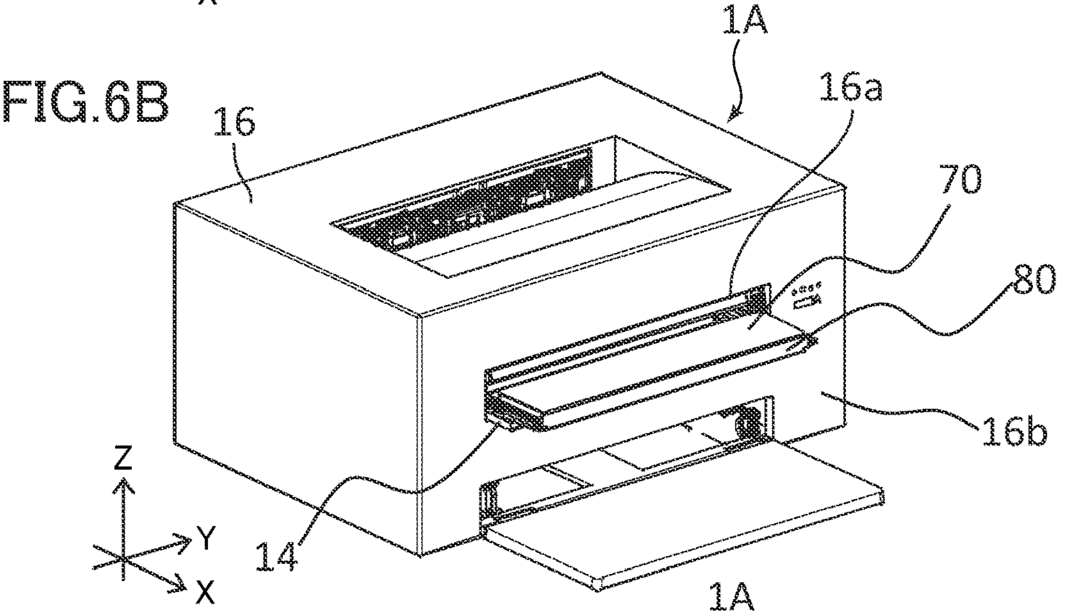
Figure 6C:
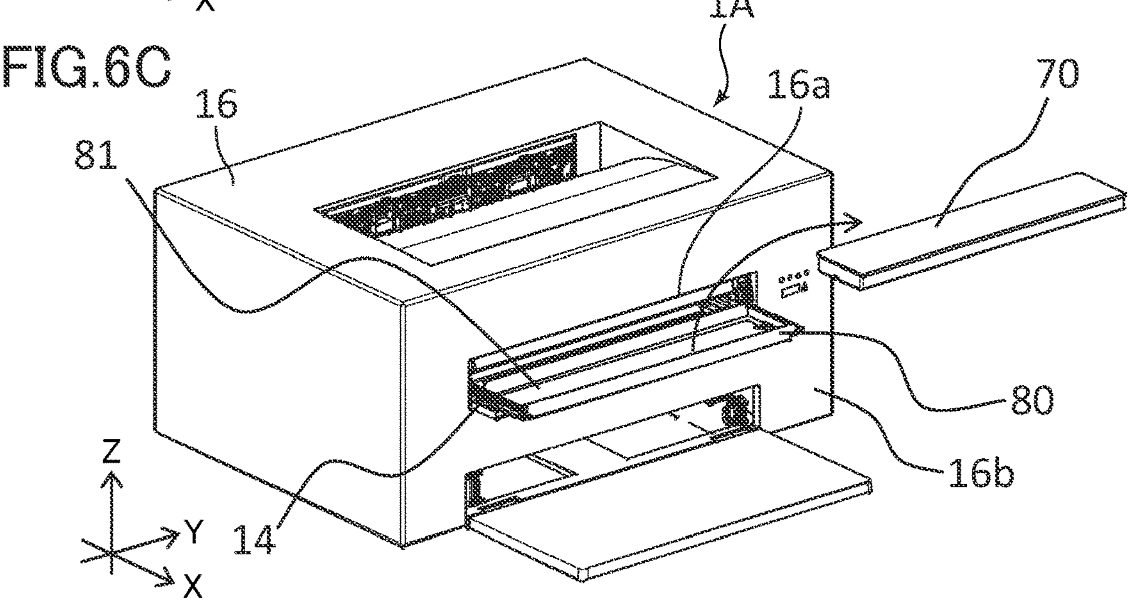
Figure 7A:
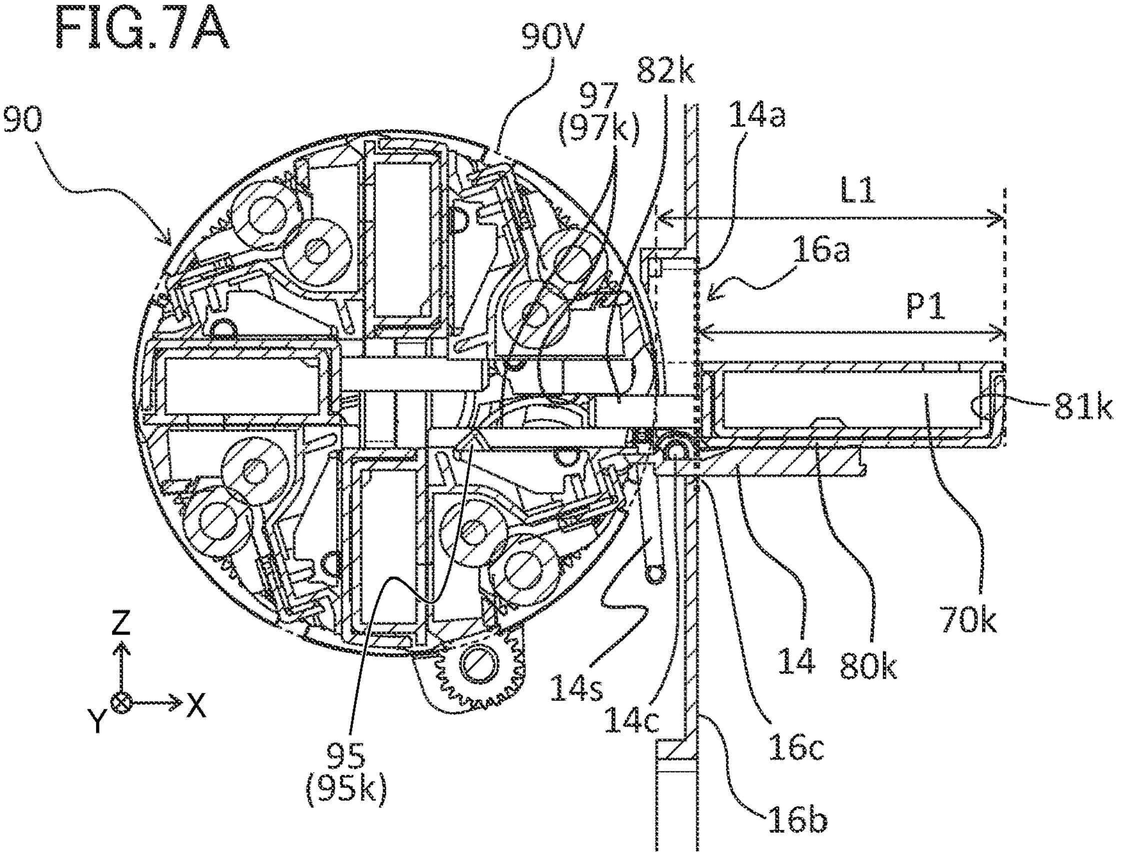
FIGS. 7A and 7B are each a section view of the image forming apparatus according to the first embodiment.
Figure 7B:
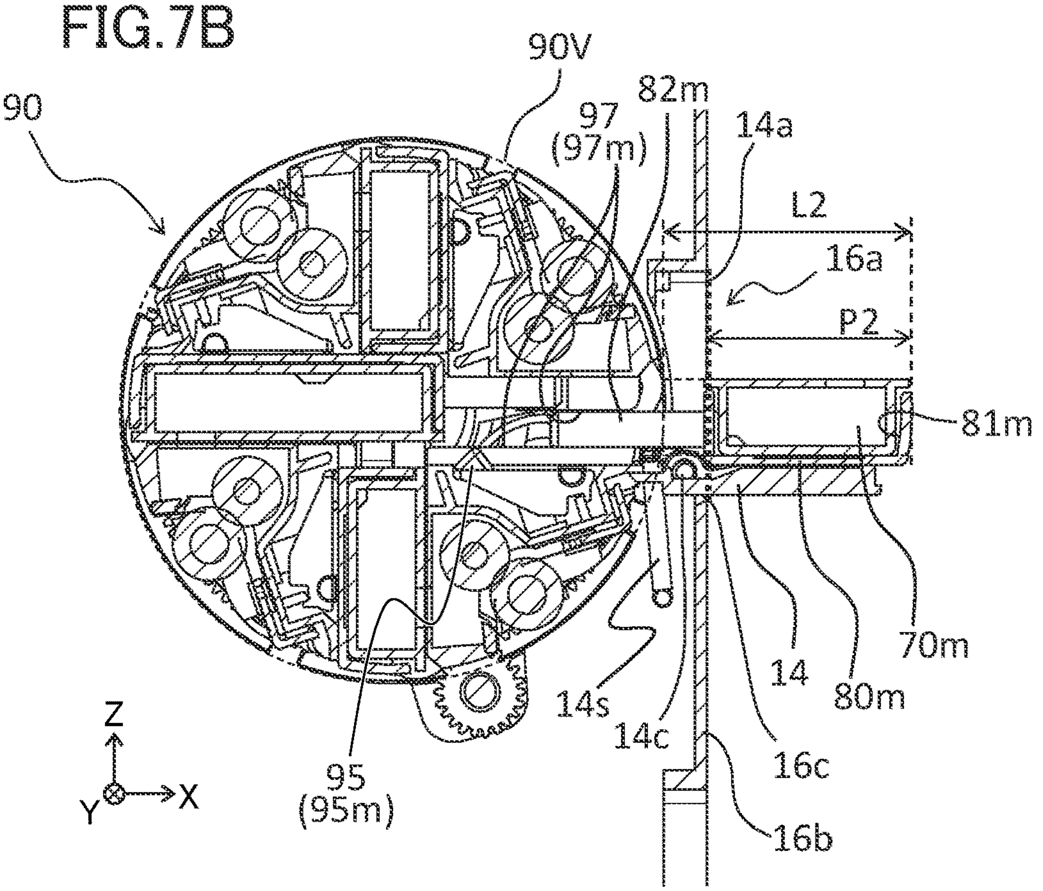

A toner cartridge replacement operation will be described with reference to FIGS. 4A, 6A to 6C, 7A, and 7B. FIGS. 6A to 6C are each an exterior view of the apparatus body 1A. FIGS. 7A and 7B are each a section view of the rotary body 90 and the surroundings thereof in toner cartridge replacement. To be noted, FIGS. 7A and 7B are each a section view of the apparatus taken along a virtual plane orthogonal to the rotational axis 90C of the rotary body 90.

FIG. 6A illustrates an external appearance of the apparatus body 1A during the image forming operation and in a standby state. During the image forming operation is a period in which a series of operations of the image forming apparatus 1 feeding a sheet S, forming an image on the sheet S, and then discharging the sheet S as a product are executed. The standby state is a state in which the image forming operation can be started if the image forming apparatus 1 receives an image forming instruction (printing instruction), and a state in which the image forming apparatus 1 is standing by for the image forming instruction from the user. As illustrated in FIG. 6A, the door 14 is closed during the image forming operation and in the standby state.

FIG. 6B illustrates the external appearance of the apparatus body 1A at the time of toner cartridge replacement. At the time of toner cartridge replacement, the door 14 is opened, and the tray 80 and the toner cartridge 70 are moved to the outside of the apparatus body 1A.

The toner cartridge 70 is movable to an attached position and a retracted position where the toner cartridge 70 is retracted from the attached position, with respect to the developing frame 53 of the developing unit 50. In a state in which the toner cartridge 70 is at the attached position with respect to the developing frame 53, the discharge opening 71*b* and the inlet opening 53*b* face each other as illustrated in FIG. 3. As illustrated in FIGS. 4A and 4B, the rotary body 90 is configured to rotate about the rotational axis 90C to take the developing posture and the replacement posture in a state in which the toner cartridge 70 is at the attached position.

The toner cartridge replacement operation will be described. First, the user instructs the controller of the apparatus body 1A a toner cartridge replacement operation. The instruction of toner cartridge replacement operation is given by, for example, input via an operation panel (operation portion) provided on the apparatus body 1A.

When the controller receives the instruction of the toner cartridge replacement operation, the rotary body 90 rotates to the replacement posture of the toner cartridge 70 serving as a replacement target (toner cartridge 70 whose toner has run out), and stops. That is, the controller rotates the rotary body 90 to the replacement posture of a toner cartridge specified in the instruction of the toner cartridge replacement (in FIG. 4B, the black replacement posture for replacing the black toner cartridge 70*k*). In the replacement posture, the tray 80 supporting the toner cartridge 70 whose replacement has been instructed faces the opening 16*a* of the frame 16 of the apparatus body 1A.

For example, the rotary body 90 of FIG. 4A is in the yellow developing posture in which the yellow developing roller 51*y* faces the photosensitive drum 2. At this time, the black toner cartridge 70*k* and the tray 80*k* do not have to face the opening 16*a* and the door 14. In other words, the toner cartridge 70 and the tray 80 do not have to face the opening 16*a* and the door 14 in the case where the rotary body 90 is in a developing posture or a replacement posture other than the replacement posture of the toner cartridge. Therefore, the opening 16*a* may have such a size that each of the toner cartridges 70 can individually pass therethrough. When the rotary body 90 rotates in the clockwise direction in the drawings by a predetermined angle from the yellow developing posture, the black toner cartridge 70*k* and the tray 80*k* face the opening 16*a* and the door 14 as illustrated in FIG. 4B.

Here, "the tray 80 facing the opening 16*a*" means that the tray 80 is positioned so as to be able to move to the outside of the apparatus body 1A through the opening 16*a*. That is, in the case where the tray 80 faces the opening 16*a*, a moving mechanism that will be described later moves the tray 80 outward in the rotational radius direction of the rotary body 90, and therefore the tray 80 and the toner cartridge 70 supported by the tray 80 are capable of projecting to the outside of the apparatus body 1A. In FIG. 4A, none of the trays 80*y* to 80*k* faces the opening 16*a*. In FIG. 4B, only the black tray 80*k* faces the opening 16*a*, and the other trays 80*y* to 80*c* do not face the opening 16*a*.

When the rotary body 90 is positioned in the replacement posture, the motor M2 moves the tray 80 supporting the toner cartridge 70 serving as a replacement target to the outside of the apparatus body 1A. As a result of this, the toner cartridge 70 serving as a replacement target moves from the attached position to the retracted position with respect to the rotary body 90. In addition, as illustrated in FIGS. 6B, 6C, 7A, and 7B, the tray 80 and the toner cartridge 70 serving as a replacement target supported by the tray 80 projects to the outside of the apparatus body 1A through the opening 16*a*.

More specifically, the tray 80 is movable to an accommodation position and a detachment position with respect to the rotary body 90. The accommodation position is a position where the tray 80 is accommodated in the rotary body 90. The detachment position is a position (removal position or replaceable position) where the tray 80 projects to the outside of the rotary body 90 and the toner cartridge 70 can be detached from the tray 80. The positions of the trays 80*y* to 80*k* in FIGS. 4A and 4B serve as examples of the accommodation position. The position of the tray 80 in FIGS. 6B and 6C, the position of the tray 80*k* in FIG. 7A, and the position of the tray 80*m* in FIG. 7B serve as examples of the detachment position.

When the tray 80 is at the accommodation position, the toner cartridge 70 attached to the tray 80 is at the attached position. When the tray 80 is at the detachment position, the toner cartridge 70 attached to the tray 80 is at the retracted position.

Figure 8:
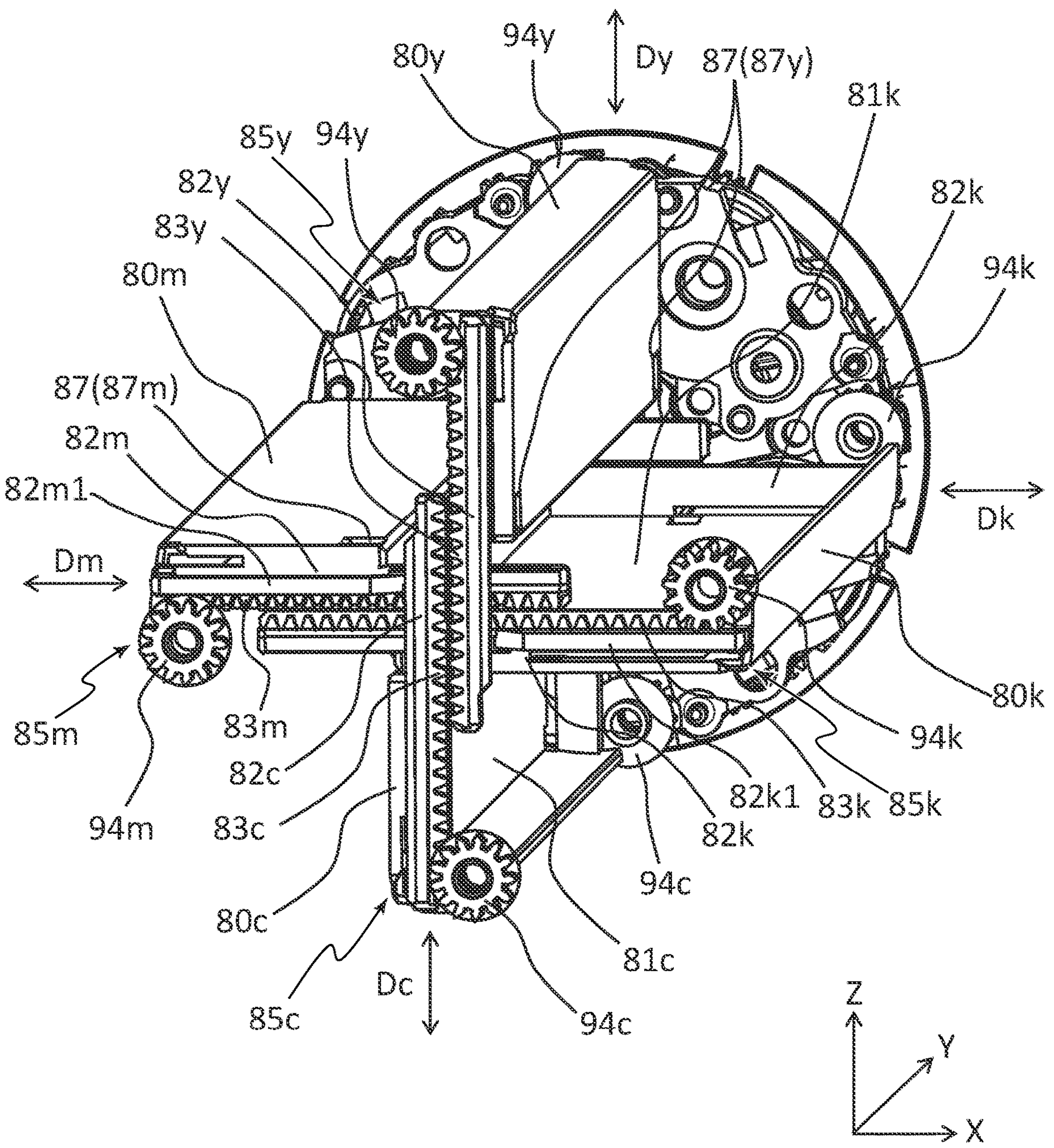
FIG. 8 is an explanatory diagram of the rotary body according to the first embodiment.

Here, as illustrated in FIGS. 7A and 7B, the rotary body 90 has projection portions 95 for holding the tray 80 at the accommodation position and holding the toner cartridge 70 at the attached position. As illustrated in FIG. 8, the tray 80 has recess portions 87 configured to be fit on the projection portions 95. FIGS. 7A and 7B illustrate projection portions 95*k* and 95*m* corresponding to the trays 80*k* and 80*m*, and FIG. 8 illustrates recess portions 87*y* and 87*m* of the trays 80*y* and 80*m*. The projection portion 95 and the recess portion 87 are provided for each of the trays 80*y* to 80*k*. The projection portion 95 is preferably urged in such a direction as to engage with the recess portion 87.

The projection portion 95 fits in the recess portion 87 of the tray 80, and thus the tray 80 is locked with respect to the rotary frame 90*f* As a result of this, the tray 80 stays in the accommodation position even when the rotary body 90 rotates, and thus movement of the toner cartridge 70 from the attached position can be suppressed. To be noted, in the case where the tray 80 is moved between the accommodation position and the detachment position by the moving device that will be described below, the projection portion 95 can be configured to be moved by the tray 80 and thus disengaged from the recess portion 87.

In the present embodiment, the door 14 is supported so as to be pivotable with respect to the apparatus body 1A. As illustrated in FIG. 7A, the door 14 is urged from the open position to the closed position by a spring 14*s*. The spring 14*s* is, for example, a tension spring, and urges the door 14 such that a moment in a counterclockwise direction in FIGS. 7A and 7B is generated about a support shaft 14*c* of the door 14.

The tray 80 pushes the door 14, and thus the door 14 takes the open state illustrated in FIG. 6B. This state can be referred to as a state in which the tray 80 is supported by the door 14. The door 14 supports at least part of the tray 80 projecting to the outside of the apparatus body 1A, and thus the toner cartridge 70 can be supported more stably. In other words, when the first toner cartridge (toner cartridge 70*k*) is at the first retracted position, the opening/closing member (door 14) at the open position supports the first support member (tray 80*k*). In addition, when the second toner cartridge (one of the toner cartridges 70*y* to 70*c*) is at the second retracted position, the opening/closing member (door 14) at the open position supports the second support member (one of the trays 80*y* to 80*c*).

To be noted, the door 14 is configured such that the door 14 at the open position comes in contact with part (for example, a lower edge 16*c* of the opening 16*a*) of the frame 16 of the apparatus body 1A and not to pivot downward beyond the open position. When the tray 80 is pulled back into the apparatus body 1A from the outside, the door 14 returns to the closed position by the urging force of the spring 14*s*.

The toner cartridge 70 is detachably held by the tray 80. Therefore, as illustrated in FIG. 6C, the user can perform a work (replacement work) of detaching the toner cartridge 70 from the tray 80 and attaching a new toner cartridge 70. To be noted, in the case of replacing a plurality of toner cartridges 70, the replacement work can be performed by repeating the operation described above.

FIGS. 7A and 7B illustrate a cross-section of the rotary body 90 and the surroundings thereof at the time of toner cartridge replacement. FIG. 7A illustrates a state at the time of replacing the black toner cartridge 70*k*. FIG. 7B illustrates a state at the time of replacing the magenta toner cartridge 70*m*.

The image forming apparatus 1 includes the moving device 85 illustrated in FIG. 8 that moves the toner cartridge 70 from the attached position to the retracted position. In the present embodiment, it can be said that the moving device 85 includes the tray 80. A moving device 85*k* including the tray 80*k* can be referred to as an example of a first moving device including a first support member. A moving device 85*m* including the tray 80*m* can be referred to as an example of a second moving device including a second support member.

Even when the toner cartridge 70 is at the retracted position, the tray 80 is coupled to the rotary body 90 (supported by the rotary body 90). To easily detach the toner cartridge 70 from the rotary body 90, it is preferable that the length by which the toner cartridge 70 projects from the rotary body 90 at the retracted position is large. Since the toner cartridge 70 is configured to be attachable to and detachable from the rotary body 90 via the tray 80, the toner cartridge 70 can be stably supported by the tray 80 even in the case where the length by which the toner cartridge 70 projects from the rotary body 90 is large.

The movement direction of the toner cartridge 70 in which the toner cartridge 70 moves from the attached position to the retracted position will be referred to as a retraction direction. In the present embodiment, the retraction direction of the toner cartridge 70 is a direction intersecting with the direction of the rotational axis 90C (Y direction). Therefore, as illustrated in FIGS. 7A and 7B, as viewed in the direction of the rotational axis 90C (Y direction), the retraction direction of the toner cartridge 70 is a direction orthogonal to the direction of the rotational axis 90C (Y direction). In addition, the retraction direction of the toner cartridge 70 can be referred to as a direction outward in the rotational radius direction of the rotary body 90, that is, a direction away from the rotational axis 90C.

As illustrated in FIGS. 7A and 7B, since the user detaches the toner cartridge 70 from the rotary body 90, it is preferable that the at least part of the toner cartridge 70 projects from the rotary body 90 at the time of detaching the toner cartridge 70. In the present embodiment, the entirety of the toner cartridge 70 projects from the rotary body 90 when the toner cartridge 70 is at the retracted position.

It can be said that when the rotary body 90 rotates about the rotational axis 90C, the rotational trajectory of the rotary body 90 matches a circumscribed circle of the rotary body 90 centered on the rotational axis 90C, that is, a virtual circle 90V indicated by a broken line in FIGS. 7A and 7B. When the toner cartridge 70 is at the retracted position, half the length or more of the toner cartridge 70 in the retracted direction is preferably outside the rotational trajectory of the rotary body 90. That is, as viewed in the rotational axis direction of the rotary, half the total length or more of the toner cartridge is preferably positioned outside the rotational trajectory of the rotary in the movement direction of the toner cartridge from the attached position to the retracted position. This applies to the toner cartridges 70 including the toner cartridge 70*k* serving as an example of the first cartridge and the toner cartridge 70*m* serving as an example of the second cartridge. In addition, in the present embodiment, the entirety of the toner cartridge 70 is outside the rotational trajectory (virtual circle 90V) of the rotary body 90 when the toner cartridge 70 is at the retracted position as illustrated in FIGS. 7A and 7B.

Further, to make it easier for the user to grab the toner cartridge 70, at least part of the toner cartridge 70 is preferably outside the image forming apparatus 1, that is, outside the apparatus body 1A when the toner cartridge 70 is at the retracted position. The outside of the apparatus mentioned herein refers to a space that is outside the image forming apparatus 1 (outside the apparatus body 1A) when the image forming apparatus 1 is used for, for example, an image forming operation on the sheet S.

In the present embodiment, the exterior surface of the apparatus body 1A is constituted by the exterior surface of the frame 16. That is, outside the apparatus can be also referred to as outside the frame 16. Therefore, a state in which at least part of the toner cartridge 70 is outside the apparatus can be also referred to as a state in which at least part of the toner cartridge 70 projects to the outside of the frame 16 through the opening 16*a* of the frame 16 of the apparatus body 1A.

In the present embodiment, when the door 14 is at the closed position, the opening 16*a* of the frame 16 of the apparatus body 1A is covered by the door 14. Further, the exterior surface 14*a* of the door 14 at the closed position constitutes part of the exterior surface of the apparatus body 1A. In this case, outside of the apparatus refers to the outside of the exterior surface 14*a* of the door 14 at the closed position. That is, in the case where the position of the exterior surface 14*a* of the door 14 at the closed position is referred to as an exterior position, at least part of the toner cartridge 70 is positioned more outward than the exterior position with respect to the apparatus body 1A when the toner cartridge 70 is at the retracted position.

In other words, at least part of the toner cartridge 70 is positioned in a space that would be outside the apparatus body 1A if the door 14 was at the closed position. Further, at least part of the toner cartridge 70 is positioned downstream of the exterior position in the retraction direction of the toner cartridge 70.

In addition, in the case where the side surface 16*b* having the opening 16*a* is the front surface of the apparatus body 1A, it can be said at least part of the toner cartridge 70 projects to the front side more than the exterior surface on the front side of the apparatus body 1A when the toner cartridge 70 is at the retracted position. In this case, the user can easily access the toner cartridge 70 from the front side of the image forming apparatus and replace the toner cartridge 70.

To be noted, when the toner cartridge 70 is at the retracted position, half the length or more of the toner cartridge 70 in the retraction direction is preferably outside the apparatus. That is, as viewed in the rotational axis direction of the rotary, half the total length or more of the toner cartridge is preferably positioned outside the body frame in the movement direction of the toner cartridge from the attached position to the retracted position in a state in which the toner cartridge is at the retracted position. This applies to the toner cartridges 70 including the toner cartridge 70*k* serving as an example of the first toner cartridge and the toner cartridge 70*m* serving as an example of the second toner cartridge. In addition, the entirety of the toner cartridge 70 is preferably outside the apparatus when the toner cartridge 70 is at the retracted position. To be noted, although the exterior surface 14*a* of the door 14 and the side surface 16*b* constitute the exterior surface on the front side of the apparatus body 1A in the present embodiment, the configuration of the door 14 is not limited to this. For example, the size of the door 14 may be set so as to cover the entirety of the side surface 16*b*. In this case, the exterior surface 14*a* of the door 14 constitutes the exterior surface on the front side of the apparatus body 1A.

The tray 80 includes a cartridge holding portion 81 illustrated in FIGS. 3 and 6C that holds the toner cartridge 70. The cartridge holding portion 81 is an attached portion to which the toner cartridge 70 is attached. When the tray 80 is at the detachment position, the entirety of the cartridge holding portion 81 is preferably outside the rotational trajectory of the rotary body 90 in the retraction direction. When the tray 80 is at the detachment position, half the length or more of the cartridge holding portion 81 is preferably outside the apparatus in the retraction direction.

Here, as described above, the toner cartridge 70*k* and the tray 80*k* are larger in size than the other toner cartridges 70*y* to 70*c* and the other trays 80*y* to 80*c*. Therefore, as illustrated in FIGS. 7A and 7B, in the present embodiment, the movement amount of the tray 80 in toner cartridge replacement is changed in accordance with the size of the toner cartridge 70.

Specifically, as illustrated in FIG. 7A, the movement distance of the tray 80*k* (first support member) from the accommodation position (first accommodation position) to the detachment position (first detachment position) is L1. The movement distance of the tray 80*m* (second support member) from the accommodation position to the detachment position (third detachment position) is L2. Although a state in which the toner cartridge 70*m* and the tray 80*m* are moved is illustrated in FIG. 7B, the movement distance of the trays 80*y* and 80*c* from the accommodation position to the detachment position is also L2. In this case, L1 is larger than L2. In other words, it can be said that the movement distance of the first support member in the case where the first toner cartridge moves from the first attached position to the first retracted position is larger than the movement distance of the second support member in the case where the second toner cartridge moves from the second attached position to the second retracted position.

In addition, as illustrated in FIG. 7A, in a state in which the tray 80*k* is at the detachment position and the toner cartridge 70*k* is at the retracted position, the toner cartridge 70*k* projects from the exterior surface of the apparatus body 1A to the outside of the apparatus by a distance P1. In the present embodiment, the tray 80*k* also projects from the exterior surface of the apparatus body 1A to the outside of the apparatus by the distance P1.

In addition, as illustrated in FIG. 7B, in a state in which the tray 80*m* is at the detachment position and the toner cartridge 70*m* is at the retracted position, the toner cartridge

70*m* projects from the exterior surface of the apparatus body 1A to the outside of the apparatus by a distance P2. In the present embodiment, the tray 80*m* also projects from the exterior surface of the apparatus body 1A to the outside of the apparatus by the distance P2. To be noted, the toner cartridges 70*y* and 70*c* also project from the exterior surface of the apparatus body 1A to the outside of the apparatus by the distance P2.

The distance P1 described above is larger than the distance P2. That is, the length by which the first toner cartridge at the first retracted position projects through the opening 16*a* of the apparatus body 1A will be referred to as a first length (P1), and the length by which the second toner cartridge at the second retracted position projects through the opening 16*a* will be referred to as a second length (P2). In this case, it can be said that the first length is larger than the second length.

It is more preferable in terms of strength that the distance P2 by which the toner cartridges 70*y* to 70*c* smaller in size than the toner cartridge 70*k* project to the outside of the apparatus at the retracted position is smaller than the distance P1 by which the toner cartridge 70*k* projects to the outside at the retracted position. The reason for this is as follows. When the toner cartridge 70 is at the retracted position, at least part of the toner cartridge 70 projects to the outside of the apparatus from the outside of the rotational trajectory of the rotary body 90 or the exterior surface of the apparatus body 1A. At this time, the tray 80 supports the weight of the toner cartridge 70 in a state in which one side thereof is supported by the rotary body 90. Therefore, reducing the distance P2 by which the toner cartridges 70*y* to 70*c* project to the outside of the apparatus at the retracted position can reduce the load on the trays 80*y* to 80*c* or guide portions 97 of the rotary body 90 supporting the trays 80*y* to 80*k*. In addition, since the toner cartridges 70*y* to 70*c* are smaller than the toner cartridge 70*k*, the operability in the cartridge replacement for the trays 80*y* to 80*c* can be maintained even if the distance P2 is set to be smaller than the distance P1.

Tray Arrangement in Rotary

Figure 9:
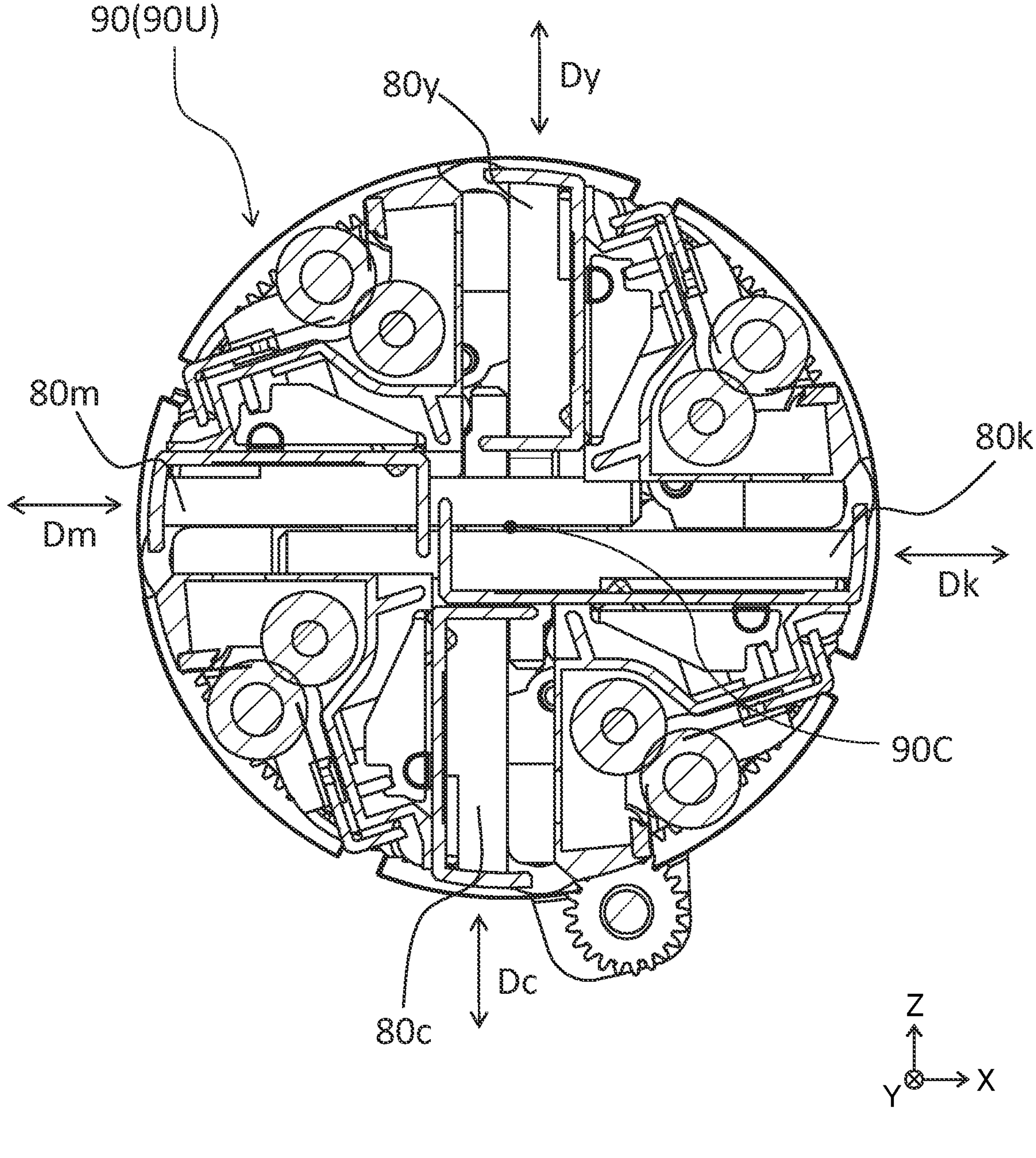
FIG. 9 is an explanatory diagram of the rotary body according to the first embodiment.
Figure 10:
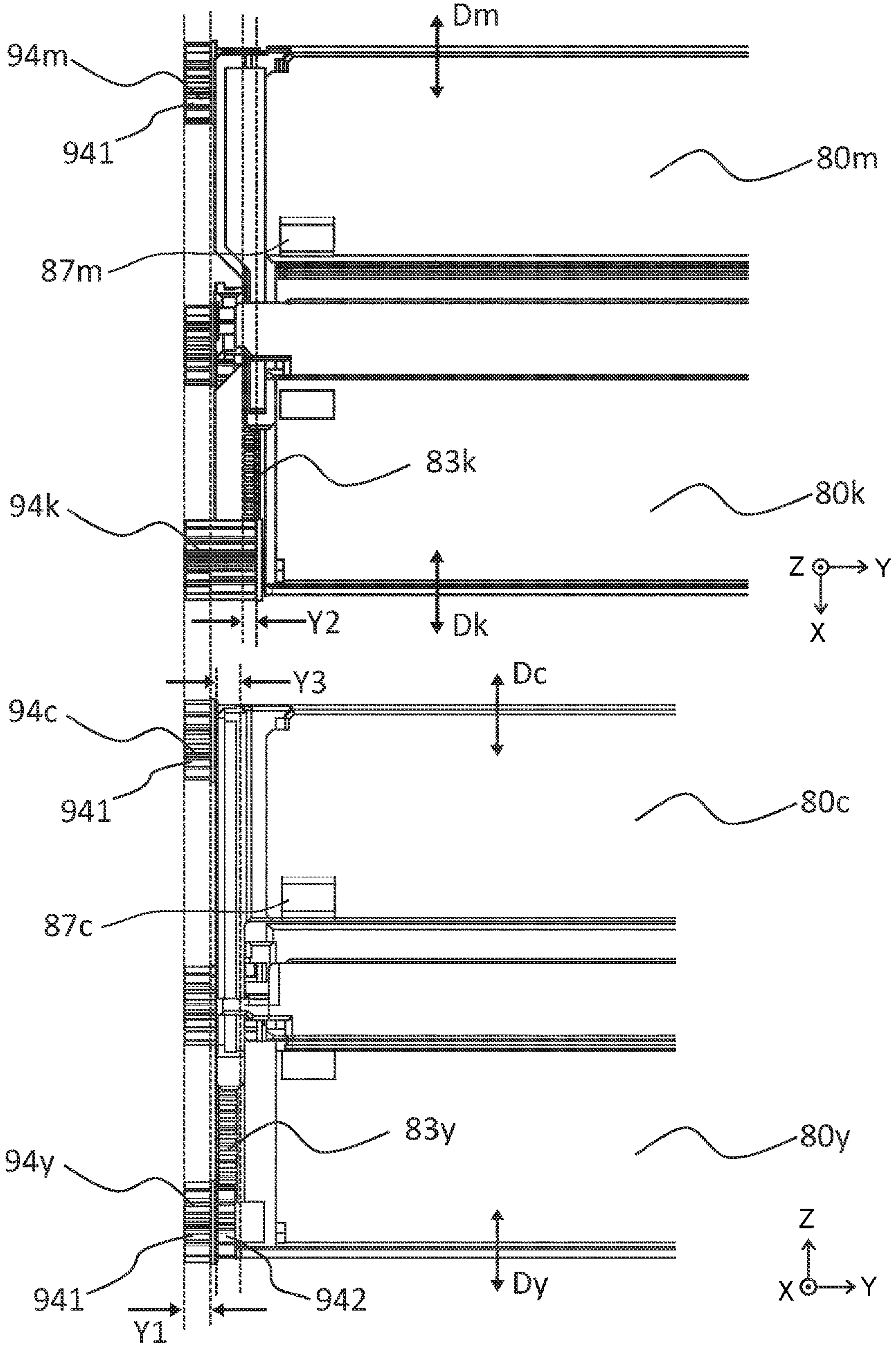
FIG. 10 is an explanatory diagram of the rotary body according to the first embodiment.

The arrangement of the trays 80*y* to 80*k* in the rotary body 90 will be described with reference to FIGS. 8, 9, and 10. FIG. 8 is a perspective view illustrating the arrangement of the trays 80*y* to 80*k* in the rotary body 90. FIG. 9 is a section view illustrating the arrangement of the trays 80*y* to 80*k* in the rotary body 90. FIG. 10 is a diagram illustrating the member arrangement of the trays 80*y* to 80*k* on one end side in the Y direction. To be noted, FIG. 9 illustrates a cross-section of the rotary body 90 taken along a virtual plane orthogonal to the rotational axis 90C of the rotary body 90. In addition, the top half of FIG. 10 is a diagram of the rotary body 90 and the trays 80*m* and 80*k* of FIG. 8 as viewed from the upper-right side (+Z side) of FIG. 8, and the lower half of FIG. 10 is a diagram of the rotary body 90 and the trays 80*c* and 80*y* of FIG. 8 as viewed from the left side (−X) side of FIG. 8.

As illustrated in FIG. 8, the trays 80*y* to 80*k* are respectively provided with cartridge holding portions 81*y* to 81*k* and guided portions 82*y* to 82*k*.

The toner cartridges 70*y* to 70*k* are respectively attached to the cartridge holding portions 81*y* to 81*k*. The cartridge holding portions 81*y* to 81*k* respectively accommodate at least part of the toner cartridges 70*y* to 70*k* attached thereto.

The guided portions 82*y* to 82*k* are provided at respective end portions of the trays 80*y* to 80*k* such that the cartridge holding portions 81*y* to 81*k* are each interposed therebetween in the Y direction. The guided portions 82*y* to 82*k* are each a thin and long member extending in a direction orthogonal to the rotational axis of the rotary body 90.

Figure 11A:
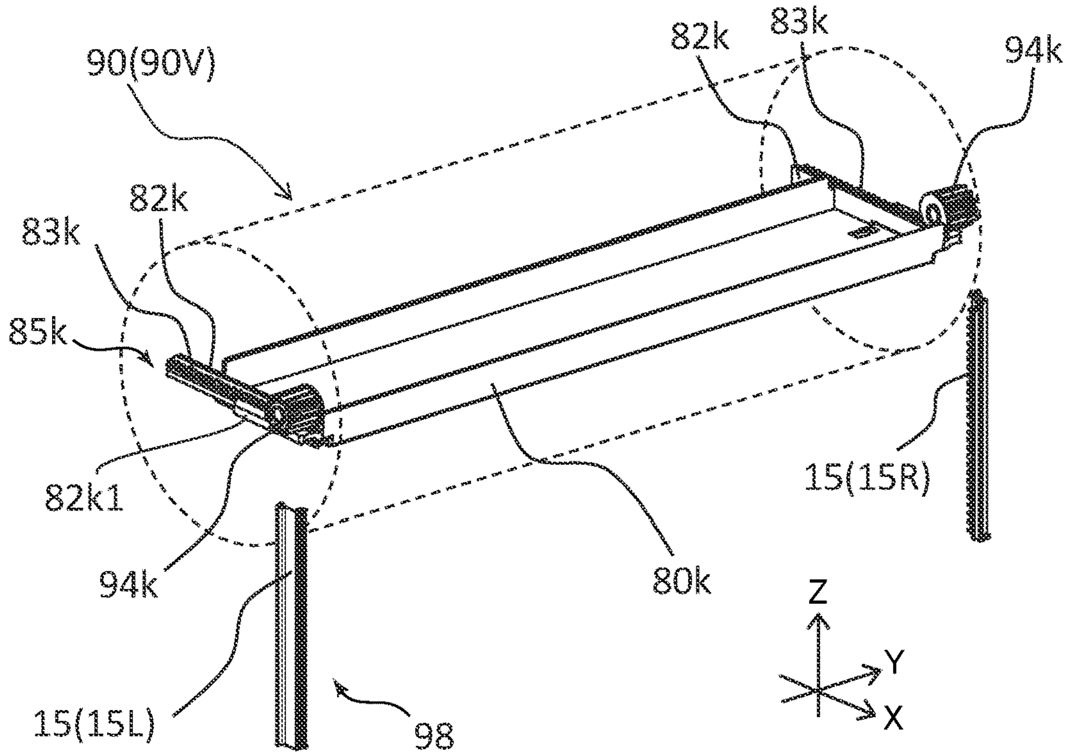
FIGS. 11A and 11B are each an explanatory diagram of elements related to the movement of the tray according to the first embodiment.
Figure 11B:
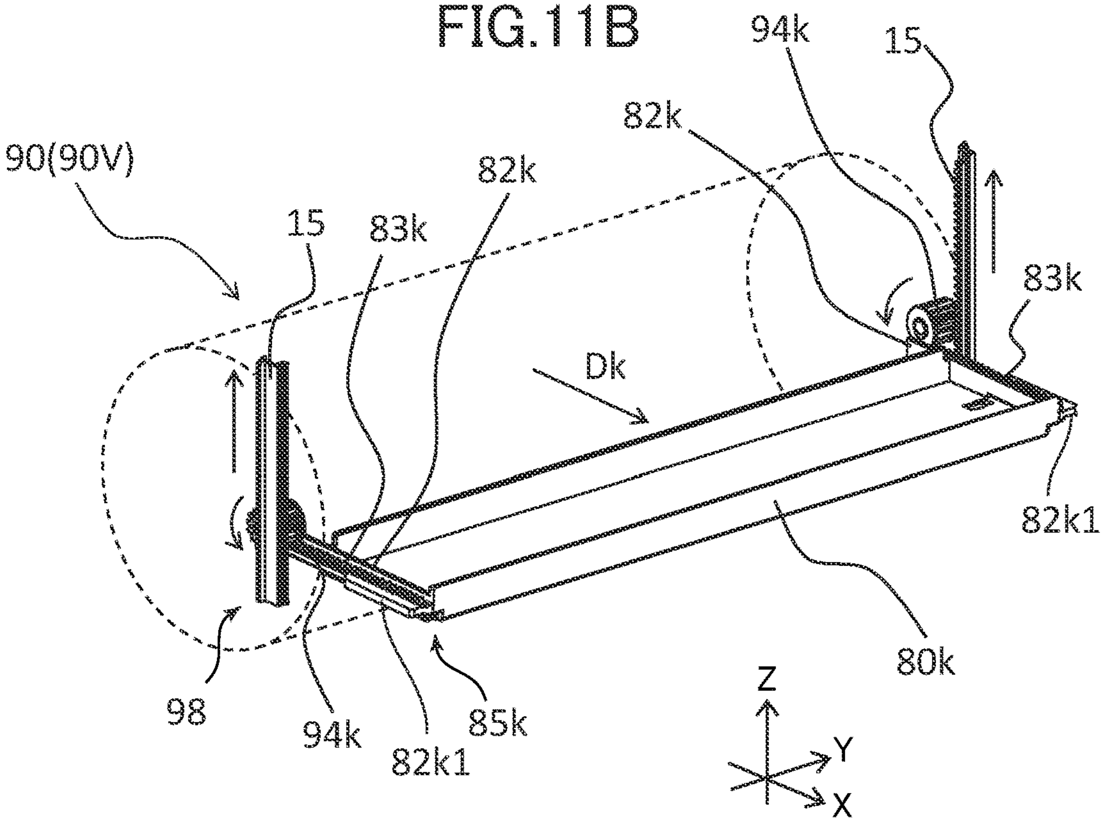

In the present embodiment, a reinforcing rib 82*k*1 is formed on part of the guided portion 82*k* in a movement direction Dk of the tray 80*k*, and a reinforcing rib 82*m*1 is formed on part of the guided portion 82*m* in a movement direction Dm of the tray 80*m* as illustrated in FIGS. 11A and 11B. The reinforcing ribs 82*k*1 and 82*m*1 are thin and long rib shapes (ridges) projecting outward in the Y direction from the guided portions 82*k* and 82*m* of the respective end portions of the trays 80*k* and 80*m* in the Y direction and extending in the movement directions Dk and Dm of the trays 80*k* and 80*m*. The reinforcing ribs 82*k*1 and 82*m*1 improve the stiffness of the guided portions 82*k* and 82*m*.

To be noted, although the lengths of the reinforcing ribs 82*m*1 and 82*k*1 in the present embodiment are restricted so as to avoid the guided portions 82*y* and 82*c*, the reinforcing ribs 82*m*1 and 82*k*1 may be provided for the entire lengths of the guided portions 82*m* and 82*k* unless interference with the guided portions 82*y* and 82*c* occurs. Reinforcing ribs may be added to the guided portions 82*y* and 82*c*. In addition, in the case where the stiffness of the guided portions 82*m* and 82*k* is sufficient, a configuration in which the reinforcing ribs 82*m*1 and 82*k*1 are not provided may be employed.

The guided portions 82*y* to 82*k* have rack portions (rack gears) 83*y* to 83*k* formed therein. In addition, pinion gears 94*y* to 94*k* are rotatably held in the rotary body 90. The pinion gears 94*y* to 94*k* are respectively engaged with the rack portions 83*y* to 83*k* in a manner capable of transmitting a driving force.

The rack portions 83*y* to 83*k* and the pinion gears 94*y* to 94*k* are part of the moving devices 85*y* to 85*k* configured to move the toner cartridges 70*y* to 70*k* from the attached position to the retracted position. In addition, it can be said that the rack portions 83*y* to 83*k* and the pinion gears 94*y* to 94*k* are part of a driven device driven by the driving device 98 of the apparatus body 1A. It can be said that the pinion gears 94*y* to 94*k* are rotatable bodies (rotary members) that rotate to move the trays 80*y* to 80*k* with respect to the rotary body 90.

The pinion gears 94*y* to 94*k* and the rack portions 83*y* to 83*k* function as driven portions for the moving devices 85*y* to 85*k* of the rotary body 90 to receive the driving force from the driving device 98 of the apparatus body 1A. The pinion gear 94*k* and the rack portion 83*k* are examples of a first pinion gear and a first rack gear constituting at least part of a first driven portion included in a first moving device. The pinion gear 94*m* and the rack portion 83*m* are examples of a second pinion gear and a second rack gear constituting at least part of a second driven portion included in a second moving device.

The rotary body 90 includes guide portions 97 illustrated in FIGS. 7A and 7B that respectively engage with the guided portions 82*y* to 82*k*. FIG. 7A illustrates the guide portion 97 (97*k*) that engages with the guided portion 82*k* of the tray 80*k*, and FIG. 7B illustrates the guide portion 97 (97*m*) that engages with the guided portion 82*m* of the tray 80*m*. The rotary body 90 includes similar guide portions that respectively engage with the guided portions 82*y* and 82*c* of the trays 80*y* and 80*c*. In addition, although the guide portions 97 provided on one side (+Y side) of the rotary body 90 in the Y direction are illustrated in FIGS. 7A and 7B, similar guide portions 97 are also provided on the other side (−Y side) of the rotary body 90 in the Y direction.

When the tray 80 moves between the accommodation position and the detachment position, the guide portion 97 maintains the state of engaging with the guided portion 82 in at least part of the movement range, and guides the movement direction of the tray 80. In the present embodiment, the guide portion 97 maintains the state of engaging with the guided portion 82*k* in the entirety of the movement range of the tray 80*k* between the accommodation position and the detachment position. In addition, in the present embodiment, the guide portion 97 maintains the state of engaging with the guided portion 82*m* in the entirety of the movement range of the tray 80*m* between the accommodation position and the detachment position.

In addition, as illustrated in FIGS. 8 and 9, the four trays 80*y* to 80*k* are disposed in the rotary body 90 so as to overlap each other as will be described in detail below.

When the pinion gears 94*y* to 94*k* rotate, the rack portions 83*y* to 83*k* and the trays 80*y* to 80*k* move with respect to the rotary body 90. As illustrated in FIG. 9, the four trays 80*y* to 80*k* are arranged such that the movement directions thereof with respect to the rotary body 90 are rotated by 90° from each other. Therefore, the tray 80*y* and the tray 80*c* are held so as to be slidable in substantially the same direction (parallel directions) as each other, and the tray 80*m* and the tray 80*k* are held so as to be slidable in substantially the same direction (parallel directions) as each other. The movement directions of sliding of the trays 80*y* to 80*k* are regulated by the engagement between the guide portions 97 and the guided portions 82*y* to 82*k* described above.

To be noted, the trays 80*y* to 80*k* move to the outside of the apparatus through the opening 16*a*. When the trays 80*y* to 80*k* each move to the outside of the apparatus through the opening 16*a*, the movement directions of the trays are substantially the same (parallel).

As illustrated in FIG. 9, the trays are disposed such that with respect to the movement direction Dk of the tray 80*k*, the range in which the tray 80*k* is disposed overlaps with the range in which the tray 80*y* is disposed and the range in which the tray 80*c*. In addition, with respect to the movement direction Dk of the tray 80*k*, the range in which the tray 80*k* is disposed overlaps with the rotational axis 90C of the rotary body 90. That is, it can be said that the toner cartridge 70*k* held by the cartridge holding portion 81*k* of the tray 80*k* overlaps with the rotational axis 90C of the rotary body 90 illustrated in FIG. 4B.

In contrast, the trays are disposed in a displaced manner such that with respect to the movement direction Dm of the tray 80*m*, the range in which the tray 80*m* is disposed does not overlap with the range in which the tray 80*y* is disposed and the range in which the tray 80*c* is disposed. Further, the trays are disposed in a displaced manner such that with respect to a movement direction Dy of the tray 80*y*, the range in which the tray 80*y* is disposed does not overlap with the range in which the tray 80*m* is disposed and the range in which the tray 80*k* is disposed. Similarly, the trays are disposed in a displaced manner such that with respect to a movement direction Dc of the tray 80*c*, the range in which the tray 80*c* is disposed does not overlap with the range in which the tray 80*m* is disposed and the range in which the tray 80*k* is disposed.

The positional relationship between the trays 80 can be also expressed as follows. As viewed in the movement direction Dy of the tray 80*y*, the tray 80*y* and the tray 80*k* overlap with each other, but the tray 80*y* and the tray 80*m* do not overlap with each other. As viewed in the movement direction Dm of the tray 80*m*, the tray 80*m* and the tray 80*k* overlap with each other, but the tray 80*m* and the trays 80*y* and 80*c* do not overlap with each other. As viewed in the movement direction Dc of the tray 80*c*, the tray 80*c* and the tray 80*k* overlap with each other, but the tray 80*c* and the tray 80*m* do not overlap with each other.

Here, two elements (such as members, parts, and units) overlapping as viewed in a specific direction refers to a projected region of one element and a projected region of the other element at least partially overlapping with each other in the case where the elements are orthogonally projected onto a virtual plane orthogonal to the specific direction.

As illustrated in FIGS. 8 and 10, with respect to the direction of the rotational axis 90C (Y direction), a range in which the rack portion 83*m* and the guided portion 82*m* are disposed and a range in which the rack portion 83*k* and the guided portion 82*k* are disposed overlap with each other at least partially. That is, in the present embodiment, it can be said that with respect to the rotational axis direction of the rotary (Y direction), a range in which the first rack gear (rack portion 83*k*) is disposed and a range in which the second rack gear (rack portion 83*m*) is disposed overlap with each other at least partially. Therefore, as compared with a layout in which the rack portion 83*m* and the guided portion 82*m* do not overlap with the rack portion 83*k* and the guided portion 82*k*, the rack portions 83*m* and 83*k* and the guided portions 82*m* and 82*k* can be arranged in a smaller space in the Y direction.

With respect to the direction of the rotational axis 90C (Y direction), a range in which the rack portion 83*y* and the guided portion 82*y* are disposed and a range in which the rack portion 83*c* and the guided portion 82*c* are disposed overlap with each other at least partially. That is, in the present embodiment, it can be said that with respect to the rotational axis direction of the rotary (Y direction), a range in which the third rack gear (rack portion 83*y*) is disposed and a range in which the fourth rack gear (rack portion 83*c*) is disposed overlap with each other at least partially. Therefore, as compared with a layout in which the rack portion 83*y* and the guided portion 82*y* do not overlap with the rack portion 83*c* and the guided portion 82*c*, the rack portions 83*y* and 83*c* and the guided portions 82*y* and 82*c* can be arranged in a smaller space in the Y direction.

Here, an engagement position between the rack portion 83 and the pinion gear 94 will be described with reference to FIG. 10. A top half portion of FIG. 10 illustrates an engagement position between the rack portion 83*k* and the pinion gear 94*k*. A lower half portion of FIG. 10 illustrates an engagement position between the rack portion 83*y* and the pinion gear 94*y*.

In a region Y1 in the drawings in the direction of the rotational axis 90C of the rotary body 90 (Y direction), the driving force transmitted from the motor M2 illustrated in FIG. 2 serving as a drive source to a transmission device that will be described below is transmitted to the pinion gears 94*y* to 94*k*. In a region Y2 in the drawings in the Y direction, the pinion gear 94*k* is engaged with the rack portion 83*k* in a manner capable of transmitting the driving force. In a region Y3 in the drawings in the Y direction, the pinion gear 94*y* is engaged with the rack portion 83*y* in a manner capable of transmitting the driving force. To be noted, the rack portion 83*m* is engaged with the pinion gear 94*m* illustrated in FIG. 8 in the region Y2 similarly to the rack portion 83*k* in a manner capable of transmitting the driving force. The rack portion 83*c* is engaged with the pinion gear 94*c* illustrated in FIG. 8 in the region Y3 similarly to the rack portion 83*y* in a manner capable of transmitting the driving force.

Here, the regions Y2 and Y3 are at different positions in the Y direction, that is, are displaced from each other in the Y direction. In addition, the region Y1 is at a position different from both the regions Y2 and Y3 in the Y direction. That is, the region Y1 is displaced from the regions Y2 and Y3 in the Y direction.

Further, in a state in which the toner cartridges 70*y* and 70*c* are at the attached position, with respect to a movement direction of the rack portion 83*y* (movement direction Dy of the tray 80*y*), a range in which the rack portion 83*y* is disposed and a range in which the rack portion 83*c* is disposed overlap with each other at least partially. In the present embodiment, since the movement directions Dy and Dc of the trays 80*y* and 80*c* are substantially the same (parallel), also with respect to the movement direction Dc of the tray 80*c*, a range in which the rack portion 83*y* is disposed and a range in which the rack portion 83*c* is disposed overlap with each other at least partially. Therefore, in a state in which the toner cartridges 70*y* and 70*c* are at the attached position, the tooth surface of the rack portion 83*y* faces the tooth surface of the rack portion 83*c* in a direction (left-right direction of FIG. 8) orthogonal to the movement directions Dy and Dc of the rack portions 83*y* and 83*c*.

Further, in a state in which the toner cartridges 70*m* and 70*k* are at the attached position, with respect to a movement direction of the rack portion 83*m* (movement direction Dm of the tray 80*m*), a range in which the rack portion 83*m* is disposed and a range in which the rack portion 83*k* is disposed overlap with each other at least partially. In the present embodiment, since the movement directions Dm and Dk of the trays 80*m* and 80*k* are substantially the same (parallel), also with respect to the movement direction Dk of the tray 80*k*, a range in which the rack portion 83*m* is disposed and a range in which the rack portion 83*k* is disposed overlap with each other at least partially. Therefore, in a state in which the toner cartridges 70*m* and 70*k* are at the attached position, the tooth surface of the rack portion 83*m* faces the tooth surface of the rack portion 83*k* in a direction (up-down direction of FIG. 8) orthogonal to the movement directions Dm and Dk of the rack portions 83*m* and 83*k*.

Figure 12A:
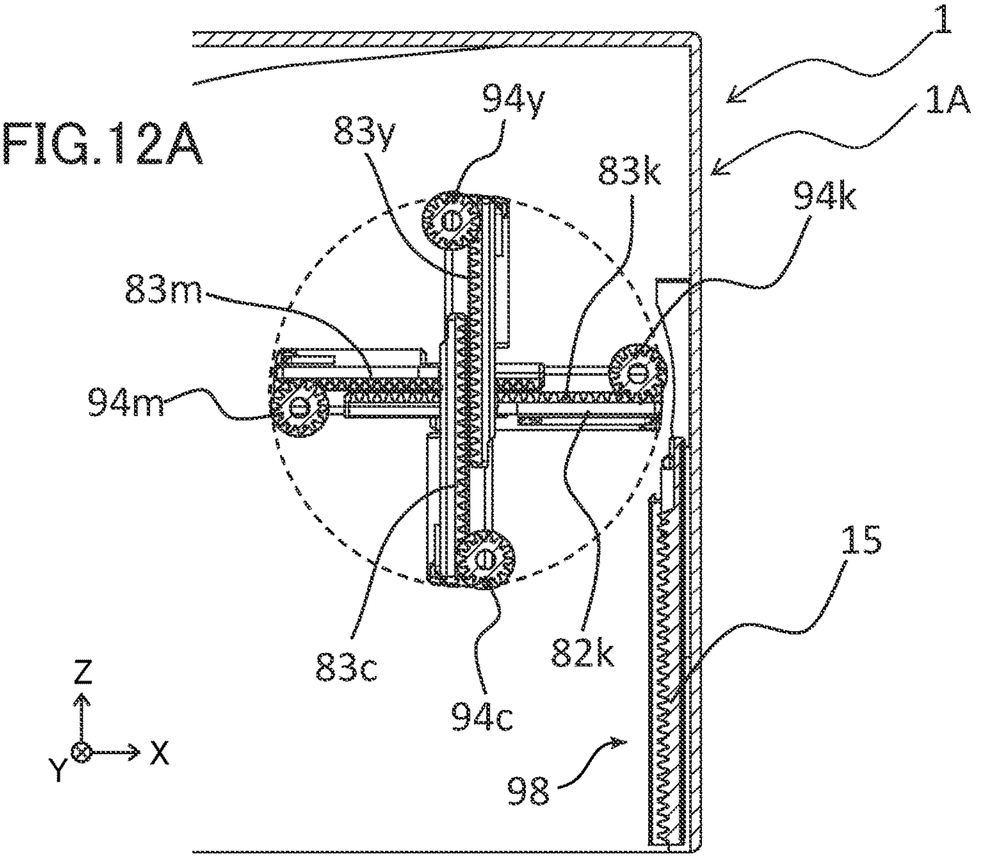
FIGS. 12A and 12B are each an explanatory diagram of elements related to the movement of the tray according to the first embodiment.

In addition, as also illustrated in FIG. 12A that will be described later, the rack portion 83*y* overlaps with the rack portions 83*m* and 83*k* as viewed in the direction (Y direction) of the rotational axis 90C. As viewed in the direction (Y direction) of the rotational axis 90C, the rack portion 83*m* overlaps with the rack portions 83*y* and 83*c*. As viewed in the direction (Y direction) of the rotational axis 90C, the rack portions 83*c* and 83*m* overlap with the rack portion 83*k*. As viewed in the direction of the rotational axis 90C (Y direction), the rack portions 83*k* and 83*y* overlap with the rack portion 83*c*. In other words, it can be said that with respect to the rotational axis direction of the rotary (Y direction), a range in which the first rack gear (rack portion 83*k*) is disposed does not overlap with a range in which the second rack gear (rack portion 83*y*) is disposed. In addition, it can be said that, as viewed in the rotational axis direction of the rotary (Y direction), in a state in which the first toner cartridge 70*k* is at the first attached position and the second toner cartridge 70*y* is at the second attached position, the first rack gear (rack portion 83*k*) and the second rack gear (rack portion 83*y*) overlap with each other.

As described above, since the positions where the rack portions 83*k* and 83*m* are disposed and the positions where the rack portions 83*y* and 83*c* are disposed are different in the Y direction, the rack portions can be arranged such that the rack portions 83*y* and 83*c* overlap with the rack portions 83*m* and 83*k* as viewed in the Y direction.

As a result of this, the space for arranging the four trays in the rotary body 90 can be reduced, and thus the size of the rotary body 90 in the rotational radius direction can be reduced. That is, when it is attempted to arrange the rack portions 83 such that the movement distances of the trays 80*y* to 80*k* are equivalent to those of the present embodiment and the rack portions 83 do not overlap with each other as viewed in the Y direction, the area required for the arrangement of the four rack portions is large as viewed in the Y direction. As compared with such a configuration, as a result of arranging the plurality of rack portions 83 in a displaced manner in the Y direction such that the rack portions 83 overlap with each other as viewed in the Y direction, the installation area for the rack portions 83 as viewed in the Y direction can be reduced.

In addition, in the present embodiment, two pairs of two of the four rack portions 83*y* to 83*k* are arranged in a displaced manner in the Y direction. That is, it can be said that with respect to in the rotational axis direction of the rotary (Y direction), the range in which the first rack gear is disposed and the range in which the second rack gear is disposed overlap with each other, and the range in which the third rack gear is disposed and the range in which the fourth rack gear is disposed overlap with each other. In addition, it can be said that with respect to the Y direction, the range in which the first rack gear and the second rack gear are disposed does not overlap with the range in which the third rack gear and the fourth rack gear are disposed. As a result of this, the size of the rotary body 90 in the Y direction can be reduced as compared with a case where all the four rack portions 83*y* to 83*k* are arranged in a displaced manner in the Y direction.

Moving Elements of Tray

Figure 12B:
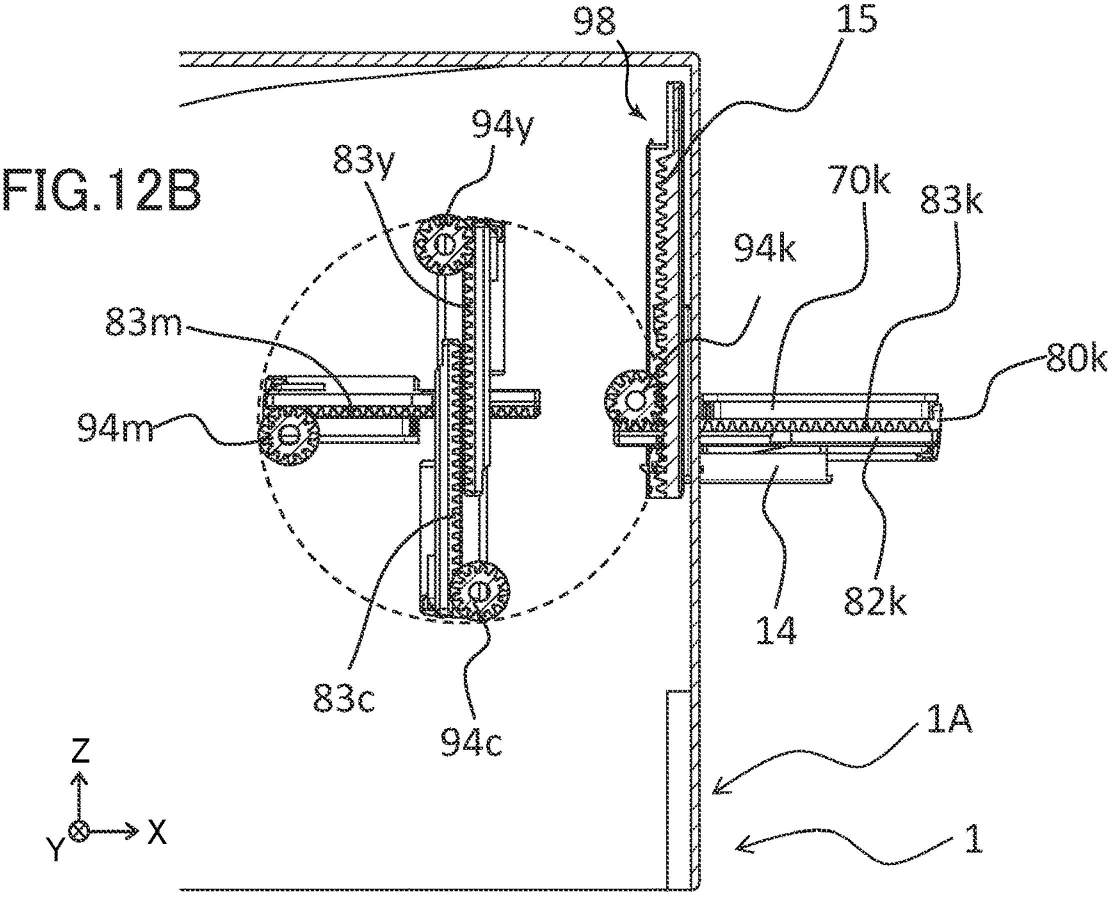

Elements related to the movement of the trays 80*y* to 80*k* disposed in the rotary body 90 will be described with reference to FIGS. 11A, 11B, 12A, and 12B. FIGS. 11A and 11B are each a perspective view of elements related to the movement of the tray 80*k*. FIGS. 12A and 12B are each a section view of elements related to the movement of the tray 80*k*.

In the present embodiment, the trays 80*y* to 80*k* are respectively driven by receiving the driving force of the motor M2 transmitted to the pinion gears 94*y* to 94*k* via the driving racks 15L and 15R serving as transmission devices. Here, the elements for moving the tray 80*k* with respect to the rotary body 90 will be described, and since the elements for moving the trays 80*y* to 80*c* with respect to the rotary body 90 are substantially the same as the elements for moving the tray 80*k*, description thereof will be omitted.

FIG. 11A illustrates a state in which the tray 80*k* is inside the rotary body 90, that is, in a state in which the toner cartridge 70*k* is attached to the developing unit 50*k*. That is, FIG. 11A illustrates a state in which the tray 80*k* is at the accommodation position, and corresponds to a state in which the toner cartridge 70*k* is at the attached position with respect to the developing frame 53*k* illustrated in FIG. 4A. FIG. 11B illustrates a state in which the tray 80*k* has slid to the outside of the rotary body 90. That is, FIG. 11B illustrates a state in which the tray 80*k* is at the attached position, and corresponds to a state in which the toner cartridge 70*k* is at the retracted position with respect to the developing frame 53*k* illustrated in FIG. 4B.

The apparatus body 1A of the present embodiment includes the driving racks 15L and 15R serving as driving gears that drive the pinion gears 94. The driving racks 15 are each driven by the motor M2 via the unillustrated drive transmission mechanism.

As described above, two rack portions 83*k* are formed at respective end portions of the tray 80*k* in the Y direction.

Two pinion gears 94k and the driving racks 15L and 15R are disposed at positions respectively corresponding to the rack portions 83k at the respective end portions. That is, the apparatus body 1A of the present embodiment includes the driving racks 15L and 15R serving as the first driving gear and the second driving gear. It can be said that the driving rack 15L is an example of a first driving gear, and the driving rack 15R is an example of a second driving gear. However, this numbering is merely used for the sake of convenience of description, and can be appropriately interchanged in principle. In the case where there is no need to distinguish the driving racks 15L and 15R from each other, the driving racks will be each described as a "driving rack 15".

The rack portions 83 of the present embodiment are configured as a pair of rack gears, and the pinion gears 94 of the present embodiment are configured as a pair of pinion gears. The pair of rack gears and the pair of pinion gears are disposed on the two end sides (i.e., one end side and the other end side) of the support member (tray 80) in the Y direction in the present embodiment, but the pair of rack gears and the pair of pinion gears may be disposed at other positions. The rack portions 83k and the pinion gears 94k of the moving device 85k corresponding to the tray 80k can be respectively referred to as examples of a first pair of rack gears and a first pair of pinion gears. The rack portions 83y to 83c and the pinion gears 94y to 94c of the moving devices 85y to 85c respectively corresponding to the other trays 80y to 80c can be respectively referred to as examples of second pairs of rack gears and second pairs of pinion gear.

One of the pair of rack gears engages with one of the pair of pinion gears, and the other of the pair of rack gears engages with the other of the pair of pinion gears. At least one of the pair of pinion gears is driven by the driving rack 15L serving as a first driving rack. In the present embodiment, two of the pair of pinion gears are simultaneously driven by the driving racks 15L and 15R serving as a first driving rack and a second driving rack. As a result of this, rotation of the tray 80 is less likely to occur, and thus stable movement of the toner cartridge 70 is made possible.

To be noted, a configuration in which the tray 80 includes one rack portion 83 and is moved by one driving rack 15 via one pinion gear 94 may be employed.

The tray 80k is held to be slidable in a direction parallel to the guided portion 82k (that is, the movement direction Dk) with respect to the rotary body 90. The driving rack 15 is held to be slidable in a direction intersecting with the movement direction Dk of the tray 80k with respect to the apparatus body 1A. The driving rack 15 is configured to slide (reciprocate) in a first direction (vertically upward direction in the present embodiment) and a second direction (vertically downward direction in the present embodiment) opposite to the first direction, with respect to the apparatus body 1A. That is, the movement direction of the driving rack 15 of the present embodiment is a direction intersecting with (preferably orthogonal to) both the movement direction Dk of the tray 80k and the direction of the rotational axis 90C of the rotary body 90 (Y direction).

A tray moving operation of sliding the tray 80k between the accommodation position and the detachment position will be described with reference to FIGS. 11A and 11B. The tray moving operation of the tray 80k is performed by the motor M2 illustrated in FIG. 2, an unillustrated drive transmission mechanism, the driving rack 15, the pinion gear 94k, and the rack portion 83k.

First, a tray moving operation (tray pull-out operation) of detaching the toner cartridge 70k from the rotary body 90 will be described. In a state before the tray pull-out operation is started, the driving rack 15 illustrated in FIG. 11A is positioned below a position where the driving rack 15 engages with the pinion gear 94k. In addition, as described above, in the replacement operation of the toner cartridge 70k, the rotary body 90 takes the replacement posture illustrated in FIG. 4B for the toner cartridge 70k.

When the tray pull-out operation is started, the driving racks 15 are slid upward with respect to the apparatus body 1A by the driving force of the motor M2. In the course of movement of the driving racks 15, the driving racks 15 engage with the pinion gears 94k, and the pinion gears 94k are rotationally driven.

As illustrated in FIG. 11B, the pinion gears 94k are rotationally driven in an arrow direction in FIG. 11B, and thus the driving force is input to the rack portions 83k engaged with the pinion gears 94k. As a result of this, the tray 80k is pushed to the outside of the apparatus, and moves from the accommodation position to the detachment position with respect to the rotary body 90. The movement direction of the tray 80k in this movement is guided to the predetermined movement direction Dk by the engagement between the guided portion 82k and the guide portion 97k of the rotary body 90 illustrated in FIG. 7A. As a result of the tray 80k moving from the accommodation position to the detachment position, the toner cartridge 70k is moved from the attached position to the retracted position with respect to the developing unit 50k.

In a state in which the tray 80k is positioned at the detachment position and the toner cartridge 70k is positioned at the retracted position, the user can attach and detach the toner cartridge 70k to and from the tray 80k.

The tray moving operation (tray pull-in operation or tray insertion operation) at the time of attaching the toner cartridge 70 to the rotary body 90 is performed in a process reversed from the tray pull-out operation. In the state before the tray pull-in operation is started, the driving racks 15 are positioned above positions where the driving racks 15 engage with the pinion gears 94k. For example, the tray pull-in operation is started in response to the user operating a predetermined operation portion. When the tray pull-in operation is started, the driving racks 15 are slid downward with respect to the apparatus body 1A by the driving force of the motor M2. Here, the rotational direction of the motor M2 in the tray pull-in operation is opposite to that in the tray pull-out operation. In the course of movement of the driving racks 15, the driving racks 15 engage with the pinion gears 94k, and thus the pinion gears 94k are rotationally driven.

As a result of the pinion gears 94k being rotationally driven in a direction opposite to the arrow of FIG. 11B, the driving force is input to the rack portions 83k engaged with the pinion gears 94k. As a result of this, the tray 80k is pulled into the apparatus, and moves from the detachment position to the accommodation position with respect to the rotary body 90. The movement direction of the tray 80k is guided to the movement direction Dk opposite to the arrow of FIG. 11B by the engagement between the guided portion 82k and the guide portion 97k of the rotary body 90. As a result of the tray 80k moving from the detachment position to the accommodation position, the toner cartridge 70k is moved from the retracted position to the attached position with respect to the developing unit 50k.

Movement of the tray 80k and the toner cartridge 70k for black has been described above, and movement of the other trays 80y to 80c and toner cartridges 70y to 70c is also performed by a similar mechanism. That is, the driving racks 15 transmit drive to the pinion gears 94y to 94c in respective replacement postures of the toner cartridges.

The motor M2 provided in the apparatus body 1A and the transmission device including the driving racks 15 (15L and 15R) and the drive transmission mechanism constitute the driving device 98 for driving the moving devices 85 provided in the rotary body 90.

As described above, in the present embodiment, a plurality of moving devices 85*k* to 85*y* corresponding to the plurality of toner cartridges 70*k* to 70*y* are disposed in the rotary body 90. The driving device 98 of the apparatus body 1A is a common driving device that drives the plurality of moving devices 85*k* to 85*y* (plurality of driven devices) of the rotary body 90.

In addition, in the present embodiment, the driving target of the driving device 98 switches in accordance with the rotation of the rotary body 90. In other words, the driving device of the present embodiment includes the driving racks 15 each serving as a transmission member that transmits the driving force of the drive source. The driving device can take a state in which the transmission member engages with a first driven portion (e.g., pinion gear 94*k*) in a manner capable of transmitting the driving force and a state in which the transmission member engages with a second driven portion (e.g., pinion gear 94*m*) in a manner capable of transmitting the driving force. In addition, the driving device can take a state in which the transmission member is disengaged from the first driven portion and the second driven portion.

As described above, the pinion gears 94*y* to 94*k* are held by the rotary body 90. Therefore, when the rotary body 90 rotates, it is preferable that the engagement between the driving racks 15 and the pinion gears 94*y* to 94*k* is released.

FIG. 12A illustrates a state in which the tray 80*k* is inside the rotary body 90, that is, a state in which the tray 80*k* is at the accommodation position. FIG. 12B illustrates a state in which the tray 80*k* has moved to the outside of the rotary body 90, that is, a state in which the tray 80*k* has moved to the detachment position.

As illustrated in FIG. 12A, when the tray 80*k* is inside the rotary body 90, the driving racks 15 are positioned in a lower portion in the apparatus body 1A. At this time, the driving racks 15 are retracted from the pinion gears 94*k*. Therefore, the rotary body 90 can be rotated without being interrupted by the driving racks 15. More specifically, the driving racks 15 can be retracted to the outside of the rotational trajectory of the rotary body 90 indicated by dotted lines in FIGS. 12A and 12B.

As described above, by rotationally driving the motor M2 in a normal direction and a reverse direction, the tray 80 attached to the rotary body 90 can be moved from the accommodation position to the detachment position and from the detachment position to the accommodation position with respect to the rotary body 90. That is, the driving device of the present embodiment can drive the moving devices such that not only the toner cartridges move from the attached position to the retracted position but also the toner cartridges move from the retracted position to the attached position.

Here, as described above, in the present embodiment, the movement amount of the tray 80 in toner cartridge replacement is changed in accordance with the size of the toner cartridge 70. Specifically, the movement distance L1 of the movement of the black tray 80*k* from the accommodation position to the detachment position is larger than the movement distance L2 of the movement of the other trays 80*y* to 80*c* from the accommodation position to the detachment position as illustrated in FIGS. 7A and 7B.

Therefore, in the present embodiment, when moving the toner cartridges 70*y* to 70*k* from the attached position to the retracted position, a value obtained by dividing the speed of the rack portions 83*k* by the speed of the driving racks 15 is larger than a value obtained by dividing the speed of the rack portions 83*y* to 83*c* by the speed of the driving racks 15.

For example, as illustrated in FIG. 10, the pinion gear 94*y* is formed as a stepped gear including a large-diameter gear 941 that engages with the driving rack 15 and a small-diameter gear 942 that has a smaller pitch radius than the large-diameter gear 941 and engages with the rack portion 83*y*. The pinion gears 94*m* and 94*c* are formed as similar stepped gears. In contrast, the pinion gear 94*k* is formed such that a portion thereof that engages with the driving rack 15 and a portion thereof that engages with the rack portion 83*k* have the same pitch radius. In this case, the pitch radius of the pinion gear 94*k* can be equal to the pitch radius of the large-diameter gear 941 of the pinion gears 94*y* to 94*c*. According to this configuration, the movement distance of the rack portions 83*k* can be made larger than the movement distance of the other rack portions 83*y* to 83*c* even in the case where the movement distance of the driving racks 15 is the same. That is, the movement distance L1 of the movement of the black tray 80*k* from the accommodation position to the detachment position can be made larger than the movement distance L2 of the movement of the other trays 80*y* to 80*c* from the accommodation position to the detachment position.

In addition, by forming the pinion gears 94*y* to 94*c* as stepped gears, the movement distance L1 of the tray 80*k* can be made larger than the movement distance 12 of the other trays 80*y* to 80*c* even in the configuration in which the pinion gears 94*y* to 94*k* receive the driving force from the same driving racks 15.

To be noted, the pinion gear 94*k* may be formed as a stepped gear instead of (or in combination with) the configuration in which the pinion gears 94*y* to 94*c* are formed as stepped gears. In this case, a portion of the pinion gear 94*k* that engages with the driving rack 15 may be formed as a small-diameter gear, and a portion of the pinion gear 94*k* that engages with the rack portion 83*k* may be formed as a large-diameter gear having a larger pitch radius than the small-diameter gear. In addition, the stepped gear is an example of a speed reduction mechanism, and may be replaced by a known speed reduction mechanism that makes the movement amount of a member on the input side (drive source side) smaller than a movement amount of a member on the output side (tray 80 side).

In addition, the movement amount of the driving rack 15 when the toner cartridge 70*k* moves from the attached position to the retracted position may be made larger than the movement amount of the driving rack 15 when the toner cartridges 70*y* to 70*c* move from the attached position to the retracted position.

Incidentally, in the case where the distance of the movement of the toner cartridge 70 from the attached position to the retracted position is smaller, the movement time of the toner cartridge 70 can be made shorter, and the time in which the user waits for the toner cartridge 70 to move can be made shorter. If a configuration in which the movement amount of the driving racks 15 for the toner cartridge 70*k* is larger than the movement amount of the driving racks 15 for the toner cartridges 70*y* to 70*c* is employed as described above, the time in which the user waits for the toner cartridges 70*y* to 70*c* to move can be made shorter.

According to the configurations described above, the movement distance L1 can be made larger than the movement distance L2. These configurations may be employed in combination.

Modification Example

Although a configuration in which the driven portion includes the pinion gears 94 that engage with both the driving racks 15 and the rack portions 83 has been described, the driven portion may include a gear that engages with the driving rack 15 and a gear that engages with the rack portion 83.

In addition, the configuration of the moving device 85 that moves the tray 80 is not limited to a so-called rack-and-pinion configuration. For example, the member corresponding to the pinion gear 94 may be replaced by a roller that receives the drive of the motor M2 to rotate, and the tray 80 may be moved by friction between the roller and the tray 80.

In addition, in the case of using the roller that receives the drive of the motor M2 to rotate, the roller may be brought into contact with the toner cartridge 70. In this case, the toner cartridges 70*y* to 70*k* can be made directly attachable to and detachable from the rotary body 90 without using the trays 80*y* to 80*k*. In this case, the moving device 85 is constituted by a roller.

Figure 18A:
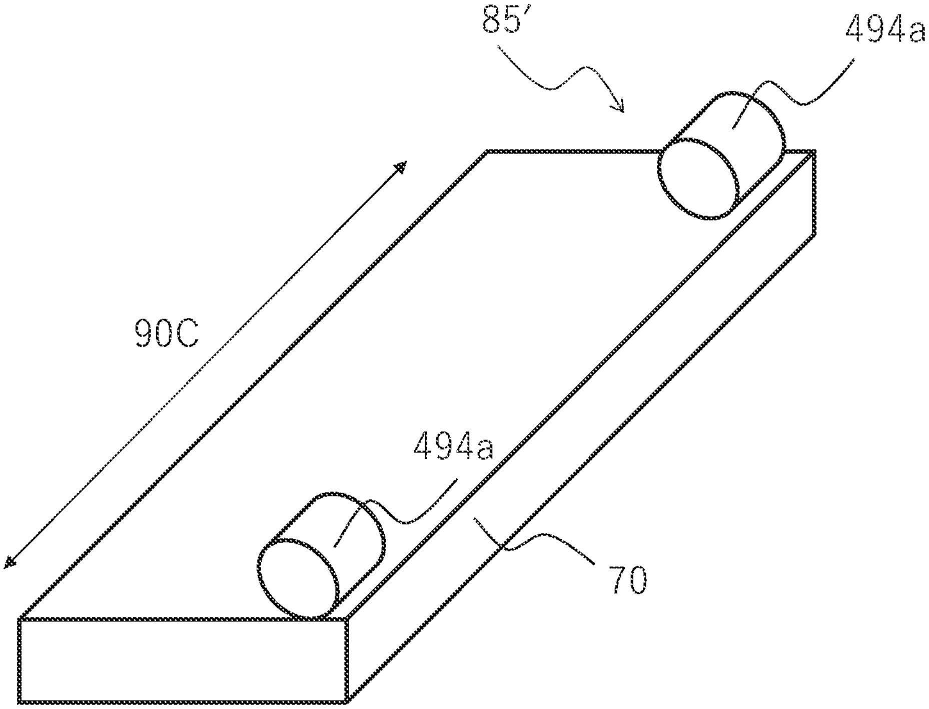
FIGS. 18A and 18B are each an explanatory diagram illustrating a moving device according to a modification example.
Figure 18B:
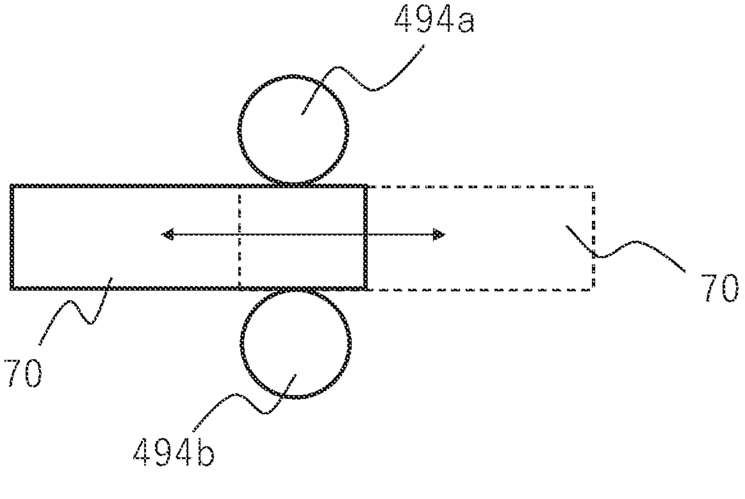

A moving device 85' serving as a modification example will be described with reference to FIGS. 18A and 18B. FIGS. 18A and 18B are diagrams illustrating the moving device 85' according to the present modification example. The moving device 85' includes a rotary member 494*a* that receives the driving force of the motor M2 to rotate.

In the present modification example, the direction of the rotational axis of the rotary member 494*a* is parallel to the direction of the rotational axis 90C of the rotary body 90. The rotary member 494*a* abuts the toner cartridge 70 and rotates, and thus the toner cartridge 70 can reciprocate between the attached position indicated by a solid line in FIG. 18B and the retracted position indicated by a dot line in FIG. 18B.

To be noted, the rotary member 494*a* may be a roller that moves the toner cartridge 70 by friction by abutting the toner cartridge 70 and rotating. In addition, the toner cartridge 70 may be moved by a configuration in which the rotary member 494*a* is a gear engaging with a gear shape (rack shape) formed on the toner cartridge 70.

The moving device 85' may include a plurality of rotary members 494*a*. The plurality of rotary members 494*a* may be arranged arbitrarily. For example, as illustrated in FIG. 18A, the moving device 85' may include a rotary member 494*a* that abuts one end portion of the toner cartridge 70 and a rotary member 494*a* that abuts the other end portion of the toner cartridge 70 in the longitudinal direction of the toner cartridge 70 parallel to the rotational axis 90C. In addition, the moving device 85' may include a rotary member 494*a* that abuts the center of the toner cartridge 70.

In addition, the moving device 85' may include only one rotary member 494*a*. In this case, the moving device 85' may be disposed at an arbitrary position. For example, the moving device 85' may include a rotary member 494*a* that abuts the center of the toner cartridge 70.

Further, the rotary member 494*a* may be urged toward the toner cartridge 70. In addition, the moving device 85' may include a driven roller 494*b* as illustrated in FIG. 18B. The toner cartridge 70 is interposed between the rotary member 494*a* and the driven roller 494*b*. To be noted, with respect to the longitudinal direction of the toner cartridge 70, the position of the rotary member 494*a* and the position of the driven roller 494*b* may overlap with each other, or may be different from each other. In addition, at least one of the rotary member 494*a* and the driven roller 494*b* may be urged toward the toner cartridge 70.

In addition, the rotary member 494*a* and the driven roller 494*b* may be provided in the rotary body 90.

Second Embodiment

A second embodiment will be described with reference to FIGS. 13 to 14C. Although the pinion gear 94 is driven by the driving rack 15 in the first embodiment, the pinion gear 94 may be driven by a different mechanism. In the present embodiment, a configuration employing a swing gear will be described as an example. In the description below, it is assumed that elements denoted by the same reference signs as in the first embodiment have substantially the same configurations and functions as those described in the first embodiment unless otherwise described, and parts different from the first embodiment will be mainly described.

Figure 13:
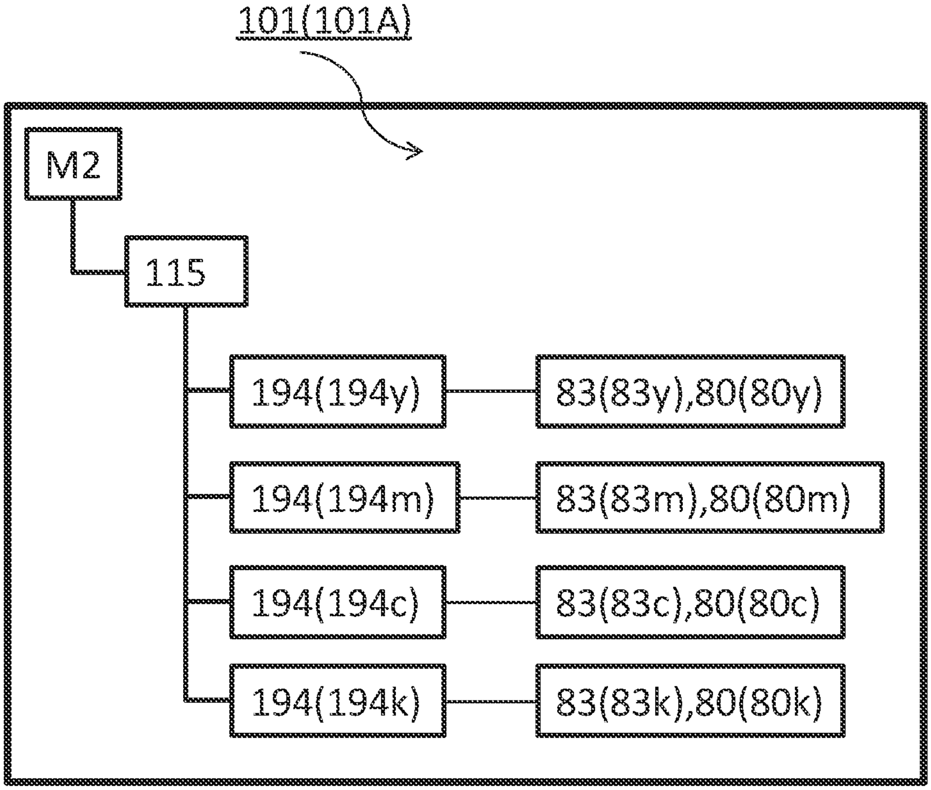
FIG. 13 is a configuration diagram of an image forming apparatus according to a second embodiment.
Figure 14A:
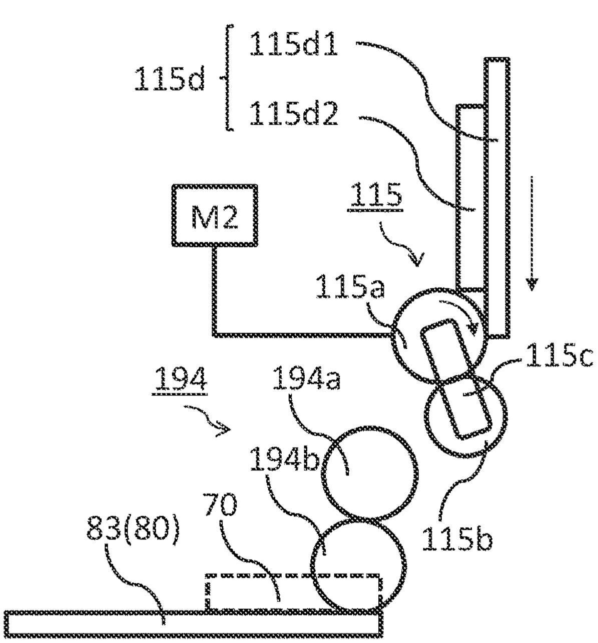
FIGS. 14A to 14C are each an explanatory diagram of elements related to the movement of a tray according to the second embodiment.
Figure 14B:
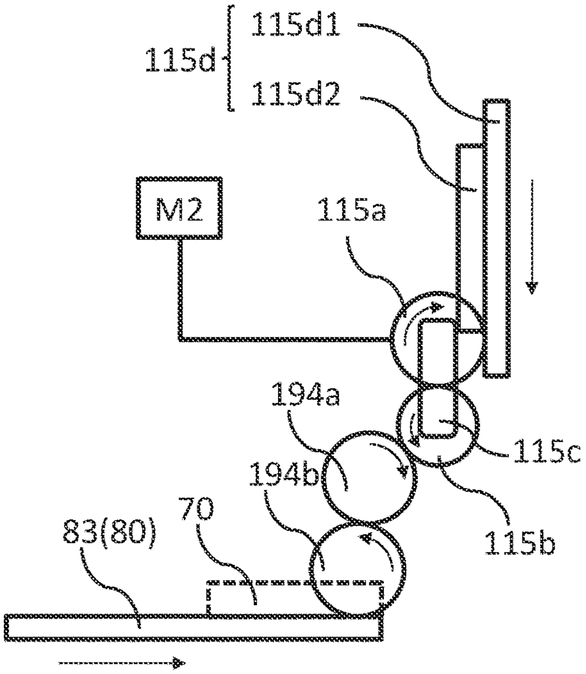
Figure 14C:
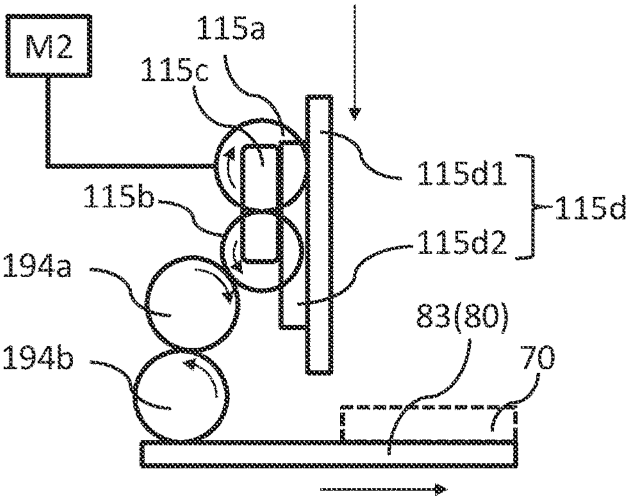

FIGS. 13 to 14C are schematic diagrams for describing a configuration for moving the tray 80 in the second embodiment. An apparatus body 101A of an image forming apparatus 101 according to the second embodiment includes, as a driving device, the motor M2 serving as a drive source, and a swing gear unit 115 serving as a transmission device.

A moving device (driven device) that is driven by the driving device to move the tray 80 is disposed in the rotary body 90. That is, the rotary unit 90U includes the rotary body 90 and the moving device including the tray 80.

In the second embodiment, a plurality of moving devices are disposed in correspondence with the plurality of toner cartridges 70*y* to 70*k*. The moving devices each include a driven portion 194 (one of driven portions 194*y* to 194*k*), and a rack portion 83 (one of rack portions 83*y* to 83*k*). The swing gear unit 115 transmits the driving force of the motor M2 to the driven portion 194, and moves the tray 80 via the rack portion 83.

Similarly to the first embodiment in which the pinion gears 94*y* to 94*k* are driven by the driving racks 15, the first to fourth driven portions 194*y* to 194*k* are each driven by the swing gear unit 115. The first to fourth driven portions 194*y* to 194*k* are respectively engaged with the rack portions 83*y* to 83*k*, and respectively move the trays 80*y* to 80*k*.

The configuration in which each of the first to fourth driven portions 194*y* to 194*k* is driven by the swing gear unit 115 is substantially the same. In addition, the configuration for moving each of the trays 80*y* to 80*k* via each of the first to fourth driven portions 194*y* to 194*k* and each of the rack portions 83*y* to 83*k* is the same. Therefore, in the present embodiment, the first to fourth driven portions 194*y* to 194*k*, the rack portions 83*y* to 83*k*, and the trays 80*y* to 80*k* will be respectively referred to as driven portions 194, rack portions 83, and trays 80 without distinguishing each other.

As illustrated in FIG. 14A, the swing gear unit 115 includes an input gear 115*a*, an output gear 115*b*, and an arm 115*c*. The input gear 115*a* is rotationally driven by the motor M2. The arm 115*c* rotatably supports the output gear 115*b* (such that the output gear 115*b* can rotate) and allows the output gear 115*b* to move (swing or revolve) around the input gear 115*a*.

Further, the swing gear unit 115 includes an arm restriction member 115*d* that restricts the arm 115*c*. The arm restriction member 115*d* includes a restriction portion 115*d*2 and a restriction rack portion 115*d*1. The restriction rack portion 115*d*1 is engaged with the input gear 115*a*.

In addition, the driven portion 194 includes a driven gear 194*a* and a pinion gear 194*b*. The pinion gear 194*b* is engaged with the rack portion 83 of the tray 80.

In the case of moving the tray 80 from the accommodation position to the detachment position, that is, in the case of moving the toner cartridge 70 from the attached position to the retracted position, the motor M2 rotationally drives the input gear 115*a* in a clockwise direction in FIGS. 14A to 14C.

When the input gear 115*a* rotates in the clockwise direction in the drawing, the arm 115*c* swings in the clockwise direction in the drawing similarly to the input gear 115*a* by a frictional force received from the input gear 115*a*. The output gear 115*b* supported by the atm 115*c* rotates in a clockwise direction about the input gear 115*a* together with the atm 115*c*, and engages with the driven gear 194*a* as illustrated in FIG. 14B. At this time, the reaction force that the output gear 115*b* receives from the driven gear 194*a* preferably acts in such a direction as to move the output gear 115*b* and the atm 115*c* in a clockwise direction about the input gear 115*a*. That is, the direction of the reaction force that the output gear 115*b* receives from the driven gear 194*a* when rotating in a counterclockwise direction in FIG. 14B while pressing the driven gear 194*a* is preferably such a direction that a moment in a clockwise direction in the drawings with respect to the rotational axis of the input gear 115*a* is generated. As a result of this, the engagement between the output gear 115*b* and the driven gear 194*a* is more likely to be maintained.

As illustrated in FIG. 14C, when the input gear 115*a* rotates in the clockwise direction in a state in which the output gear 115*b* is engaged with the driven gear 194*a*, the driven gear 194*a* drives the pinion gear 194*b*. As a result of the rack portion 83 being moved by the rotation of the pinion gear 194*b*, the tray 80 moves from the accommodation position to the detachment position. Further, the toner cartridge 70 moves from the attached position to the retracted position.

To be noted, the positional relationship between the toner cartridge 70 and the frame 16 of the apparatus body 101A when the toner cartridge 70 is at the retracted position and the positional relationship between the toner cartridge 70 and the rotary body 90 are the same as those described in the first embodiment, and therefore description thereof will be omitted.

Meanwhile, in the course of clockwise rotation of the input gear 115*a* described above, the arm restriction member 115*d* including the restriction rack portion 115*d*1 that engages with the input gear 115*a* moves down. Then, the arm restriction member 115*d* is positioned at such a position that the restriction portion 115*d*2 restricts the arm 115*c*. The restriction portion 115*d*2 restricts such movement of the arm 115*c* that the output gear 115*b* disengages from the driven gear 194*a*.

In the case of moving the tray 80 from the detachment position to the accommodation position, that is, in the case of moving the toner cartridge 70 from the retracted position to the attached position, the motor M2 rotationally drives the input gear 115*a* in a counterclockwise direction in FIGS. 14A to 14C.

When the input gear 115*a* rotates in the counterclockwise direction, the output gear 115*b* supported by the arm 115*c* receives a force in such a direction as to move in the counterclockwise direction about the input gear 115*a* together with the arm 115*c*. However, since the movement of the arm 115*c* is restricted by the arm restriction member 115*d*, the engagement between the output gear 115*b* and the driven gear 194*a* is maintained.

When the input gear 115*a* rotates in the counterclockwise direction in a state in which the output gear 115*b* is engaged with the driven gear 194*a*, the pinion gear 194*b* is driven by the driven gear 194*a*, and the tray 80 moves from the detachment position to the accommodation position. Then, the toner cartridge 70 moves from the retracted position to the attached position.

After the tray 80 has moved to the accommodation position, the restriction of the arm 115*c* by the restriction portion 115*d*2 of the arm restriction member 115*d* is cancelled. As a result, the rotation of the input gear 115*a* in the counterclockwise direction moves the output gear 115*b* in the counterclockwise direction about the input gear 115*a* together with the arm 115*c*, and thus the engagement between the output gear 115*b* and the driven gear 194*a* is cancelled.

According to the configuration described above, the tray 80 can be moved from the accommodation position to the detachment position. In addition, the toner cartridge 70 can be moved from the attached position to the retracted position. Further, the tray 80 can be moved from the detachment position to the accommodation position. In addition, the toner cartridge 70 can be moved from the retracted position to the attached position.

Modification Example

Although the driving force of the motor M2 is transmitted to the tray 80 via the driven gear 194*a* and the pinion gear 194*b* in the present embodiment, one gear may be configured to engage with the output gear 115*b* and the rack portion 83.

In addition, similarly to the first embodiment, the configuration for moving the tray 80 is not limited to a so-called rack-and-pinion configuration.

As yet another modification example, a partially-toothed gear may be used as a drive transmission mechanism from the motor M2 to the pinion gear engaged with the rack portion 83 instead of the configuration of the first and second embodiments. For example, a partially-toothed gear that engages with a pinion gear of the rotary body 90 may be provided in the apparatus body 1A, and the partially-toothed gear may be rotationally driven by the motor M2. In this case, the partially-toothed gear engages with a pinion gear that engages with the rack portion 83 of the tray 80 facing the opening 16*a* when the rotary body 90 takes the replacement posture illustrated in FIG. 4B. In the black replacement posture illustrated in FIG. 12A, the partially-toothed gear engages with the pinion gear 94*k*. By switching the rotation direction of the partially-toothed gear, the movement direction of the tray 80 can be switched. In addition, it is preferable that the engagement between the partially-toothed gear and the pinion gear 94 is cancelled in a period other than when the tray 80 is moved with respect to the rotary body 90.

Third Embodiment

A third embodiment will be described with reference to FIGS. 15 to 16B. Although the toner cartridge 70 is moved from the attached position to the retracted position by the driving force of the motor M2 of the apparatus body 1A in the first and second embodiments, the configuration for moving the toner cartridge 70 is not limited to this. In the present embodiment, a configuration in which the toner cartridge 70 is moved by an elastic force (urging force) of a spring (elastic member) will be described as an example. In the description below, it is assumed that elements denoted by the same reference signs as in the first embodiment have substantially the same configurations and functions as those described in the first embodiment unless otherwise described, and parts different from the first embodiment will be mainly described.

Figure 15:
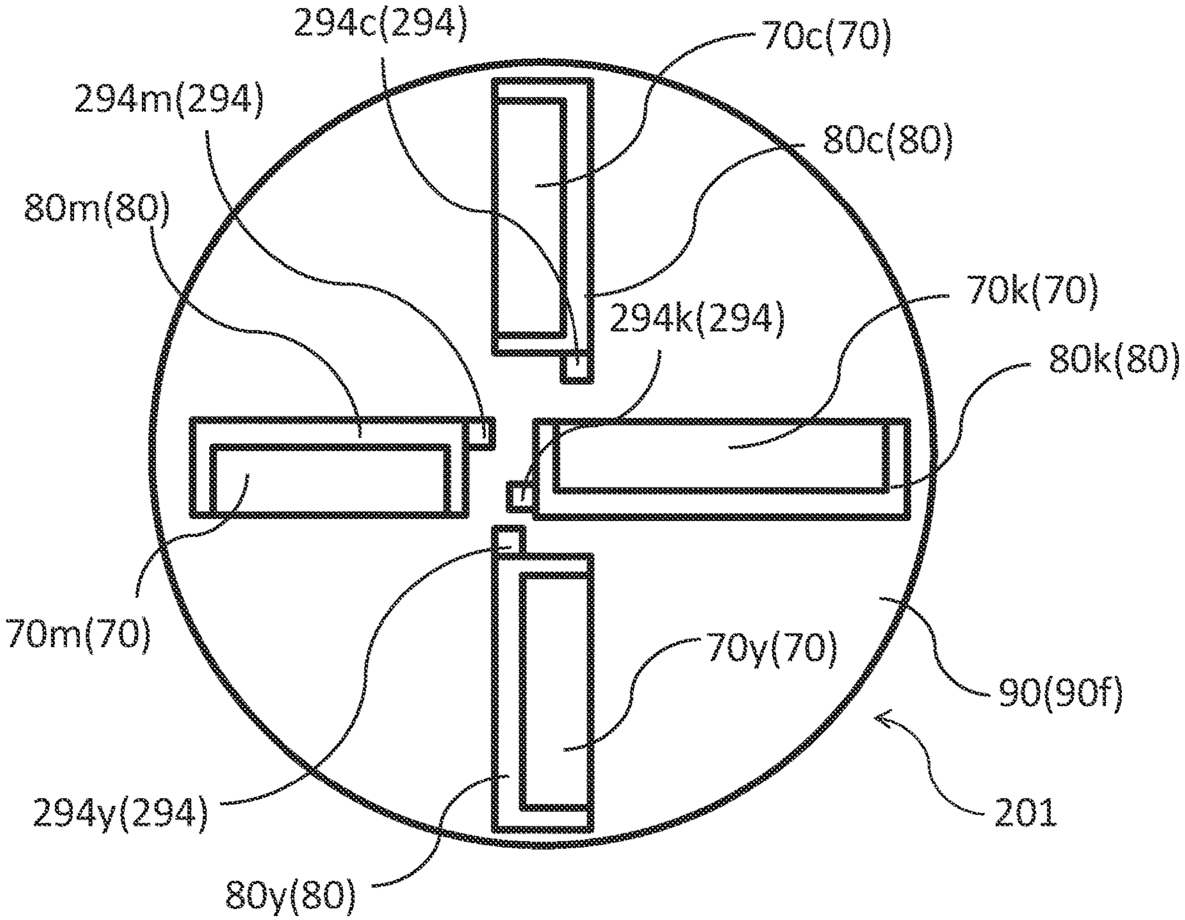
FIG. 15 is an explanatory diagram of elements related to the movement of a tray according to a third embodiment.

As illustrated in FIG. 15, in the image forming apparatus according to the present embodiment, the toner cartridge 70 is moved from the attached position to the retracted position by using an urging member 294 serving as an example of a moving device. More specifically, the rotary body 90 of the image forming apparatus includes an urging member 294*k* corresponding to the toner cartridge 70*k* and the tray 80*k*, and urging members 294*y* to 294*c* corresponding to the toner cartridges 70*y* to 70*c* and the trays 80*y* to 80*c*. That is, the rotary of the present embodiment includes first to fourth urging members corresponding to the first to fourth toner cartridges. The urging member 294*k* is an example of the first urging member. The urging members 294*y* to 294*c* are each an example of a second urging member. To be noted, this numbering is merely used for the sake of convenience of description, and can be interchanged appropriately in principle.

The urging member 294 of the present embodiment includes an elastic member, and is attached to the rotary body 90. In the present embodiment, a compression spring can be used as the elastic member.

In the present embodiment, the urging member 294 urges the tray 80, and thus the tray 80 moves from the accommodation position to the detachment position and the toner cartridge 70 moves from the attached position to the retracted position. Although the urging member 294 urges the toner cartridge 70 via the tray 80 in the present embodiment, the urging member 294 may directly urge the toner cartridge 70.

That is, although the urging member 294 of the present embodiment is configured to be into contact with the tray 80, the urging member 294 may be in contact with the toner cartridge 70. In this case, the tray 80 may be omitted.

To be noted, also in the present embodiment, the toner cartridge 70*k* and the tray 80*k* are larger in size than the other toner cartridges 70*y* to 70*c* and the trays 80*y* to 80*c*. Therefore, the distance by which the toner cartridge 70*k* moves from the attached position to the retracted position is larger than the distance by which the toner cartridges 70*y* to 70*c* move from the attached position to the retracted position. In addition, the distance by which the tray 80*k* moves from the accommodation position to the detachment position is larger than the distance by which the trays 80*y* to 80*c* move from the accommodation position to the detachment position.

In a state in which the tray 80*k* is at the accommodation position and the toner cartridge 70*k* is at the attached position, the elastic member of the urging member 294*k* is deformed. Similarly, in a state in which the trays 80*y* to 80*c* are at the accommodation position and the toner cartridges 70*y* to 70*c* are at the attached position, the elastic members of the urging members 294*y* to 294*c* are deformed.

In this state, the urging force of the elastic member of the urging member 294*k* may be set to be larger than the urging force of the elastic members of the urging members 294*y* to 294*c*. In addition, the deformation amount of the elastic member of the urging member 294*k* may be set to be larger than the deformation amounts of the elastic members of the urging members 294*y* to 294*c*. As a result of this, the distance by which the toner cartridge 70*k* moves from the attached position to the retracted position can be made larger than the distance by which the toner cartridges 70*y* to 70*c* move from the attached position to the retracted position. In addition, the distance by which the tray 80*k* moves from the accommodation position to the detachment position can be made larger than the distance by which the trays 80*y* to 80*c* move from the accommodation position to the detachment position.

To be noted, when the rotary body 90 rotates, it is preferable that the movement of the toner cartridge 70 to the retracted position and the movement of the tray 80 to the detachment position are restricted.

Figure 16A:
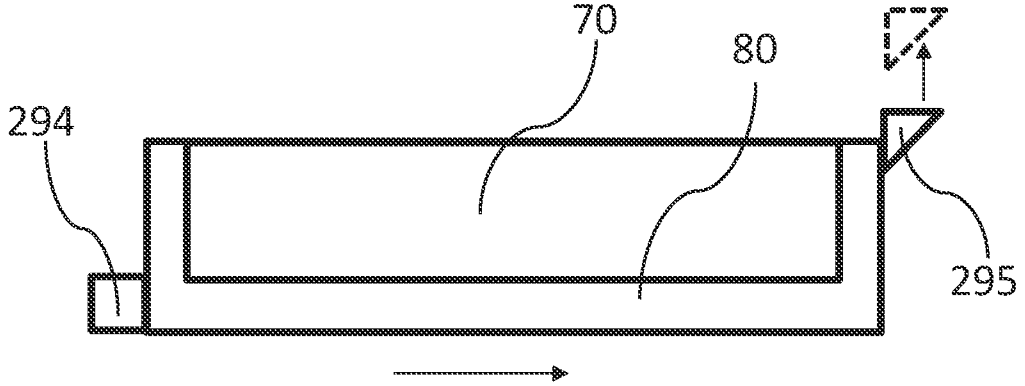
FIGS. 16A to 16C are each an explanatory diagram of elements related to the movement of the tray according to the third embodiment.

Therefore, as illustrated in FIG. 16A, the movement of the tray 80 to the detachment position and the movement of the toner cartridge 70 to the retracted position may be restricted by a restriction member 295. The restriction member 295 is movable to a restricting position where the restriction member 295 restricts movement of the tray 80 to the detachment position and movement of the toner cartridge 70 to the retracted position, and to a releasing position where the restriction member 295 allows movement of the tray 80 to the detachment position and movement of the toner cartridge 70 to the retracted position.

In the present embodiment, the restriction member 295 is urged toward the restricting position. In a state in which the rotary body 90 is in the replacement posture, when the restriction member 295 is moved to the releasing position, the urging member 294 moves the tray 80 to the detachment position, and thus the toner cartridge 70 moves to the retracted position. The movement of the restriction member 295 to the releasing position may be manually performed by the user, and the apparatus body 1A may include a releasing means or a releasing mechanism that moves the restriction member 295. As the releasing means (releasing mechanism), a drive source such as a solenoid or a motor can be used. To be noted, one of the motors M1, M2, and M3 may be used as the drive source.

In addition, the urging member 294 may be configured to switch the urging state each time the toner cartridge 70 or the tray 80 is pushed in.

Figure 16B:
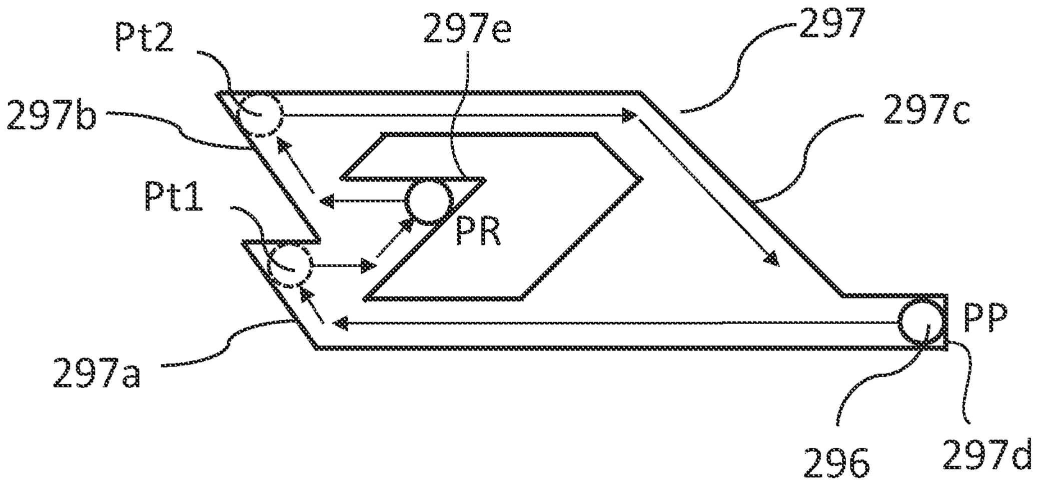

For example, as illustrated in FIG. 16B, the image forming apparatus may include a received portion 296 interlocked with the urging member 294, and a receiving portion 297 that receives the received portion 296. For example, the received portion 296 is provided on the tray 80, and the receiving portion 297 is provided on the rotary body 90. The received portion 296 is urged rightward in the drawing by the urging force of the urging member 294.

In a state in which the received portion 296 is at a position PP, the urging force of the urging member 294 is received by a first recess portion 297*d* of the receiving portion 297, and the received portion 296 stays in the position PP In this state, the tray 80 is positioned at the detachment position, and the toner cartridge 70 is positioned at the retracted position.

When the tray 80 is pushed in toward the accommodation position or the toner cartridge 70 is pushed in toward the attached position against the urging force of the urging member 294 in this state, the received portion 296 moves to a position Pt1 along a first guiding surface 297*a* of the receiving portion 297. Then, when the force to push in the tray 80 or the toner cartridge 70 is no longer present, the urging force of the urging member 294 moves the received portion 296 to a position PR along the receiving portion 297. At this time, the urging force of the urging member 294 is received by a second recess portion 297*e* of the receiving portion 297. As a result, the tray 80 is positioned at the accommodation position, and the toner cartridge 70 is positioned at the attached position.

When the tray 80 or the toner cartridge 70 is pushed in again against the urging force of the urging member 294 in this state, the received portion 296 moves to a position Pt2 along a second guiding surface 297*b* of the receiving portion 297. Then, when the force to push in the tray 80 or the toner cartridge 70 is no longer present, the urging force of the urging member 294 moves the received portion 296 to the position PP along a third guiding surface 297*c* of the receiving portion 297. As a result, the tray 80 is positioned at the detachment position, and the toner cartridge 70 is positioned at the retracted position.

To be noted, in the case where the receiving portion 297 is attached to the rotary body 90, the urging member 294 may include the elastic member and the received portion 296. In this case, in a state in which the received portion 296 is positioned at the position PR, the urging force of the urging member 294 is received by the second recess portion 297*e* of the receiving portion 297, and does not act on the tray 80 or the toner cartridge 70. In addition, when the received portion 296 moves from the position Pt2 to the position PP, the urging force of the urging member 294 acts on the tray 80 and the toner cartridge 70, the tray 80 is positioned at the detachment position, and the toner cartridge 70 is positioned at the retracted position. To be noted, a member corresponding to the received portion 296 may be provided in the rotary body 90, and a member corresponding to the receiving portion 297 may be provided in the urging member 294 or the tray 80.

Figure 16C:
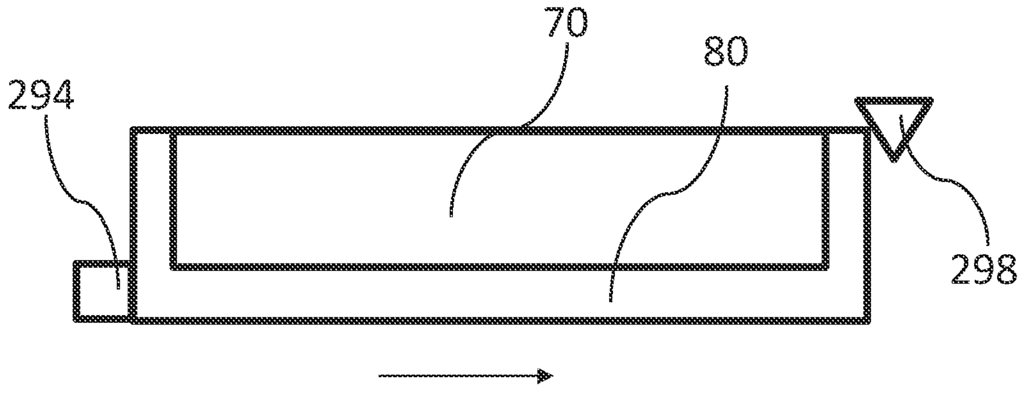

To be noted, the image forming apparatus may include a locking portion 298 (tray holding member) illustrated in FIG. 16C. Although the locking portion 298 engages with the tray 80 in the present embodiment, the locking portion 298 may engage with the toner cartridge 70. The locking portion 298 holds the tray 80 at the accommodation position or holds the toner cartridge 70 at the attached position in a state in which the urging member 294 is not urging the tray 80 or the toner cartridge 70. For example, also in a state in which the direction of the gravity acting on the toner cartridge 70 has come to match the retraction direction or has become close to the retraction direction of the toner cartridge 70 due to the rotation of the rotary body 90, the toner cartridge 70 is held at the attached position by the locking portion 298. When the urging force of the urging member 294 acts on the tray 80 or the toner cartridge 70, the locking portion 298 is moved by the tray 80 or the toner cartridge 70. To be noted, the position where the locking portion 298 engages with a locked portion of the tray 80 or the toner cartridge 70 is not limited to the position of FIG. 16C.

As the locking portion 298, for example, the same part as the projection portion 95 provided in the rotary body 90 of the first embodiment illustrated in FIGS. 7A and 7B can be used.

Modification Example

Although the elastic member is a compression spring in the present embodiment, the elastic member may be a torsion coil spring, a plate spring, or a tension spring each provided at an appropriate position.

In addition, for example, magnets may be used as the urging member. For example, a first magnet may be attached to the rotary body 90, and the tray 80 may be urged toward the retracted position by a repulsive force between the first magnet and a second magnet attached to the toner cartridge 70 or the tray 80.

Fourth Embodiment

A fourth embodiment will be described with reference to FIGS. 17A and 17B. Although the toner cartridge 70 is moved from the attached position to the retracted position by the driving force of the motor M2 of the apparatus body 1A in the first and second embodiments and by the urging member 294 in the third embodiment, the configuration for moving the toner cartridge 70 is not limited to these. In the present embodiment, a configuration in which the toner cartridge 70 is moved by using a solenoid will be described as an example. In the description below, it is assumed that elements denoted by the same reference signs as in the first embodiment have substantially the same configurations and functions as those described in the first embodiment unless otherwise described, and parts different from the first embodiment will be mainly described.

Figure 17A:
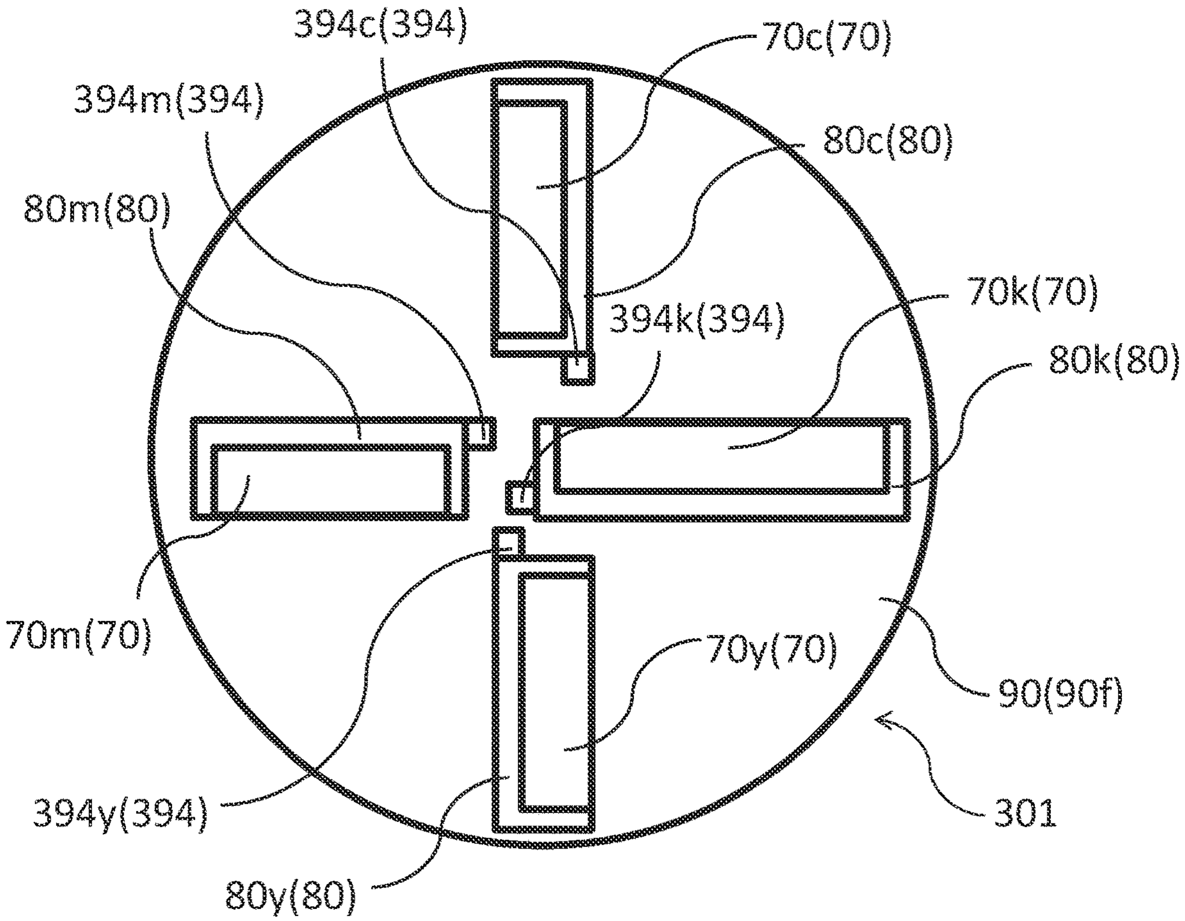
FIGS. 17A and 17B are each an explanatory diagram of elements related to the movement of a tray according to a fourth embodiment.
Figure 17B:
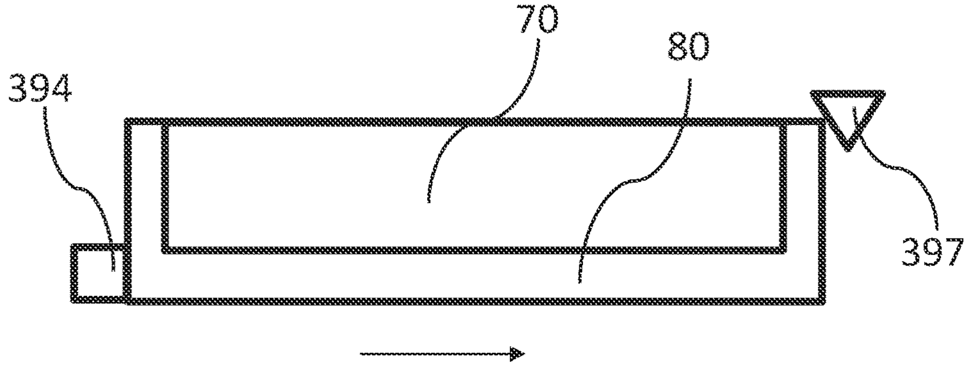

FIGS. 17A and 17B are each a diagram for describing a configuration for moving the tray 80 in the fourth embodiment. In the image forming apparatus according to the present embodiment, the toner cartridge 70 is moved from the attached position to the retracted position by using a solenoid unit 394 serving as an example of a moving device. More specifically, the rotary body 90 of the present embodiment includes a solenoid unit 394*k* corresponding to the toner cartridge 70*k* and the tray 80*k*. In addition, the rotary body 90 of the present embodiment includes solenoid units 394*y* to 394*c* corresponding to the toner cartridges 70*y* to 70*c* and the trays 80*y* to 80*c*.

The solenoid unit 394 includes a coil and a movable member, and the movable member is moved by a magnetic field induced in the coil. The movable member is capable of moving such that the tray 80 moves from the accommodation position to the detachment position or the toner cartridge 70 moves from the attached position to the retracted position.

In addition, the movable member is capable of moving such that the tray 80 moves from the detachment position to the accommodation position or the toner cartridge 70 moves from the retracted position to the attached position.

To be noted, as illustrated in FIG. 17B, the image forming apparatus may include a locking portion 397 (tray holding member). Although the locking portion 397 engages with the tray 80 in the present embodiment, the locking portion 397 may engage with the toner cartridge 70. The locking portion 397 holds the tray 80 at the accommodation position or holds the toner cartridge 70 at the attached position in a state in which the movable member of the solenoid unit 394 is not urging the tray 80 or the toner cartridge 70. That is, the locking portion 397 restricts movement of the tray 80 and the toner cartridge 70 in a state in which the movable member of the solenoid unit 394 is not urging the tray 80 and the toner cartridge 70. In contrast, when the movable member of the solenoid unit 394 acts on the tray 80 or the toner cartridge 70, the locking portion 397 is moved by the tray 80 or the toner cartridge 70. To be noted, the position where the locking portion 397 engages with a locked portion of the tray 80 or the toner cartridge 70 is not limited to the position of FIG. 17B.

As the locking portion 397, for example, the same part as the projection portion 95 provided in the rotary body 90 of the first embodiment illustrated in FIGS. 7A and 7B can be used.

Fifth Embodiment

A fifth embodiment will be described with reference to FIG. 19. In the first to fourth embodiments, a configuration in which the rotary body 90 includes four developing units 50*y* to 50*k* and a color image can be formed by using toners of four colors has been described. In the present embodiment, a configuration in which a toner cartridge is moved with respect to a developing device capable of forming a monochromatic image will be described. In the description below, it is assumed that elements denoted by the same reference signs as in the first to fourth embodiments have substantially the same configurations and functions as those described in the first to fourth embodiments unless otherwise described, and parts different from the first to fourth embodiments will be mainly described.

Figure 19:
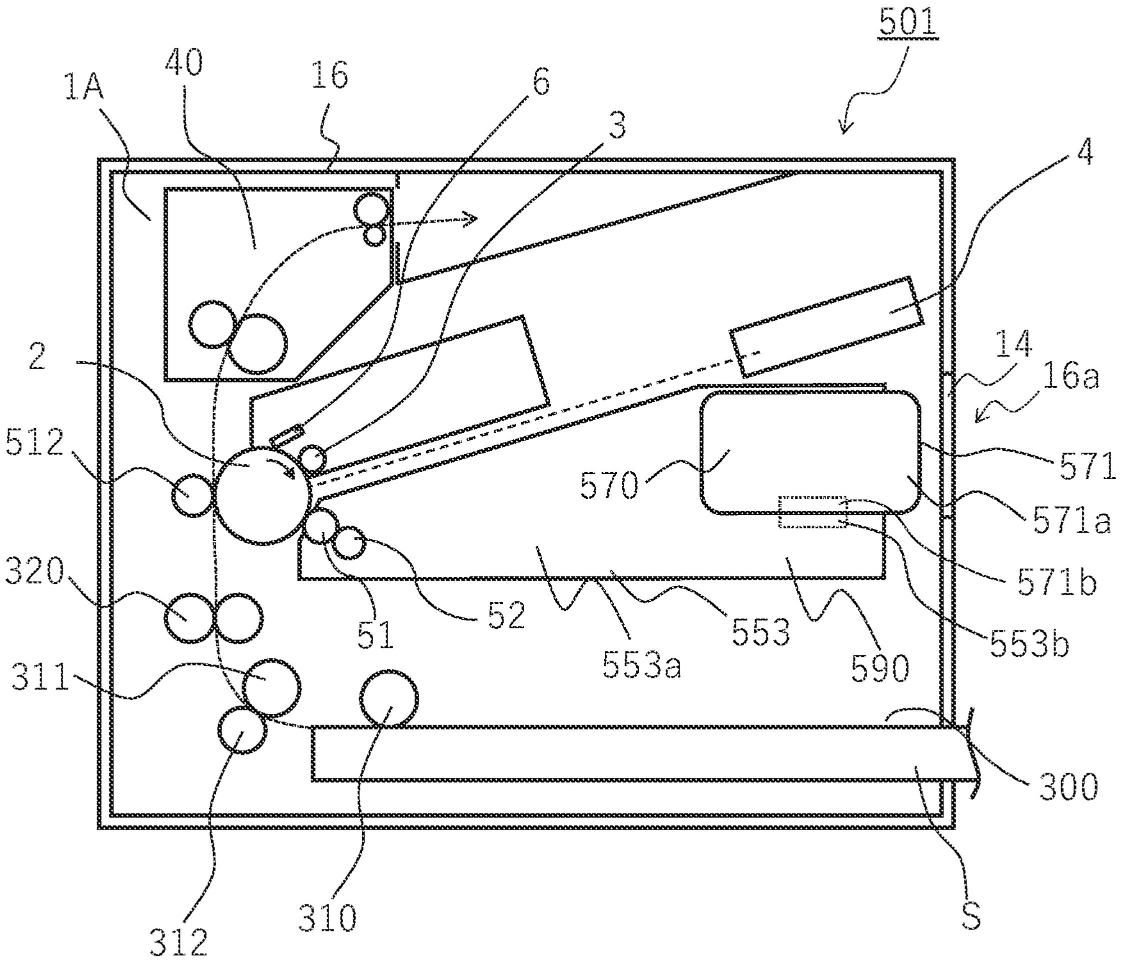
FIG. 19 is a schematic view of an image forming apparatus according to a fifth embodiment.

As illustrated in FIG. 19, an image forming apparatus 501 includes a toner cartridge 570 attachable to and detachable from the apparatus body 1A. In addition, the apparatus body 1A includes a developing device (developing unit) 590.

The developing device 590 is an example of a developing means or a developing portion that develops (visualizes) an electrostatic latent image formed on the photosensitive drum 2 into a toner image by using toner. The developing device 590 of the present embodiment develops the electrostatic latent image formed on the photosensitive drum 2 by using black toner.

The developing device 590 includes a developing roller 51, a supply roller 52, and a developing blade. The toner cartridge 570 is attached to the developing device 590. The toner cartridge 570 stores therein black toner to be supplied to the developing device 590.

The toner cartridge 570 includes a toner frame 571. The toner frame 571 includes a toner storage portion 571*a* that stores toner, and a discharge opening 571*b* communicating with the toner storage portion 571*a*.

The developing device 590 includes a developing frame (storage frame) 553 including a developing-side storage portion 553*a* that stores toner. In addition, the developing frame 553 has an inlet opening 553*b* communicating with the developing-side storage portion (toner supply chamber) 553*a*.

The toner cartridge 570 is attachable to and detachable from the developing device 590 through the opening 16*a* provided in the frame 16 of the apparatus body 1A. More specifically, the toner cartridge 570 is movable to an attached position and a retracted position where the toner cartridge 570 is retracted from the attached position, through the opening 16*a* with respect to the developing frame 553. In a state in which the toner cartridge 570 is at the attached position with respect to the developing frame 553, the discharge opening 571*b* faces the inlet opening 553*b*. That is, the toner storage portion 571*a* of the toner cartridge 570 and the developing-side storage portion 553*a* of the developing device 590 communicate with each other via the discharge opening 571*b* and the inlet opening 553*b*. When toner is supplied from the toner cartridge 570 to the developing device 590, at least part of the inlet opening 553*b* is positioned below at least part of the discharge opening 571*b*.

Then, toner stored in the toner storage portion 571*a* is discharged through the discharge opening 571*b*, and the toner discharged through the discharge opening 571*b* is stored in the developing-side storage portion 553*a* through the inlet opening 553*b*. The toner stored in the developing-side storage portion 553*a* is supplied to the developing roller 51 by the supply roller 52. To be noted, the developing-side storage portion 553*a* may include a toner conveyance member that conveys toner toward the supply roller 52.

The function of the toner cartridge 570 is substantially the same as the functions function of the toner cartridge 70 of the first to fourth embodiments. In addition, the function of the developing device 590 is substantially the same as the function of one of the developing units 50*y*, 50*m*, 50*c*, and 50*k* of the first to fourth embodiments.

Meanwhile, the apparatus body 1A includes a transfer roller 512. The transfer roller 512 is an example of a transfer means or a transfer unit that transfers an image from the photosensitive drum 2 onto the sheet S. A conveyance roller pair 320 conveys the sheet S to a transfer portion that is a nip portion between the photosensitive drum 2 and the transfer roller 512. The image on the photosensitive drum 2 is transferred onto the surface of the sheet S that has been conveyed thereto.

The apparatus body 1A includes a moving device configured to move the toner cartridge 570 from the attached position to the retracted position with respect to the developing device 590, more specifically with respect to the developing frame 553 of the developing device 590. As this moving device, a moving device described in the first to fourth embodiments and modification examples thereof can be used.

In this case, among the moving devices of the first to fourth embodiments, parts provided in the rotary body 90 may be provided in the developing device 590. In addition, the replacement posture and the developing posture of the developing device 590 may be the same or different. For example, the developing device 590 may be movable to a contact position where the developing roller 51 is in contact with the photosensitive drum 2 and a separation position where the developing roller 51 is separated from the photosensitive drum 2, and the developing device 590 may be at the separation position in a state in which the developing device 590 is in the replacement posture.

For example, the developing device 590 may have the tray 80 and a configuration for moving the tray 80. As the configuration for moving the tray 80, those described in the first to fourth embodiments and modification examples thereof can be used. In addition, the developing device 590 may include the rotary member 494*a* and the driven roller 494*b* that have been described in the modification example of the first embodiment.

Also in the present embodiment, when the toner cartridge 570 is at the retracted position, at least part of the toner cartridge 570 is preferably outside the apparatus of the image forming apparatus 501 (outside the apparatus body 1A). That is, when the toner cartridge 570 is at the retracted position, at least part of the toner cartridge 570 is positioned more outward than the exterior position with respect to the apparatus body 1A when the toner cartridge 570 is at the retracted position. In other words, at least part of the toner cartridge 570 is positioned in a space outside the apparatus body 1A in the case where the door 14 is at the closed position. Further, at least part of the toner cartridge 570 is positioned downstream of the exterior position in the retraction direction of the toner cartridge 570.

In addition, in the case where the side surface 16*b* having the opening 16*a* is the front surface of the apparatus body 1A, it can be said at least part of the toner cartridge 570 projects to the front side more than the exterior surface on the front side of the apparatus body 1A when the toner cartridge 570 is at the retracted position.

Also in the present embodiment, when the toner cartridge 570 is at the retracted position, half the length or more of the toner cartridge 570 in the retraction direction is preferably outside the apparatus.

As described above, although the toner cartridges 70 are detachably attached to the rotary body 90 in the first to fourth embodiments and modification examples thereof, the toner cartridge 570 is detachably attached to the developing device 590 in the present embodiment.

Other Embodiments

In the embodiments described above, a configuration in which the tray 80 moves from the accommodation position to the detachment position by a driving device, an urging member, or the like of the apparatus body 1A without the user operating the tray 80 has been described. Instead of this, a configuration in which the user grips the tray 80 and pulls out the tray 80 from the accommodation position to the detachment position in a state in which the rotary body 90 is at the replacement posture, that is, a configuration in which the support member is manually moved may be employed. Also in this case, since the user is only required to attach or detach the toner cartridge 70 to or from the tray 80 pulled out of the apparatus body, the operability is improved as compared with a case where the toner cartridge is directly inserted into or removed from the apparatus body.

In addition, in the first to fourth embodiments described above, a configuration in which the rotary body 90 includes the four developing units 50*y* to 50*k* and a color image can be formed by using toners of four colors has been described. However, the number of developing units that the rotary body 90 includes may be 3 or less or 5 or more. In these cases, the number and arrangement of the trays and toner cartridges can be appropriately changed in accordance with the number of developing units. For example, in the first to fourth embodiments described above, a configuration in which the four toner cartridges 70*y* to 70*k* are attachable to and detachable from the rotary body 90 has been described as an example. However, a configuration in which the rotary body 90 includes only one developing unit 50*k* and only one toner cartridge 70*k* is attached to the rotary body 90 may be employed. In this case, the rotary body 90 can rotate in a clockwise direction in FIG. 1 about the rotational axis 90C to alternately take the black replacement posture and the black developing posture.

In addition, in the first to fourth embodiments described above, a configuration in which the rotary body 90 includes the four developing units 50*y* to 50*k* and a color image can be formed by using toners of four colors has been described. However, the rotary body 90 may include a plurality of developing units capable of executing image formation by using toner of the same color. For example, a configuration in which the rotary body 90 includes four black developing units 50*k* and four toner cartridges 70*k* are attached to the rotary body 90 may be employed.

According to the present disclosure, a new form of an image forming apparatus that advances conventional technology can be provided While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-178514, filed on Nov. 8, 2022, and No. 2023-165972, filed on Sep. 27, 2023, which are hereby incorporated by reference herein in their entirety.

What is claimed is:

1. An image forming apparatus comprising:

a rotary configured to rotate and including a first developing roller, a second developing roller, a first storage frame, and a second storage frame, the first storage frame including a first storage portion configured to store first toner to be supplied to the first developing roller, the second storage frame including a second storage portion configured to store second toner to be supplied to the second developing roller;

a body frame with an opening, the body frame being configured to accommodate the rotary;

a first toner cartridge which is configured to store the first toner, which is attachable to and detachable from the rotary through the opening, which is movable to a first attached position and a first retracted position where the first toner cartridge is retracted from the first attached position, with respect to the first storage frame, and which is configured to supply the first toner to the first storage portion in a state in which the first toner cartridge is at the first attached position;

a second toner cartridge which is configured to store the second toner, which is attachable to and detachable from the rotary through the opening, which is movable to a second attached position and a second retracted position where the second toner cartridge is retracted from the second attached position, with respect to the second storage frame, and which is configured to supply the second toner to the second storage portion in a state in which the second toner cartridge is at the second attached position;

a first support member which is configured to support the first toner cartridge, to which the first toner cartridge is detachably attached, and which is attached to the rotary; and a second support member which is configured to support the second toner cartridge, to which the second toner cartridge is detachably attached, and which is attached to the rotary, wherein the first support member is movable with respect to the first storage frame such that the first toner cartridge moves from the first attached position to the first retracted position, wherein the second support member is movable with respect to the second storage frame such that the second toner cartridge moves from the second attached position to the second retracted position, wherein in a case where a length by which the first toner cartridge at the first retracted position projects from the opening is a first length, and a length by which the second toner cartridge at the second retracted position projects from the opening is a second length, the first length is larger than the second length, and wherein a movement distance of the first support member in a case where the first toner cartridge moves from the first attached position to the first retracted position is larger than a movement distance of the second support member in a case where the second toner cartridge moves from the second attached position to the second retracted position.

2. The image forming apparatus according to claim 1, further comprising:

a first moving device configured to move the first toner cartridge from the first attached position to the first retracted position in a state in which the first toner cartridge is supported by the first support member; and a second moving device configured to move the second toner cartridge from the second attached position to the second retracted position in a state in which the second toner cartridge is supported by the second support member, wherein the first support member is a part of the first moving device, and wherein the second support member is a part of the second moving device.

3. The image forming apparatus according to claim 2, further comprising:

a driving device attached to the body frame and including a drive source, wherein the first moving device includes a first driven portion attached to the rotary and configured to receive a driving force of the drive source, and wherein the second moving device includes a second driven portion attached to the rotary and configured to receive the driving force.

4. The image forming apparatus according to claim 3, wherein the driving device includes a driving gear configured to be driven by the driving force, wherein the first driven portion includes a first rack gear provided in the first support member and a first pinion gear engaged with the first rack gear, and is configured to receive the driving force via engagement between the first pinion gear and the driving gear, and wherein the second driven portion includes a second rack gear provided in the second support member and a second pinion gear engaged with the second rack gear, and is configured to receive the driving force via engagement between the second pinion gear and the driving gear.

5. The image forming apparatus according to claim 4, wherein with respect to a rotational axis direction of the rotary, a range in which the first rack gear is disposed and a range in which the second rack gear is disposed overlap with each other at least partially.

6. The image forming apparatus according to claim 5, wherein a tooth surface of the first rack gear faces a tooth surface of the second rack gear in a state in which the first toner cartridge is at the first attached position and the second toner cartridge is at the second attached position.

7. The image forming apparatus according to claim 5, wherein as viewed in the rotational axis direction of the rotary, in a state in which the first toner cartridge is at the first attached position and the second toner cartridge is at the second attached position, the range in which the first rack gear is disposed and the range in which the second rack gear is disposed overlap with each other at least partially with respect to a movement direction of the first rack gear.

8. The image forming apparatus according to claim 7, wherein the movement direction of the first rack gear and a movement direction of the second rack gear are parallel to each other.

9. The image forming apparatus according to claim 5, further comprising:

a third toner cartridge;

a fourth toner cartridge;

a third support member configured to support the third toner cartridge;

a fourth support member configured to support the fourth toner cartridge;

a third rack gear provided in the third support member; and a fourth rack gear provided in the fourth support member, wherein with respect to the rotational axis direction of the rotary, a range in which the third rack gear is disposed and a range in which the fourth rack gear is disposed overlap with each other at least partially, and a range in which the first rack gear and the second rack gear are disposed and a range in which the third rack gear and the fourth rack gear are disposed do not overlap with each other.

10. The image forming apparatus according to claim 4, wherein as viewed in a rotational axis direction of the rotary, in a state in which the first toner cartridge is at the first attached position and the second toner cartridge is at the second attached position, a range in which the first rack gear is disposed and a range in which the second rack gear is disposed overlap with each other at least partially with respect to a movement direction of the first rack gear.

11. The image forming apparatus according to claim 10, wherein the movement direction of the first rack gear and a movement direction of the second rack gear are parallel to each other.

12. The image forming apparatus according to claim 4, wherein with respect to a rotational axis direction of the rotary, a range in which the first rack gear is disposed and a range in which the second rack gear is disposed do not overlap with each other, and wherein as viewed in the rotational axis direction of the rotary, in a state in which the first toner cartridge is at the first attached position and the second toner cartridge is at the second attached position, the first rack gear and the second rack gear overlap with each other.

13. The image forming apparatus according to claim 12, wherein a movement direction of the first rack gear and a movement direction of the second rack gear intersect with each other.

14. The image forming apparatus according to claim 4, wherein with respect to a rotational axis direction of the rotary, a range in which the driving gear engages with the first driven portion and a range in which the driving gear engages with the second driven portion overlap with each other at least partially.

15. The image forming apparatus according to claim 4, wherein with respect to a rotational axis direction of the rotary, a range in which the first rack gear and the first pinion gear engage with each other is displaced from a range in which the second rack gear and the second pinion gear engage with each other.

16. The image forming apparatus according to claim 4, wherein a value obtained by dividing a speed of the first rack gear by a speed of the driving gear is larger than a value obtained by dividing a speed of the second rack gear by the speed of the driving gear.

17. The image forming apparatus according to claim 4, wherein a movement amount of the driving gear in a case where the first toner cartridge moves from the first attached position to the first retracted position is larger than a movement amount of the driving gear in a case where the second toner cartridge moves from the second attached position to the second retracted position.

18. The image forming apparatus according to claim 3, wherein the driving device is configured to drive the first driven portion such that the first toner cartridge moves from the first retracted position to the first attached position, and wherein the driving device is configured to drive the second driven portion such that the second toner cartridge moves from the second retracted position to the second attached position.

19. The image forming apparatus according to claim 3, wherein the driving device includes a transmission member configured to transmit the driving force of the drive source, and wherein the driving device is configured to take a state in which the transmission member is engaged with the first driven portion in a manner capable of transmitting the driving force, a state in which the transmission member is engaged with the second driven portion in a manner capable of transmitting the driving force, and a state in which the transmission member is disengaged from the first driven portion and the second driven portion.

20. The image forming apparatus according to claim 2, wherein the first moving device includes a first urging member attached to the rotary and configured to urge the first toner cartridge to move from the first attached position to the first retracted position, and wherein the second moving device includes a second urging member attached to the rotary and configured to urge the second toner cartridge to move from the second attached position to the second retracted position.

21. The image forming apparatus according to claim 20, wherein a distance by which the first urging member moves the first toner cartridge is larger than a distance by which the second urging member moves the second toner cartridge.

22. The image forming apparatus according to claim 1, wherein the first toner cartridge is configured to store a first amount of the first toner, wherein the second toner cartridge is configured to store a second amount of the second toner, and wherein the first amount is larger than the second amount.

23. The image forming apparatus according to claim 1, wherein a movement direction of the first toner cartridge in which the first toner cartridge moves from the first attached position to the first retracted position intersects with a rotational axis direction of the rotary, and wherein a movement direction of the second toner cartridge in which the second toner cartridge moves from the second attached position to the second retracted position intersects with the rotational axis direction of the rotary.

24. The image forming apparatus according to claim 1, further comprising:

a photosensitive drum, wherein the rotary is rotatable to a first developing posture in which the first developing roller faces the photosensitive drum, a first replacement posture in which detachment of the first toner cartridge from the rotary is allowed, a second developing posture in which the second developing roller faces the photosensitive drum, and a second replacement posture in which detachment of the second toner cartridge from the rotary is allowed.

25. The image forming apparatus according to claim 1, further comprising an opening/closing member movable between a closed position where the opening/closing member covers the opening and an open position where the opening is exposed, wherein in a case the first toner cartridge is located at the first retracted position, the opening/closing member at the open position supports the first support member, and in a case the second toner cartridge is located at the second retracted position, the opening/closing member at the open position supports the second support member.

* * * * *